United States Patent
Gurin

(10) Patent No.: US 12,472,838 B1
(45) Date of Patent: Nov. 18, 2025

(54) DISTRIBUTED AND DECOUPLED CHARGING AND DISCHARGING ENERGY STORAGE SYSTEM

(71) Applicant: Michael Gurin, Glenview, IL (US)

(72) Inventor: Michael Gurin, Glenview, IL (US)

(73) Assignee: Michael Gurin, Glenview, IL (US)

( * ) Notice: Subject to any disclaimer, the term of this patent is extended or adjusted under 35 U.S.C. 154(b) by 656 days.

(21) Appl. No.: 17/958,875

(22) Filed: Oct. 3, 2022

Related U.S. Application Data

(63) Continuation-in-part of application No. 16/908,403, filed on Jun. 22, 2020, now Pat. No. 11,498,445.

(51) Int. Cl.
| | | |
|---|---|---|
| *B60L 53/64* | (2019.01) | |
| *H02J 3/28* | (2006.01) | |
| *H02J 7/00* | (2006.01) | |
| *H02J 15/00* | (2006.01) | |

(52) U.S. Cl.
CPC ............ *B60L 53/64* (2019.02); *H02J 3/28* (2013.01); *H02J 7/0048* (2020.01); *H02J 15/008* (2020.01); *H02J 2300/20* (2020.01)

(58) Field of Classification Search
CPC ...................................................... B60L 53/64
See application file for complete search history.

(56) References Cited

U.S. PATENT DOCUMENTS

| | | | | |
|---|---|---|---|---|
| 4,136,432 A * | 1/1979 | Melley, Jr. | ............... | B60P 3/00 29/469 |
| 6,393,775 B1 * | 5/2002 | Staschik | ............... | F24D 11/005 210/241 |
| 6,450,133 B1 * | 9/2002 | Bernard | ................... | F01P 5/04 454/118 |
| 6,601,542 B2 * | 8/2003 | Campion | ................ | F02B 63/04 290/1 R |
| 6,615,118 B2 * | 9/2003 | Kumar | ...................... | B60L 9/02 701/19 |
| 6,765,304 B2 * | 7/2004 | Baten | ..................... | F02B 63/04 290/1 A |
| 6,786,051 B2 * | 9/2004 | Kristich | ................. | F01D 15/10 60/796 |
| 6,877,581 B2 * | 4/2005 | Badr | ........................ | B60P 3/00 280/789 |
| 7,221,061 B2 * | 5/2007 | Alger | ........................ | H02J 9/08 290/1 R |
| 7,619,319 B1 * | 11/2009 | Hunter | .................... | B60L 53/14 290/4 R |
| 8,207,621 B2 * | 6/2012 | Hunter | .................... | F02B 77/13 290/1 A |
| 8,235,009 B2 * | 8/2012 | Hunter | .................... | F16M 3/00 123/3 |

(Continued)

*Primary Examiner* — Jerry D Robbins

(57) ABSTRACT

A system and method for energy distribution with decoupled by time and space domains that integrates energy storage capabilities that feature co-products utilization at the point of energy storage charging, byproduct utilization at the point of energy production, and time and space decoupling of vehicle shuttling energy storage media discharge to accelerate return on investment, reduce system energy consumption, and maximize utilization of existing energy infrastructure. Additionally, the system executes the energy transactions by controlling and integrating distributed energy producers and consumers with minimal grid dependence.

20 Claims, 29 Drawing Sheets

(56) References Cited

U.S. PATENT DOCUMENTS

| | | | | |
|---|---|---|---|---|
| 8,294,286 B2* | 10/2012 | Hunter | ............... | F02D 29/06 |
| | | | | 290/1 R |
| 8,364,388 B2* | 1/2013 | Naito | ............... | G01C 21/3679 |
| | | | | 701/439 |
| 8,373,289 B2* | 2/2013 | Hunter | ............... | H01M 8/2475 |
| | | | | 290/1 A |
| 8,493,026 B2* | 7/2013 | Sahinoglu | ............... | H04W 4/022 |
| | | | | 320/109 |
| 8,860,362 B2* | 10/2014 | Kamen | ............... | B60L 53/00 |
| | | | | 320/109 |
| 10,030,579 B2* | 7/2018 | Austin | ............... | F16M 3/00 |
| 10,046,962 B2* | 8/2018 | Hall | ............... | B67D 7/04 |
| 10,184,397 B2* | 1/2019 | Austin | ............... | F02C 6/00 |
| 11,125,156 B2* | 9/2021 | Zhang | ............... | H02K 7/1823 |
| 2003/0030279 A1* | 2/2003 | Campion | ............... | F02B 63/04 |
| | | | | 290/1 A |
| 2012/0041804 A1* | 2/2012 | Sahinoglu | ............... | H04W 4/027 |
| | | | | 705/14.1 |
| 2013/0127392 A1* | 5/2013 | Rugolo | ............... | H02J 7/00 |
| | | | | 229/300 |
| 2015/0288317 A1* | 10/2015 | Huang | ............... | H02S 10/10 |
| | | | | 307/26 |
| 2017/0368949 A1* | 12/2017 | Layden | ............... | B60L 53/11 |

* cited by examiner

Fig. 4

Side View

| Solid Storage Component (Exterior Space) 520 | Discharge Storage Component (Non-Solid) (Interior Space) (~ Fig. 3 Tank 10) 505 | Solid Storage Component (Exterior Space) 520 |
|---|---|---|
| | Valve for Discharge Storage Loading/Unloading 525.1 (rear access) | Valve for Discharge Storage Loading/Unloading 525.3 (side access) |
| Solid Storage Component (Exterior Space) 520 | Charge Storage Component (Non-Solid) (~ Fig. 3 Tank 30) (Interior Space) 510 | Solid Storage Component (Exterior Space) 520 |
| | Valve for Charge Storage Loading/Unloading 525.2 (rear access) | Valve for Charge Storage Loading/Unloading 525.4 (side access) |

Vehicle Transportation Equipment 690

Wheel 689          Wheel 689

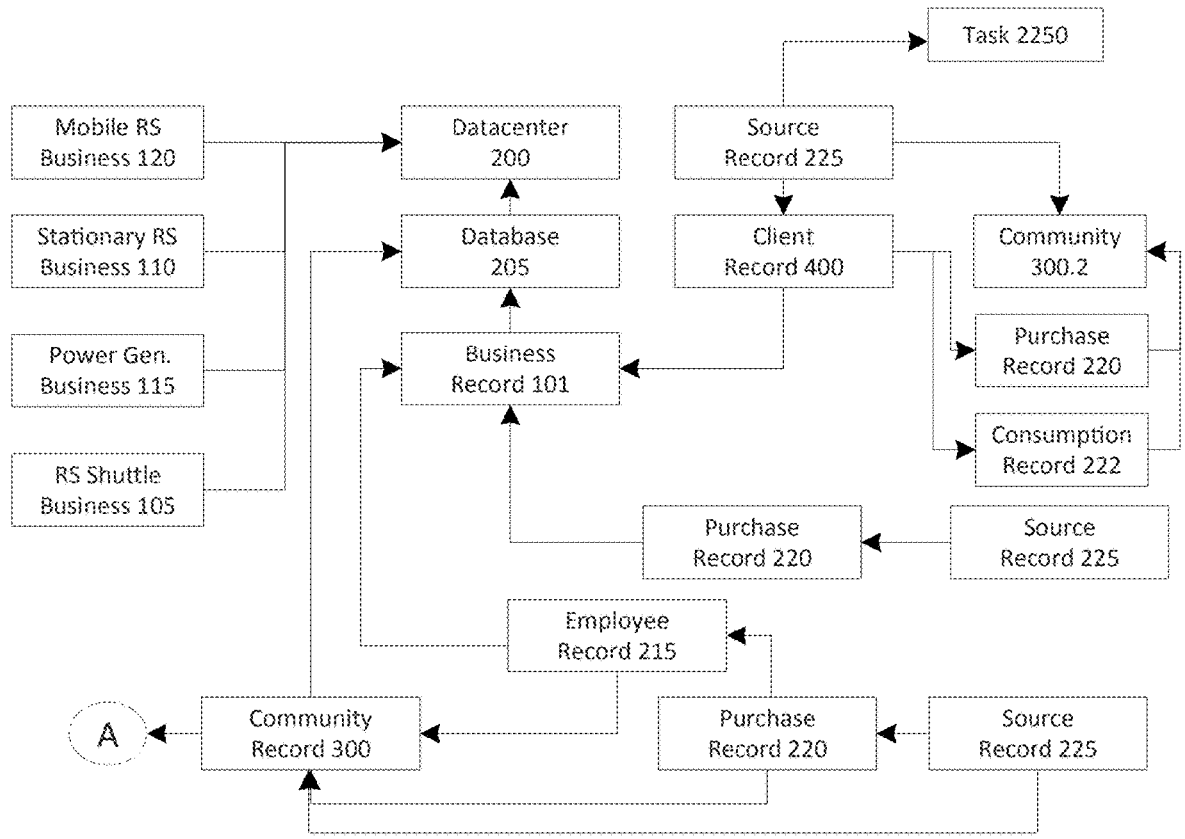

Fig. 15
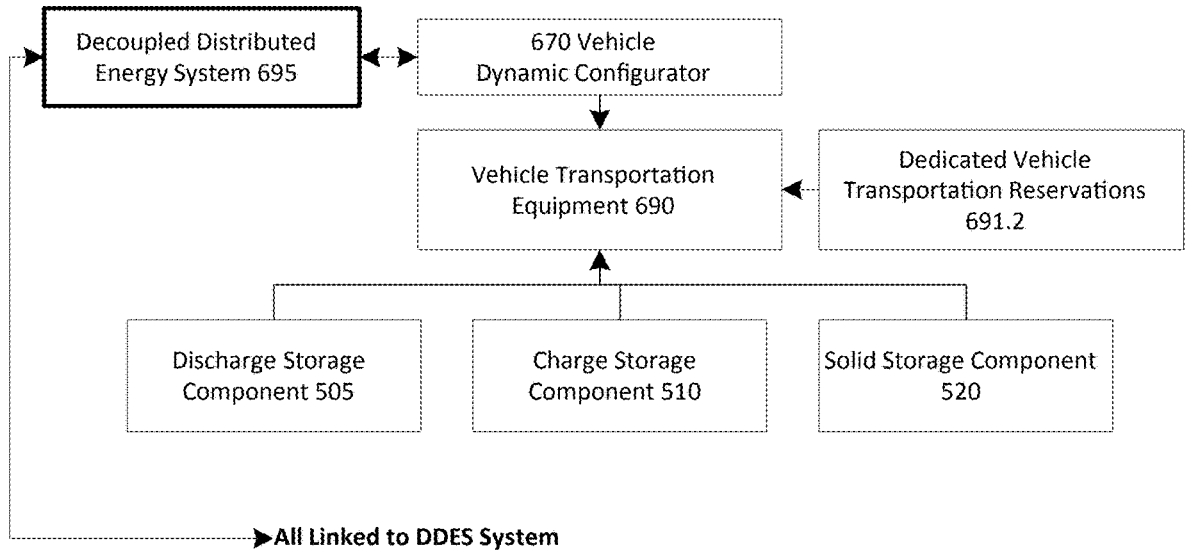
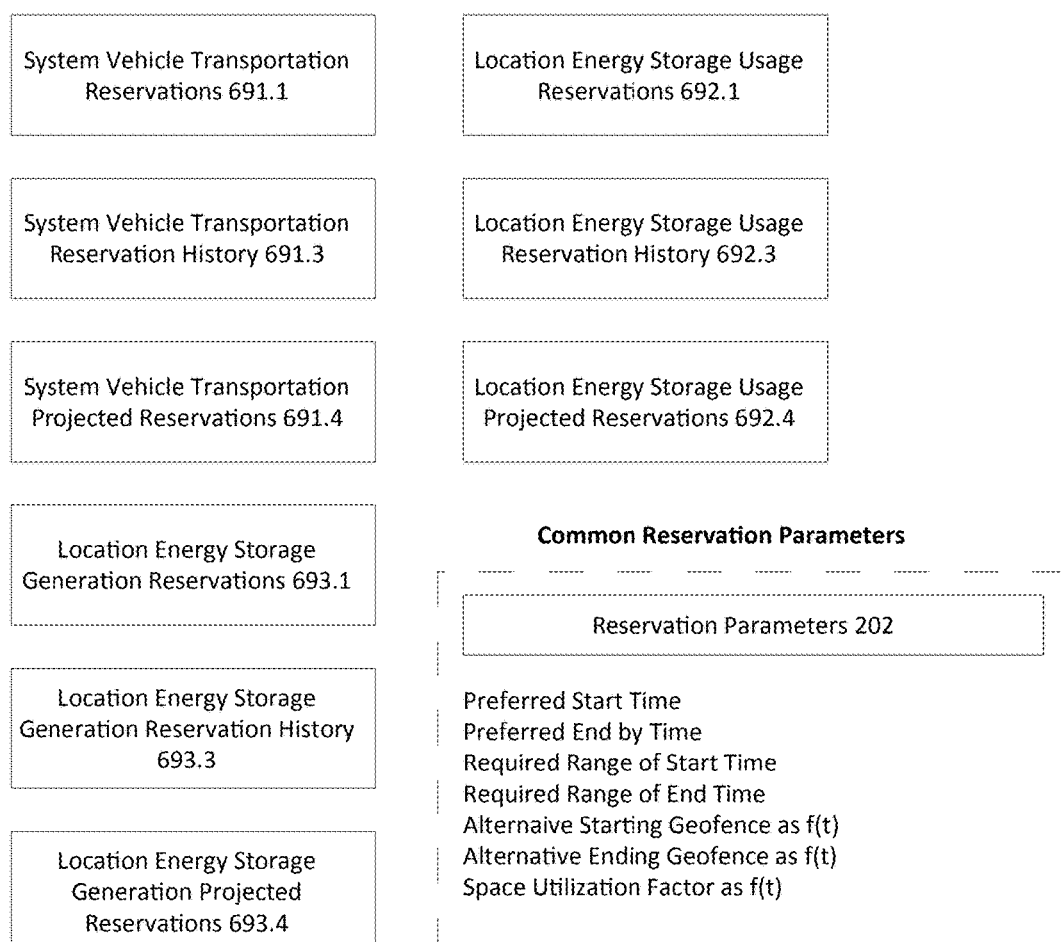

Penalty Parameters for each location: (inclusive of duration and charge as a f(t), peak, off-peak):

1) Vehicle missing reservation at any location inclusive of charging, discharging, or 3rd location 2) Delivery missing reservation at discharging location

Penalty:

Vehicle Reservation Drop-off Delay as f(t, Vehicle ID, Vehicle Type)

Multipurpose Cargo Drop-off Delay as f(t, Cargo ID, Cargo Type)

Multipurpose Cargo Pickup Delay as f(t, Cargo ID, Cargo Type)

Unload Charge Drop-off Delay as f(t, Location ID, Location Type)

Recharge Pickup Delay as f(t, RS ID, RS Type)

Fig. 31

| Energy Storage Assets | Current Location | Current Charge State (kWh) | Full Charge State (kWh) | Projected Charge Rate per hour | Projected Time to Full Charge State at ETD (hours) |
|---|---|---|---|---|---|
| Battery 1 | 1 | 3 | 10 | 2 | 3.50 |
| Battery 2 | 1 | 1 | 8 | 1.5 | 4.67 |
| Battery 3 | 1 | 2 | 10 | 2 | 4.00 |
| Battery 4 | 2 | 3 | 10 | 2 | 3.50 |
| Battery 5 | 2 | 4 | 5 | 1 | 1.00 |
| Battery 6 | 3 | 2 | 5 | 1 | 3.00 |
| Battery 7 | 3 | 4 | 20 | 7 | 2.29 |
| Battery 8 | 3 | 6 | 20 | 7 | 2.00 |

| Locations | Historic Energy Use | Projected Energy Use | Real-Time Energy Use | Historic Demand Use | Projected Demand Use | Real-Time Demand Use | In-Route Time to Location x (hours) | Time of Peak Demand Required (hh:mm) | Charge State Required at ETA (kWh) |
|---|---|---|---|---|---|---|---|---|---|
| 1 | f(t,1,h,e) | f(t,1,p,e) | f(t,1,r,e) | f(t,1,h,d) | f(t,1,p,d) | f(t,1,r,d) | f(t,x,h,(2..6)) | 13:00 | 12 |
| 2 | f(t,2,h,e) | f(t,2,p,e) | f(t,2,r,e) | f(t,2,h,d) | f(t,2,p,d) | f(t,2,r,d) | f(t,x,h,(1,3..6)) | 14:00 | 5 |
| 3 | f(t,3,h,e) | f(t,3,p,e) | f(t,3,r,e) | f(t,3,h,d) | f(t,3,p,d) | f(t,3,r,d) | f(t,x,h,(1..2,4..6)) | 3:00 | 20 |
| 4 | f(t,4,h,e) | f(t,4,p,e) | f(t,4,r,e) | f(t,4,h,d) | f(t,4,p,d) | f(t,4,r,d) | f(t,x,h,(1..3,5..6)) | 5:00 | 5 |
| 5 | f(t,5,h,e) | f(t,5,p,e) | f(t,5,r,e) | f(t,5,h,d) | f(t,5,p,d) | f(t,5,r,d) | f(t,x,h,(1..4, 6)) | 22:00 | 30 |
| 6 | f(t,6,h,e) | f(t,6,p,e) | f(t,6,r,e) | f(t,6,h,d) | f(t,6,p,d) | f(t,6,r,d) | f(t,x,h,(1..5)) | 23:00 | 15 |

| Vehicle Assets | Current Location | Current On-Board Charge State (kWh) | Full Charge State (kWh) | Projected Charge Rate per hour | Projected Time to Full Charge State at ETD (hours) | Incremental In-Route Energy (kWh / mile) | Primary Cargo Energy Storage Capacity (kWh) | Cargo Non-Energy Storage Capacity (m3) |
|---|---|---|---|---|---|---|---|---|
| 1 | 1 | 3 | 40 | 10 | 3.70 | 0.25 | 500 | 0.5 |
| 2 | 1 | 1 | 40 | 10 | 3.90 | 0.25 | 500 | 0.4 |
| 3 | 2 | 2 | 40 | 10 | 3.80 | 0.25 | 500 | 0.4 |
| 4 | 2 | 3 | 60 | 30 | 1.90 | 0.5 | 1000 | 1 |
| 5 | 3 | 4 | 60 | 30 | 1.87 | 0.5 | 1000 | 1 |
| 6 | 3 | 2 | 80 | 50 | 1.56 | 0.6 | 1500 | 2 |
| 7 | 3 | 4 | 20 | 10 | 1.60 | 0.15 | 250 | 0.25 |

| Cargo Asset | Current Inventory | Ordered Items | Real-Time Energy Use | Physical Space (m3) | Weight (kg) | Storage Conditions | Stacking Limitations | Receiving Conditions | Max Receiving Storage (hours) |
|---|---|---|---|---|---|---|---|---|---|
| 1 | f(t,1..x) | f(t,1..x) | f(t,1..x) | f(t,1..x) | f(t,1..x) | f(t,1..x) | f(t,1..x) | f(t,1..x) | f(t,1..x) |
| 2 | f(t,1..x) | f(t,1..x) | f(t,1..x) | f(t,1..x) | f(t,1..x) | f(t,1..x) | f(t,1..x) | f(t,1..x) | f(t,1..x) |
| 3 | f(t,1..x) | f(t,1..x) | f(t,1..x) | f(t,1..x) | f(t,1..x) | f(t,1..x) | f(t,1..x) | f(t,1..x) | f(t,1..x) |
| 4 | f(t,1..x) | f(t,1..x) | f(t,1..x) | f(t,1..x) | f(t,1..x) | f(t,1..x) | f(t,1..x) | f(t,1..x) | f(t,1..x) |
| 5 | f(t,1..x) | f(t,1..x) | f(t,1..x) | f(t,1..x) | f(t,1..x) | f(t,1..x) | f(t,1..x) | f(t,1..x) | f(t,1..x) |
| 6 | f(t,1..x) | f(t,1..x) | f(t,1..x) | f(t,1..x) | f(t,1..x) | f(t,1..x) | f(t,1..x) | f(t,1..x) | f(t,1..x) |

DISTRIBUTED AND DECOUPLED CHARGING AND DISCHARGING ENERGY STORAGE SYSTEM

This patent document contains material subject to copyright protection. The copyright owner, also the inventor, has no objection to the reproduction of this patent document or any related materials, as they appear in the files of the Patent and Trademark Office of the United States or any other country, but otherwise reserves all rights whatsoever.

CROSS-REFERENCE TO RELATED APPLICATIONS

This application claims the benefit of patent application U.S. Ser. No. 16/908,403 filed on Jun. 22, 2020 titled "Distributed and Decoupled Charging and Discharging Energy Storage System", and hereby incorporated by reference in their entirety.

FIELD OF INVENTION

The present invention relates to an energy storage system having decoupled and distributed charging and discharging to at least two locations in which charging, and discharging are primarily separated with connectivity by a vehicle preferably utilizing a common and transferable energy storage medium or charging co-product or byproduct to increase the utilization rate of both the vehicle and energy storage to accelerate financial and economic returns.

BACKGROUND OF INVENTION

Prior art includes the utilization of electric vehicles as a portion of a distributed grid yet does not obtain any secondary benefits or increase in utilization factors to lead to accelerated financial returns. This embodiment solely bypasses the transmission lines of the traditional grid. In fact, its operations of discharging at the second location requires the vehicle to not be utilized as a vehicle but rather solely a dispatched energy storage system, which is not economically particularly when the vehicle is autonomous or semi-autonomous as the bulk of the vehicle's asset cost is being dormant at such a time. In fact, the prior art prioritizes the dispatched location based on the secondary function of the vehicle being an energy storage (i.e., battery) dispatcher and makes no determination of the second location based on a primary vehicle purpose being logistics of a cargo or people from a first location to a second location.

Other prior art includes solely distributed stationary energy storage systems in which the charging and discharging take place at the same location and therefore solely realize the time differential between peak and off-peak rate structures without having any secondary benefits or increase in utilization factors. In fact, this scenario doesn't even bypass the transmission lines of the traditional grid therefore leading to a traditional once a day demand reduction.

A need for an energy storage system that increases the rate of charging/discharging cycles to multiple times per day, increases the utilization rate of an energy storage dispatch vehicle in terms of both primary logistics (i.e., NOT energy storage discharging) and secondary logistics where the discharging at the second location is independent and not necessarily concurrent with the then present location of the vehicle.

SUMMARY OF INVENTION

The present invention is a distributed and decoupled energy storage system leveraging preferably a universal charged media operable in both stationary and mobile assets. It includes additional aspects of the invention to optimize the execution of the system ranging from design and control execution of integral components to distribute the charged media.

An object of the invention is to significantly increase the daily cycles of charge/discharge in order to reduce the time duration required to achieve a financial return of capital.

Yet another object of the invention is to significantly increase the value of each charge/discharge cycle by leveraging a charging co-product or byproduct, notably respectively oxygen during the battery recharging cycle (particularly for a metal air battery) or carbon dioxide "CO2" product for sequestration, greenhouse, or fuel growth such as algae at the point of primary energy generation (i.e., power plant from biofuels, or fossil fuels).

A further object of the invention is to decouple the charging/discharging of the battery between at least one of oxygen consumption from battery charging, and/or charging location being different than the discharging location.

Another decoupling embodiment is from the oxygen consumption and the electrical consumption at the site in which oxygen is being consumed. In particular where the charging location and discharging location are not identical, the availability of autonomous (or semi-autonomous) vehicles as determined by a dispatch system for autonomous vehicles in combination with an electricity consumption projection at potential candidate second locations having a projected discharge time as a function of time "f(t)" for each of the candidate second locations.

Yet another object of the invention is to manage the dispatch of the charged energy storage for placement into an aggregate sustainable community flow battery electrolyte inventory to maximize the financial displacement of otherwise grid electricity (i.e., peak demand charges).

Another embodiment of this invention is its relevance to virtually all forms of energy storage, particularly including long-term thermal storage for both hot and cold operating temperatures which can take place through thermochemical or phase-change (a.k.a. PCM) transformation.

Yet another aspect of the invention is the vehicle transportation equipment not only transports at least one of the energy storage product, energy storage co-product of charging, or energy storage waste product of discharging BUT also can require and therefore consume at least a portion of the primary energy within the energy storage, or energy storage co-product of either charging or discharging.

Yet another aspect of the invention is for the dispatch vehicle, also referred to as transport vehicle, has a two-part storage component (also referred hereinafter as a tank-in-tank storage) for instances in which the co-product or by-product is not a solid and is returnable in its discharged condition. A fundamental advantage of the tank-in-tank solution is such that the preferred embodiment of the invention, the provision of charged media is approximately equal (accounting for relatively minimal density variations between the charged and discharged state) to the return of the discharged media.

Yet another embodiment of the invention is the dynamic configuration of a vehicle transport as utilized for dispatch for optimal volumetric efficiency and access effectiveness particularly for autonomous or semi-autonomous vehicles such that a preferable removable liquid containing tank occupies the internal portion of the vehicle while solid (i.e., non-liquid unless the liquid is in on-bulk and within a self-contained solid package) components are in the external-facing portion of the vehicle.

A further embodiment of the invention is standardization of solid component packaging so as to optimize loading/unloading accessibility particularly in autonomous vehicles by the use of returnable packaging systems.

Yet another aspect of the invention is to decouple the amortization of the relatively limited cycle lifetime operation of the power conversion equipment from the long-life electrolyte of a flow battery.

Another aspect of the invention is the significant reduction of transport costs by reducing the total volume requirements needing to be moved from a first location (Charged) to a second location (Discharged) while bypassing the utilization of the transmission grid (which is rapidly becoming a pricing mechanism where demand charges are outweighing energy charges).

Yet another object of the invention is the further advantage of mobilizing power consumer assets (which can include energy recharging) particularly when these assets are solely direct current "DC" assets is the avoidance of backup charges often included in utility rate structure when traditional power generation equipment is placed.

Another object of the invention is the utilization of an at least triple location authentication process for the dispatch vehicle transport to enable transfer of transported item(s).

All of the aforementioned features of the invention fundamentally recognize the distinction of a decoupled energy storage system that leverages the gains realized by separating the utilization of charged media with its co-products and byproducts in both the time and space domains with the discharging of the charged media compatible with both mobile and stationary assets.

BRIEF DESCRIPTION OF DRAWINGS

FIG. 4 is a side view of the vehicle transport component

FIG. 7 is a data structure view of the DDES FIG. 8 is a parametric table for an indicative object for each location within the DDES network, particularly for each repowering station FIG. 15 is a component view of DDES extending feature set to the vehicle dynamic configurator

FIG. 31 is a collection of representative data tables used within implementation of energy storage assets, locations within the system, vehicles within the system, and cargo requiring movements between locations

DEFINITIONS

Figure 1:
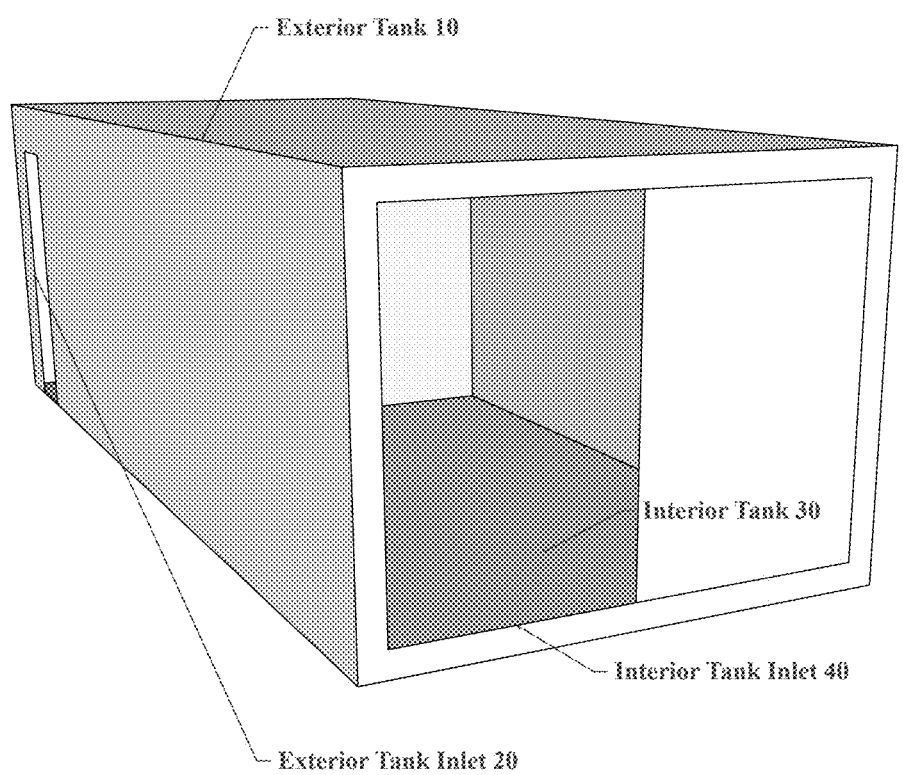
FIG. 1 is an external view of the tank-in-tank component "T2"

The term "energy storage" is a material that stores energy, whether it be thermal or electrical, such that the primary production of the stored energy form "primary energy" is directed into the energy storage via charging and is subsequently at a non-concurrent time discharged for ultimate end-use consumption of the stored energy subsequent. The transferring of the primary energy as stored energy (i.e., charged media) from the energy storage location to another device to decouple the ultimate consumption of the primary energy at a second location occurs at a "repowering station" hereinafter also abbreviated as "RS".

The term return on investment "ROI", as known in the financial art, is deficient for most energy storage technologies as the payback is too long in comparison to many entities payback threshold as energy storage devices and therefore their payback is limited due to the number of charging and discharging cycles required or able to be provided on a daily basis (and even then most utilities only have a 5-day period in which a peak and off-peak differential occurs).

DETAILED DESCRIPTION OF INVENTION

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

The invention significantly increases the daily cycles of charge/discharge in order to reduce the time duration required to achieve a financial return not only at the component level but most importantly at the system level.

Turning to FIG. 1, FIG. 1 is an external view of the preferred tank-in-tank "T2" for the transport of the charged and discharged media. The preferred charged media has no adverse impact in the event of an accidental mixing of the charged with the discharged media. The exterior tank 10 has a fluid inlet shown as exterior tank inlet 20. And the interior tank 30 also has a fluid inlet shown as interior tank inlet 40. Though shown in the horizontal position, it is recognized that the invention can be practiced in virtually any orientation and in virtually any shape in so far as the interior tank has flexibility to vary its own volume in accordance to its liquid contents. It is understood that in virtually all embodiments the density of the charged media is approximately equal to the discharged media, yet the invention anticipates moderate density differentials between the two charged and discharged states requiring the exterior tank to have a higher volume than the interior tank therefore dictating that the lower volumetric density media occupy the exterior tank and the higher volumetric density media occupy the interior tank.

Figure 2:
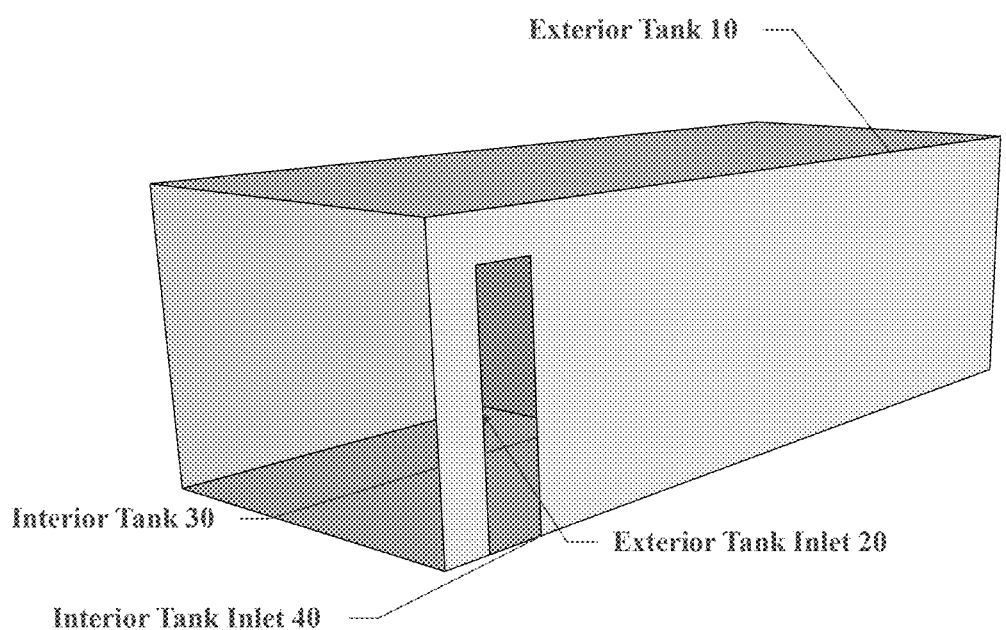
FIG. 2 is another external view of T2 showing an interior view as well

Turning to FIG. 2, FIG. 2 is another external view of the T2 this time depicting how the interior tank 30 has a "moving" face to vary the volume It occupies relative to the exterior tank 10 volume. The view is through the exterior tank inlet 20, which in reality will be significantly smaller as its size is dictated by valves (or other means as known in the art to enable transfer of flowing media) and supporting piping for the inflow and outflow of the stored media.

Figure 3:
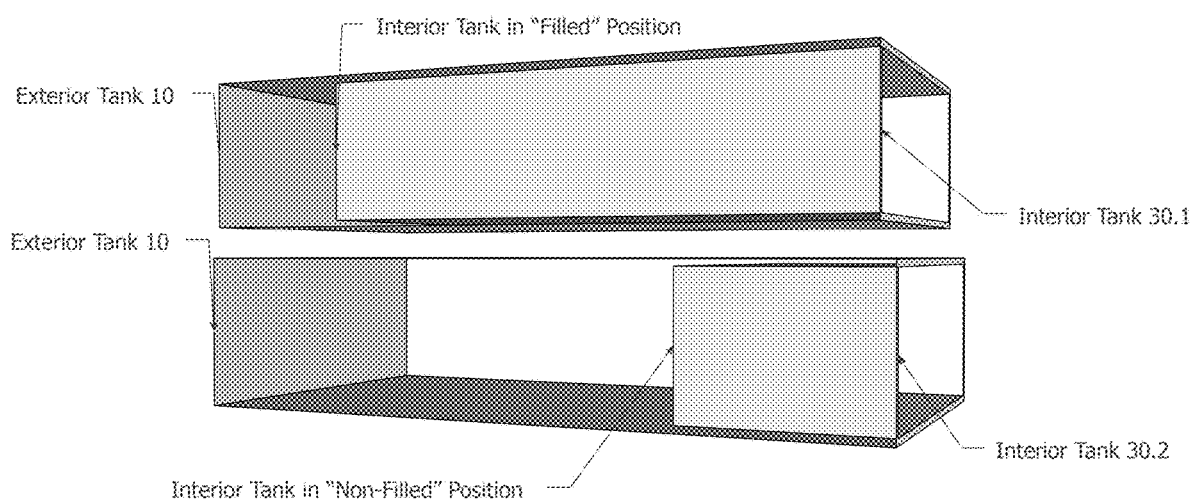
FIG. 3 is another external view of T2 with one external surface removed

Turning to FIG. 3, FIG. 3 is yet another external view of the T2 this time depicting how the interior tank 30.1 in the filled instance, relative to the interior tank 30.2 in the non-filled instance. The exterior tank 10 has the closest (to the viewer) surface removed to clearly show the two instances.

It is recognized that the tank-in-tank embodiment can even be used for scenarios such as clean water dispatch and subsequent dirty water return, even when the dirty water is virtually immediately recycled post an onboard water treatment system. Virtually all mobile equipment has volume constraints therefore mobile (or roaming) wet cleaning processes benefit from the tank-in-tank. Another embodiment is onboard separations where the "dirty" non-separated liquid portion is within a first tank portion and the second portion is one of the separated liquid portions such that the total volume is the collective individual volumes of the tank-in-tank aggregate. Applications that are requiring waste treatment can in this means be resupplied with clean product for subsequent return trip bringing back the non-clean product.

Turning to FIG. 4, FIG. 4 is a side view representation of a transport vehicle for the dispatch and delivery of charged media from a first location to a second location, and the return of the discharged media from a second location to either the first location or any other location within the network capable of recharging (or solely partially transporting for eventual charging) the discharged media. The dispatch vehicle (also referred to a vehicle transportation equipment 690 or "vehicle transport" or simply "vehicle having at least two wheels 689 though typically at least four given the nature of the media being transported) has a two-part storage component as depicted with the discharge storage component 505 tank and a separate charge storage component 510 tank. It is understood that the preferred embodiment utilizes the aforementioned T2 aspect of the invention, but it is not required. The media is supplied or returned via valve for charge storage 525.2 when from the rear or front (and in structural communication with the charge storage 510) so as to enable ease of T2 removal from the vehicle during dynamic vehicle reconfiguration, or respectively valve for charge storage 525.4 when from the side of the vehicle where dynamic vehicle reconfiguration becomes rather impractical. The charged and discharged fluid media is preferably surrounded by exterior accessible solid storage component(s) 520, including the structural elements required to support the storage of the yet further preferred returnable package system modules (not shown). The standardization of solid component packaging optimizes loading/unloading accessibility particularly in autonomous vehicles by the use of the aforementioned returnable packaging systems.

Furthermore, the preferred embodiment depicts the non-solid (i.e., liquid) tanks being within the interior portion of the vehicle, though understood within the scope of the invention to not be a requirement. For instances in which the co-product or by-product is not a solid and is returnable in its discharged condition, the vehicle can also be utilized for transport of the co-product or by-product. The key aspect of this feature is that the co-product or by-product of charging is not inherently utilized at the charging location, and vice versa for discharging location. A fundamental advantage of the T2 solution is such that the preferred embodiment of the invention, the provision of charged media is approximately equal (accounting for relatively minimal density variations between the charged and discharged state) to the return of the discharged media.

Without the use of the T2, the volumetric efficiency of the dispatch vehicle is approximately reduced in half, as either the dispatch vehicle requires an approximately equal volume for the return of discharged media or simply operates with voids in the charged media storage tank (equivalent to the volume already dispatched), or even worst requires a second dispatch vehicle to return the discharged media for subsequent use. A significant benefit of this feature is maximum volumetric efficiency and access effectiveness greater than 5% (and preferably greater than 20%) as compared to any other configuration of liquid and solid component storage within the transport vehicle. Another advantage is the enhanced crash-safety as both the solid components and the structural elements supporting the solid storage components provide energy absorption prior to the liquid storage components being damaged and penetrated. A further feature of this embodiment is placement of valves for discharge or loading of the liquid relatively external of the interior tanks, and more particularly preferred with access on the front or rear of the vehicle such that the valves are removable with the tanks themselves for vehicle reconfiguration.

In one exemplary, the two-part storage component dynamically varies such that the distribution of exemplary charged electrolyte is approximately equal to the collection of exemplary discharged electrolyte to approximately double the volume efficiency of the vehicle transportation equipment. The optimal configuration of the vehicle transportation equipment is such that the non-solid storage is within the inner portions of the vehicle so as to minimize adverse impact of access on the exterior portions of solid storage. The increased utilization factor of the vehicle transportation equipment significantly reduces the amortization rate of the vehicle transportation equipment for all of its collective missions and not therefore provides economic viability of decoupling the location of charging from discharging so as to optimize the value realized from the co-product(s) of charging and/or discharging.

Figure 11:
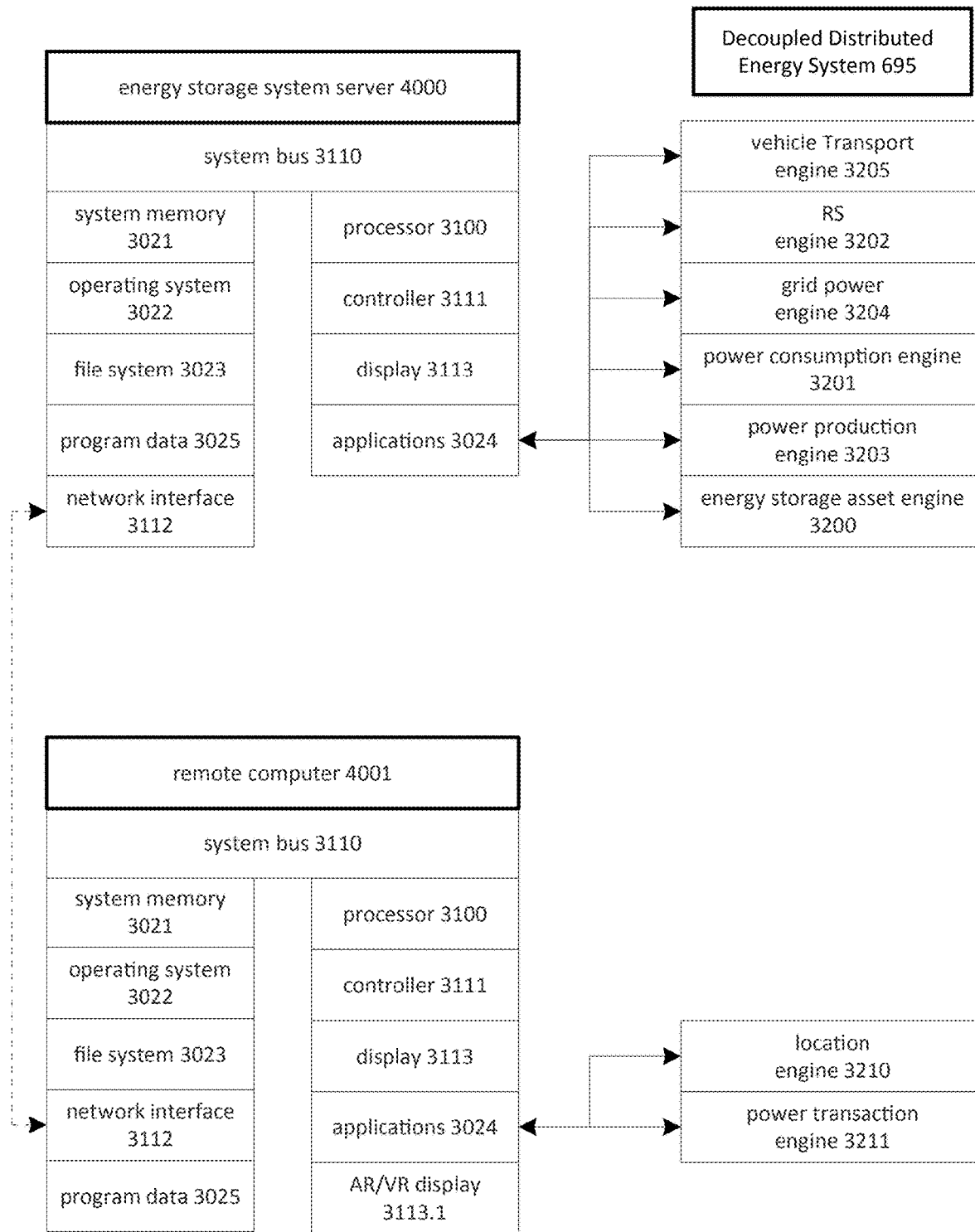
FIG. 11 is a hardware and software component view for the DDES system

Another exemplary, though not shown, is the dynamic configuration of the vehicle as utilized for dispatch for optimal volumetric efficiency and access effectiveness particularly for autonomous or semi-autonomous vehicles such that a preferable removable liquid containing tank occupies the internal portion of the vehicle while solid (i.e., non-liquid unless the liquid is in on-bulk and within a self-contained solid package) components are in the external-facing portion of the vehicle. It is optimal, and within the scope of the invention, such that upon vehicle arriving at its destination the system determines that additional charged media is dispatched as the uncertainty of charged media consumption (to provide motive energy in moving the vehicle i.e., electric vehicle using compatible flow battery) during the trip from a first location to a second location has been eliminated and now only the uncertainty of the vehicle moving to a next (preferably the closest in terms of routing otherwise reserved for the vehicle to an RS on or with lowest interruption) to the next vehicle destination energy consumption of on-board charged media. The system utilizes a vehicle transport engine 3205 (as shown in FIG. 11) being a control system software with associated execution hardware. It is a primary goal of the DDES to maximize the vehicle mobility utilization factor, which is the proportion of time in which the vehicle is moving from a first location to a second location. A more specific and further optimization is for the mobility utilization factor to maximize the proportion of time in which the vehicle Is serving primary logistics purpose (i.e., revenue generating logistics services, as opposed to solely moving charged energy storage from a first location to a second location where the discharging of charged energy storage takes place at that same second location). Vehicles, particularly autonomous vehicles are expensive assets with expensive controls and sensors enabling the vehicle to be mobile. Therefore, it is disadvantageous for the vehicle to discharge predominantly or exclusively in a non-mobile space.

Figure 5:
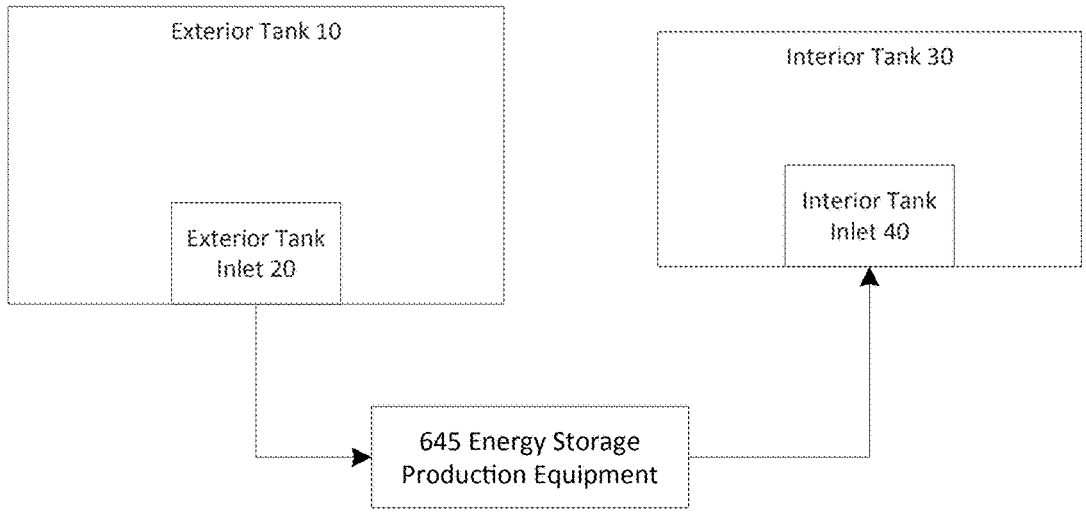
FIG. 5 is component view for the energy storage media transfer from charged to discharged (or vice-versa) state through energy storage production equipment

Turning to FIG. 5, FIG. 5 depicts a process flow for an energy storage media being transferred from the external (exterior and external are used interchangeably) tank 10 through the exterior tank inlet 20 through fluid communication in which the energy storage production equipment 645 regenerates/recharges discharged media into charged media with flow going into the interior tank 30 in fluid communication through the interior tank inlet 40. It is understood that the flow could in fact start from the opposite interior tank to the exterior tank, however there is an additional safety aspect associated with having the charged (therefore more energetic state) media in the interior tank such that a potential crash (or just a leak) doesn't leave the tank itself. The embodiment as noted is exemplary of what would be done leveraging the T2 features such as: 1) cleaning water, 2) making ice, 3) recharging spent/discharged electrolyte on a hybrid vehicle resulting from braking energy recovery, 4) or simply recharging at an RS.

Figure 6:
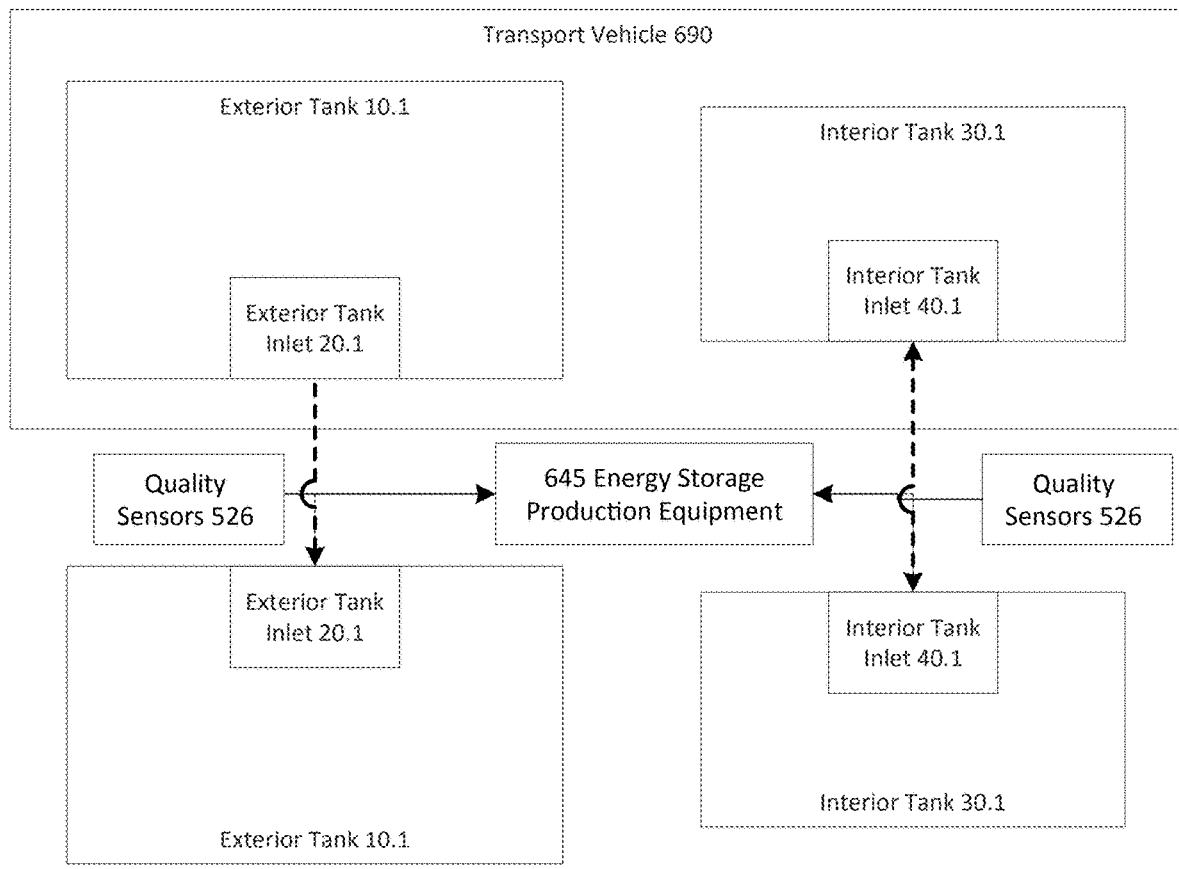
FIG. 6 is another component view for the transfer of energy storage media with quality control components

Turning to FIG. 6, FIG. 6 which is similar to FIG. 5 further incorporates the quality control and security features required to ensure full inventory control of both charged and discharged media. In this instance charged media is transferred from the transport vehicle 690's exterior tank 10.1 through the exterior tank inlet (i.e., valve for fluid communication) 20.1 to another device in which the fluid is being transferred so as to release the vehicle 690 from having to remain where the charged media is being consumed. Similarly, the spent or discharged media flows from the interior tank 30.1 in fluid communication with the interior tank inlet 40.1 to the interior tank 30.1 within the vehicle 690. This embodiment is descriptive of when the transfer takes place from a first T2 to a second T2, though it is understood that either or both can be standard non-tank-in-tank storage containers. In all instances the media flows through at least one sensor 526 within the category of sensors ensuring quality and mass-flow control of the media, with one specific instance of a sensor being verification of dilution (so as to minimize the potential for returning less valuable or worthless water), verification of charge state, verification of absence of contaminants, etc.

A fundamental feature of the invention is to significantly increase the value of each charge/discharge cycle by leveraging a charging co-product or byproduct, notably respectively oxygen during the battery recharging cycle (particularly for a metal air battery) or carbon dioxide "CO2" product for sequestration, greenhouse, or fuel growth such as algae at the point of primary energy generation (i.e., power plant from biofuels, or fossil fuels). This is best achieved by decoupling the charging/discharging of the energy storage component (e.g., battery) between at least one of oxygen consumption from battery charging, and/or charging location being different than the discharging location.

Another decoupling embodiment is from the oxygen consumption and the electrical consumption at the site in which oxygen is being consumed. In particular where the charging location and discharging location are not identical, the availability of autonomous (or semi-autonomous) vehicles as determined by a dispatch system for autonomous vehicles in combination with an electricity consumption projection at a range of potential second location being a discharging location as a function of time "f(t)".

Embodiments of the charging/discharging system are executed and coordinated through a controller that in one embodiment utilizes a function of the combination of a) oxygen inventory and oxygen consumption projection as f(t), b) charging of battery electricity consumption projection as f(t), c) rate structure for oxygen consumption (including non-battery produced oxygen), d) battery charged/discharged status including predicted as a f(t), and e) rate structure for electricity consumption and electricity consumption projection as a f(t) at the battery charging location. Additional optional functions include: a) rate structure for electricity consumption and electricity consumption projection as a f(t) at the other non-battery charging location(s). It is understood that the invention anticipates that energy storage can alternatively include ice (i.e., cold thermal storage) or hot thermal storage (preferably short-term, particularly preferred as long-term).

It is a fundamental feature of the inventive system to overcome the deficiency of traditional flow battery electrolyte management systems where the problem is that the payback for electrical energy storage is too high as the value obtained is largely dominated by peak demand charge reduction and NOT differential in energy costs between peak and off-peak. Therefore, the invention is a decoupled management system that maximizes the financial return on the electrolyte by transporting the electrolyte away from relatively dormant locations to relatively more active locations. A further object of the invention is to maximize the users of the flow battery electrolyte (particularly either higher density electrolyte such that it is easier and more tangible to move the electrolyte decoupled from the balance of the battery system) within a geographic geofence. The offsetting locations are ideally comprised of locations having fundamentally non-overlapping periods of peak demand. It is further an object of the invention to standardize on the flow battery throughout the systems in which it is deployed, such that the system energy density is maximized in combination with financial ROI, and not just the energy density of the battery. One exemplary instance is that a sustainable community having a "universal" electrolyte has significantly more "charging" points throughout the geofence which leads to a reduction of range requirements (by at least 10%, preferably at least 25%, particularly preferred at least 50%). The flow battery requirement is essential for electric vehicles as an easily transferable "charge" that is both rapid and more importantly enables each "electrolyte station" to reduce its own peak demand charge. Refueling, which is currently gasoline or diesel, is very intermittent. As this refueling transitions from fossil fuel to electricity it is imperative to address the full cost of electricity distribution which is becoming more dominated by peak charges. In this scenario, the demand charges of each refueling/charging station becomes prohibitively high with the only "practical" method of first charging a first bank of batteries on a relatively continuous basis to then be discharged and rapidly charged to a second set of vehicle on-board batteries. This is not only increasing the capital costs of batteries (within the system) but also significantly increasing the electrical losses due to a second roundtrip of charging/discharging. This is entirely solved by the use of flow batteries. Another feature of the system also leverages flow battery such that the volume of charged flow battery electrolyte is independent of any battery depth of discharge, rate of charge, or rate of discharge.

The control system manages the dispatch of the charged energy storage for placement into an aggregate sustainable community flow battery electrolyte inventory to maximize the financial displacement of otherwise grid electricity (i.e., peak demand charges).

The management system utilizes the combination of transport costs to move electrolyte from a first location to a second location (and sometimes considering in fact a third location or beyond in which subsequent recharging and discharging events are anticipated/known), the penalty cost associated with "missing" the ability to not be utilized within the locations electricity requirements, and the revenue realized through the locations electricity consumption.

Another embodiment of this invention is its relevance to virtually all forms of energy storage, particularly including long-term thermal storage for both hot and cold operating temperatures which can take place through thermochemical or phase-change (a.k.a. PCM) transformation.

An essential feature of the system is the vehicle transportation equipment not only transporting at least one of the energy storage product, energy storage co-product of charging, or energy storage waste product of discharging BUT also preferably where the vehicle is entirely compatible with the same energy storage media (i.e., charged) for vehicle motive power as the consumer of the charged media as delivered through the present energy conversion device. The ability to consume at least a portion of the primary energy within the energy storage, or energy storage co-product of either charging or discharging is an important incremental revenue generating component to increase the financial return on investment while maintaining very high utilization factor of a least 50%, preferably at least 80% and particularly preferred of at least 92% of the energy generating equipment, the energy conversion equipment, and the vehicle transport equipment.

In order to achieve the highest level of utilization for the vehicle, it is an important feature of the invention for the vehicle transportation equipment to be capable of dynamic reconfiguration from a primary transport/logistics function of non-energy applications to a secondary transport/logistics function of distributed energy applications.

Yet another aspect of the invention is to decouple the amortization of the relatively limited cycle lifetime operation of the power conversion equipment from the long-life electrolyte of a flow battery. This has the benefit of reducing the upfront costs of energy storage to the end-user by separating the upfront acquisition to predominantly the power conversion equipment, which has a relatively higher life-cycle cost burden (at least 5% higher, and particularly at least 25%, and preferably at least 85%) as compared to the electrolyte. The separation of the electrolyte also has the benefit of working within a universal fleet supporting a wide range of charge rates and discharge rates as supported by the multiple power conversion equipment of the flow battery, thus virtually eliminating the systems requirement to track degradation of the "fleet" asset being the electrolyte. The predominant pricing factor for the electrolyte is the time of deployment and ensuring the return of the electrolyte in a non-diluted and unaltered status, NOT the number of cycles or depth of discharge as that asset is either not relevant or at best is a separate pricing structure for the power conversion equipment.

Another aspect of the invention is the significant reduction of transport costs by reducing the total volume requirements needing to be moved from a first location (Charged) to a second location (Discharged) while bypassing the utilization of the transmission grid (which is rapidly becoming a pricing mechanism where demand charges are outweighing energy charges).

The transport costs are further being reduced by the significant reduction of labor costs by the utilization of autonomous vehicles (or semi-autonomous, or dynamic configuration of non-autonomous vehicles within a fleet i.e., shared vehicle resource) that is essential to the practical economics of the inventive system. The transport practicality and/or costs associated with movement of charging co-products (e.g., oxygen or $CO_2$ from co-located power generation) also demands the decoupling of charging location from the discharge location to the largest extent possible. Given that demand charges are outweighing energy charges in most instances (approximately greater than 50%, and in many instances greater than 70%) especially as the intermittency of renewable energy increases where energy pricing can in fact become negative. The system manages the recharging of spent energy storage (e.g., electrolyte, ice, etc.) at non-primary RS locations by recognizing that as long as the peak demand change to date for the respective billing period (or at least peak demand ratchet charge period) the incremental cost of charging doesn't include the amortization of the demand charge BUT does include the less than optimal energy efficiency (starting from the power generation source) to the power conversion component efficiency (smaller systems frequently have lower energy efficiencies per unit of capacity, especially thermodynamic cycles including ice making equipment) AND the likely loss of benefits of co-products and/or byproduct utilization. The latter of benefits of co-products and/or byproduct utilization (e.g., oxygen harvesting, or $CO_2$ sequestration) can be greater than US$50 per ton which can translate into a cost differential of greater than US$0.05, preferably greater than US$0.10 and particularly preferred greater than US$0.15 which in many electricity service areas is significantly higher than the differential between peak and off-peak energy rates.

The further advantage of mobilizing power consumer assets (which can include energy recharging) particularly when these assets are solely direct current "DC" assets is the avoidance of backup charges often included in utility rate structure when traditional power generation equipment is placed.

Mobilized power consumer assets are virtually identical to equipment such as forklifts, backup UPS, etc. and not viewed from a rate structure as co-generation equipment. Therefore, the system issues distributed charging commands by incorporating co-product and/or byproduct cost benefit, logistics costs associated with movement of the energy storage assets from a first to a second location, status of charging at periods in which billable peak demand would not be altered, and projection of energy charges as a f(t) so as to compare current energy prices as compared to projected future energy prices WHILE also being during periods in which billable peak demand would not be altered.

Yet a distributed, decentralized, and decoupled system having valuable energy storage and power conversion equipment over a wide geography where security can't be precisely controlled within a fenced in environment creates significant security demands. Another inventive feature of the system is the utilization of an at least triple location authentication process for the dispatch vehicle transport to enable transfer of transported item(s).

The first location (which can be a defined first geofence), which occurs at a known and authorized item loading location (or geofence), of solid components or charged liquid (a.k.a. an RS) with a date-time stamped authorization (with a first expiration date-time) subject to at least two additional authentication points. The second location (which can be a defined second geofence), which must occur prior to the first expiration date-time, occurs at a known and authorized item discharge location (or geofence) and also issues a second date-time stamped authorization (with a second expiration date-time). The third location (which can be a defined third geofence) is a known location of a wireless transceiver which verifies the authentication of the first authorization and the second authorization having occurred prior to their respective expiration date-time prior to issuing and communicating to the vehicle commands to open (and regulate) valve (when liquid, or storage component lock) position to enable transfer of only specific authorized items. Failure of any of the three location authorizations prevents any item transfer, unless the vehicle transport returns to an RS within the logistics network and proceeds to a new set of at least triple location authentication process.

It is counter to obvious, and therefore novel, that an energy storage device that may have a lower energy density (and even a lower energy conversion efficiency) leads to a superior system solution as measured by parameters including higher net revenue, higher net profits, lower net CO2 emissions, and/or lower net fuel consumption. A system that produces a readily transportable energy storage component, energy storage by- or co-product of the energy storage component enables and achieves a higher system efficiency. It is understood that having a lower energy density or lower energy conversion efficiency is not necessary to realizing the benefits of the decoupled system.

The following examples are indicative of this benefit as realized by the inventive system:

1) Large-scale ice storage has a significantly better coefficient of performance as compared to multiple ice makers of lower capacity
2) Continuously (or at least significantly higher hours of operation) operating power production equipment at peak-efficiency load produces more energy efficiently and is particularly suited to occur at a location in which the majority (greater than 50%, or preferably greater than 80%) of waste heat is repurposed. Producing power at the same location in which a metal oxide battery produces oxygen while being charged enables higher thermodynamic cycle efficiencies to be obtained, while having significantly lower air mass flow requirements due to higher oxygen concentrations in the combustion air which in turn enables smaller waste heat recovery heat exchangers to be used (that accelerates the ROI and often becomes the turning point for financial/economic viability).
3) A charged electrolyte solution that is produced "centrally" at an all things equal larger power producer is more efficient, as per above, and enables a portable (i.e., decoupling) decentralized network of energy consumers using a common RS. Having more RS, particularly when the RS enables very rapid repowering/recharging within the decentralized network greatly reduces the range requirement of each transport vehicle within the network. Utilizing a common energy source enables the transport vehicle's inherent energy storage tank (or explicit cargo capable energy storage tank) to become a distributor of the energy source responding quickly to variations of energy requirement from the projected demand thus rapidly moving energy storage inventory to a more optimal location (while increasing the utilization factor for the transport vehicle, thus lowering its annual amortization rate per unit of distance traveled). A large number of RS also greatly reduces the "tank" energy storage size requirement, and more importantly greatly reduces the mass of the transport vehicle. Furthermore, use of a liquid electrolyte enables the system to dynamically alter the onboard storage requirements to more precisely match the predicted/projected demand thus optimizing and reducing the mass of the transport vehicle. The net result is that the electrolyte (i.e., an energy storage asset) results in a significantly (at least 5%, preferably at least 20%, and particularly preferred at least 50%) higher utilization factor resulting in an accelerated ROI (by at least 5%, preferably at least 20%, and particularly preferred at least 50%).

The decoupled distributed energy system "DDES" 695, though depicted in most detail as supporting the distribution of electrolyte (as energy source) from a flow battery, is recognized within the scope of the invention to be operable for virtually any type of battery (e.g., solid or liquid integral electrolyte, thermal hot or cold) such that charging of the energy source is designed to take place at a distinct location from the discharging of that same energy source.

The DDES can operate within an on-grid or off-grid (i.e., islanding mode) scenario. It is an important feature of the DDES within the on-grid scenario to issue charging commands at the remote stationary energy consumption equipment 1112 location for charging to occur such that the maximum peak demand is at or equal to the location's maximum rate demand (which can be established by the DDES, at the incurred maximum for the current billing period, or overridden by the DDES based on the location's maximum demand parameters). It is further a fundamental feature that the vehicle transportation equipment 690 preferentially utilizes the same energy source as the stationary energy consumption equipment 1112 to empower and move the vehicle transportation equipment 690 from a first location to a second location where an at least one second location is the location of the stationary energy consumption equipment 1112. It is understood, though less than optimal, that the vehicle transportation equipment (also simply referred to as "vehicle") 690 can have a distinct energy source and solely be utilized for the transport of the energy source to and from a first location to a second location. In the optimal scenario, the vehicle transports the energy source e.g., electrolyte concurrently on a scheduled trip in which the vehicle has another purpose (i.e., transport of the multipurpose cargo 598) for the same trip as a method to significantly reduce the incremental cost associated with the transport of the energy source. The multipurpose cargo 598 is optimally secured within the solid storage component 520 (and preferentially located within the vehicle's exterior space). A fundamental objective of the DDES is to maximize the load factor of each energy source distribution component, such that any electrical transmission wiring capacity is minimized to primarily operate at a "baseload" level on a more continuous basis and that the power conversion equipment 1111 at the same location as the stationary energy consumption equipment 1112 utilizes at least one period where the real-time energy consumption is less than the "baseload" level to locally recharge spent (i.e., discharged) electrolyte into renewed charged electrolyte. It is understood that each fixed location has a common equipment 599 "set" of components that include at least one charge (d) storage component 510, at least one discharge (d) storage component 505, and each of the aforementioned storage components has either a dedicated (or access to a shared) quality sensor(s) 526 and loading/unloading valve 525 into energy source storage. This scenario as represented by the energy source being an electrolyte, can within the scope of the invention be substituted for thermal energy source (e.g., ice) in an instance in which the real-time energy consumption is less than the "baseload" level and when the DDES predicts a future demand for cold thermal energy beyond what is currently in charged inventory. The energy source can also be in the form of a standard battery with integral electrolyte, whether that electrolyte be solid or liquid, though this method is not as practical as the electrolyte for a flow battery. However, there are fundamental advantages when the "standard battery" is a battery that co-produces oxygen when in the charging state. It is understood that all references to electrolyte (thus referring to energy source within flow batteries) can be replaced by any energy source (whether electrical or thermal) in so far as the energy source is capable of being charged at a first location and discharged at a second location, and that the energy source has minimal energy losses as it travels via a vehicle between the first (i.e., charging) and second (i.e., discharging) locations.

It is understood in this invention, the metal-oxide battery is interchangeable with an electrolyzer as an electrochemical electricity consuming reactor (i.e., consumer of electricity) that transforms organic reactants via an electrochemical reaction such as in any battery, though in this preferred embodiment an organic electrochemical reaction transforming the organic reactants that also produce hydrogen (and preferably also oxygen) as a product including transforming the organic reactants into resulting organic substances (like the metal-oxide battery electrochemically producing oxygen and chemically reduced metal). A particularly preferable electrochemical reaction also concurrently produces oxygen with the hydrogen as a byproduct, in which case the electrochemical reaction consumes less than 30 kWh per resulting kg of hydrogen (and preferred less than 20 kWh per kg of hydrogen, and particularly preferred less than 15 kWh per kg of hydrogen, and specifically preferred less than 12 kWh per kg of hydrogen) as the electrochemical "charging" rate (i.e., electrochemical electricity consuming rate). Subsequent utilization of the produced hydrogen (i.e., to become the second location fuel source and stored as an energy storage asset at the first location for subsequent transport to the second location for production of power or electricity at the second location) is referred to as the electrochemical "discharging" rate (i.e., electrochemical energy producing rate). The electrochemical electricity consuming reactor (e.g., electrolyzer) consumes electricity for the resulting organic chemical reaction at the first location (where energy including as electricity is still consumed just like the metal oxide battery for charging) is used to produce an at least partially deoxygenated organic chemical(s) and/or hydrogen analogous to a subsequent discharged electrolyte post energy including energy produced by the resulting hydrogen produced for energy generation producing via hydrogen combustion or direct fuel cell (i.e., in a second electrochemical reaction) at the second location. It is understood that any reference of charged electrolyte can be interchanged with an electrochemically modified organic matter with resulting co-production of oxygen and preferably concurrent production of hydrogen. The preferred embodiment is the electrochemical upgrading of an oxygen rich biofuel into a lower oxygenated biofuel via an electrolyzer consuming electricity (i.e. power) at the electrochemical energy consuming rate and producing oxygen, and preferably also producing hydrogen, as a byproduct in the first location, and subsequent energy (i.e., power or electricity) generation at a second location by utilization of either or both the lower oxygenated biofuel and/or hydrogen capable of producing more (preferably at least 5% more, particularly preferred at least 20% more, and specifically preferred at least 40% more) energy at the second location having an electrochemical energy generation rate relative to the electrochemical energy consuming rate at the first location.

One embodiment of the second location is where the production of power or electricity also produces carbon dioxide "CO2" as a byproduct and the second location has the further embodiment of a CO2 sequestering or transformation capability. One exemplary is a greenhouse or micro algae farm where space limitations of the first location are not present at the second location have the further benefit, beyond the peak power reduction, are reducing the net carbon footprint. The first location has the preferred ability to leverage the produced oxygen, including oxyfuel combustion, resulting from the oxygen consumption at the first location such that the CO2 sequestration at the second location yields a more favorable net CO2 footprint by having the first oxygen producing reaction at the first location, and the second carbon dioxide producing reaction at the second location where preferably sequestration and transformation is not space constrained.

The DDES is a generator and issuer of tank loading and unloading with corresponding vehicle transport logistics routing for all distributed electrolyte assets (charged and discharged). The system also tracks and calculates the logistics pathway for distribution of charged electrolyte and recovery of discharged electrolyte in accordance to at least one optimization method selected from the group of 1) maximize revenue, 2) minimize penalties, 3) maximize electricity fulfillment without demand-side reduction, or 4)

maximize transport vehicle reservation fulfillment. As noted earlier, the use of the term charged electrolyte is interchangeable also with an electrochemically upgraded/reacted organic reaction such as a relatively oxygen rich molecule (e.g., biocrude) resulting through the reaction a relatively oxygen depleted molecule (at least relative to the original oxygen rich molecule) and an oxygen resulting byproduct. The use of the term discharged electrolyte is interchangeable also with a subsequent electrical production, whether it be via a direct fuel cell, indirect fuel cell using resulting syngas, or combustion of the resulting relatively oxygen depleted molecule (including as a biodiesel, sustainable aviation fuel) at a second location.

The invention manages the charge/discharge state of all electrolyte within the network of energy storage charged and discharged media inventory. One exemplary and optimal energy storage media for the decoupled system is an electrolyte of a flow battery having greater than 350 Wh/l, preferably greater than 400 Wh/l, and specifically preferred greater than 1000 Wh/l.

Turning to FIG. 7, FIG. 7 depicts the primary data structure of the DDES. A datacenter 200, which can be centralized, distributed, or within the cloud (as known in the art) has database structure and categorization of mobile RS business(es) 120, stationary RS business(es) 110, power generation business(es) 115, and RS shuttle business(es) 105. One exemplary mobile RS is a transportable containerized power generating asset that preferably consumes a biofuel in an ultra-high efficiency system utilizing known in the art Combined Heat and Power "CHP" or Combined Cycle operations to achieve mechanical efficiencies greater than 40% (preferably greater than 50%, and particularly preferred greater than 60%). The advantage of a mobile RS is that it leverages the significantly higher energy density of liquid fuels (as compared to liquid electrolyte of flow battery) and is able to dynamically be positioned at a location where it's byproduct or co-products can be optimally put to use. One exemplary stationary RS is analogous to a current generation fuel station or in the electric world a Tesla supercharging station. A fundamental flaw with the current plan of electric charging stations, even if and actually especially if rapid charge, is the incredible peak demand of electricity that the RS would be charged. RS charging, just like current gas stations, incur a significant peak and off-peak business cycle and thus the RS would incur a substantial increase in average kilowatt-hour costs due to the low capacity utilization factor. In the inventive system, a stationary RS would have a co-located power generating system operating on the preferable biofuel (but alternatively natural gas) so as to operate the power conversion equipment to produce charged media (i.e., charged flow battery electrolyte) therefore avoiding in full any demand charges. Alternatively, though less desirable would be a grid connected stationary RS that would have a significantly stable baseload demand so as to transform the primary energy (e.g., electricity) into a rapidly dispatchable charged electrolyte for subsequent and decoupled use by a vehicle or intermittent transfer to a vehicle for subsequent and decoupled use at a second location such that the decoupling is both in time and space. One exemplary power generating business, as noted above, is the grid utility which can provide traditional fossil fuel derived electricity or renewable energy, or a standalone solar/wind farm such that the renewable energy production becomes decoupled in both the time and space domains as well. The database 205 tracks the real-time, historic, and projected parameters associated with each business entity type so as to schedule power provision reservations (i.e., advance orders) and projected dispatch scheduling of distributed inventory, vehicles for logistics, etc. Each business also has database records ranging from its employee records 215 with their respective purchasing records 220 (and their ultimate source 225) and the residence location of the employee being a community record 300. The community in which the employee lives is of particular importance as transportation to and from work provides an at least twice daily ability for the same employee to serve as a driver in the vehicle dispatch network. Further, the business of record 101 for the sales of charged energy storage media maintains all purchase records 220, source records 225 of said purchases and corresponding consumption records 222 for each of the businesses clients (having client records 400). The client of each business makes acquisitions both within a community 300.2 and executes tasks 2250 within the sourcing 225 process in which the client can also provide driving services of the vehicle 690 (not shown in this figure) being utilized for dispatch when such vehicle is either manual or semi-autonomous or even autonomous such that the vehicle for dispatch can serve both the function of moving the client from a first location to a second location such that the distribution of charged media occurs either to the same second location or along the route in which the client desires to have as a destination.

Turning to FIG. 8, FIG. 8 is a minimum set of parameters and mathematical representations of parameters used to determine each aspect of the invention ranging from power generation, distribution, and energy consumption along with primary vehicle transport demands including energy demands while achieving the primary logistics function as well as the secondary dispatch of energy storage media function. Each node in the system has an object ID and parameters including multifactorial parameters as a function of time (and optionally including location) domain such as electricity production historic f(t) record(s), electricity consumption historic f(t) record(s), demand consumption historic f(t) record(s), and demand production historic f(t) record(s). These are repeated for projected records instead of historic records being electricity production projected f(t) record(s), electricity consumption projected f(t) record(s), demand consumption projected f(t) record(s), and demand production projected f(t) record(s). Both have corresponding electric rate structures (i.e., energy consumption) and electricity demand rate structures for both historic and projected. Further parameters include vehicle transport route historic records as f(t) as well as f(geofence/location), and corresponding projected records as f(t). Additional parameters include a comprehensive transaction record of energy inflow(s) and outflow(s) as well as the ratio of inflows to outflows on both a historic and projected basis. Vehicles within the dispatch accessible network have historic, real-time, and projected database records with embedded parameters including their distance & routing relative to each RS within the network as a function across the time domain, as well as vehicle transport cargo utilization and energy utilization across the time and space domains. Differentials in the time domain are recognized as having an impactful difference in time that is contextual such that the moving of vehicle after unloading energy storage inventory can lead to an approximately immediate consumption of the unloaded energy storage inventory at the unloading location as soon as the vehicle unloads the inventory and moves away from the unloading location. Therefore, differentials in time domain can be as small as 1 second, but from a practical perspective is approximately 2 minutes or even 30 minutes or longer.

Figure 9:
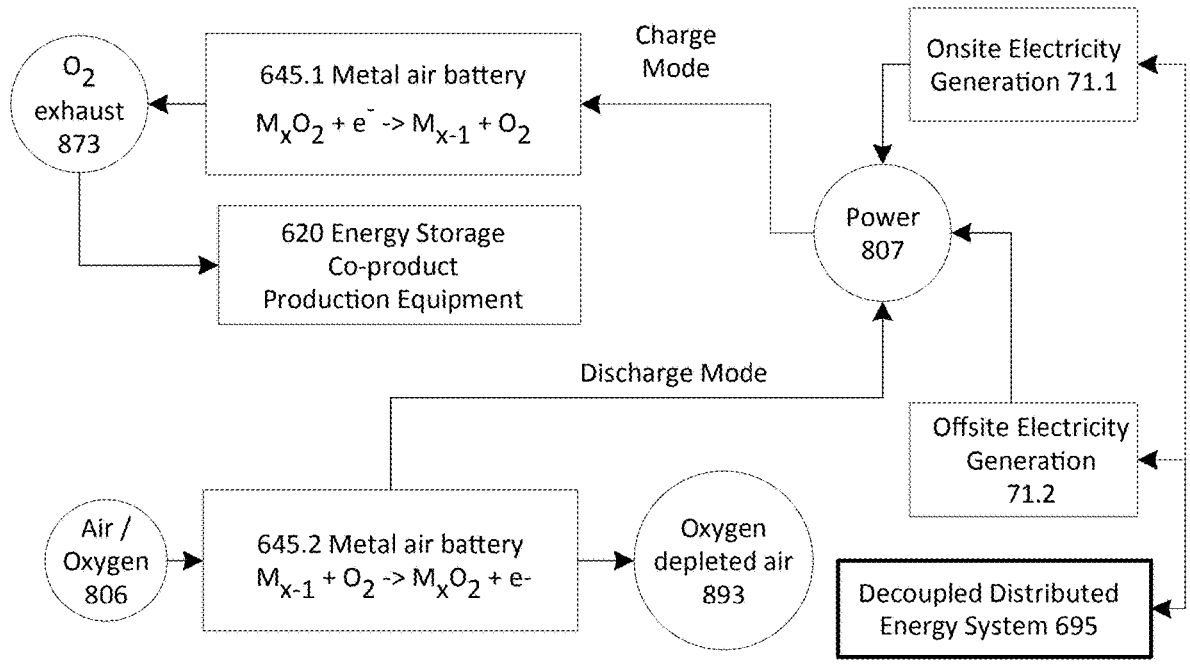
FIG. 9 is a component view of energy conversion battery notably a metal-air battery

Turning to FIG. 9, FIG. 9 depicts an embodiment for primary power (i.e., electricity) being converted into stored energy through a metal-air battery 645.1 (or equivalent for any energy storage method in which oxygen 873 is a co-product of the charging method that can be further processed by an energy storage co-product production equipment 620 such as an electrochemical pumping of oxygen to a higher pressure) during the charging mode, in which the battery sources its primary power 807 whether it be from onsite electricity generation 71.1 or offsite electricity generation 71.2 assets. In the discharge mode, the same metal air battery 645.2 consumes air (having natural levels of oxygen) 806 and emits oxygen depleted air 893. The entire process is optimally monitored, regulated, and controlled within the overarching objectives by the DDES 695.

Figure 10:
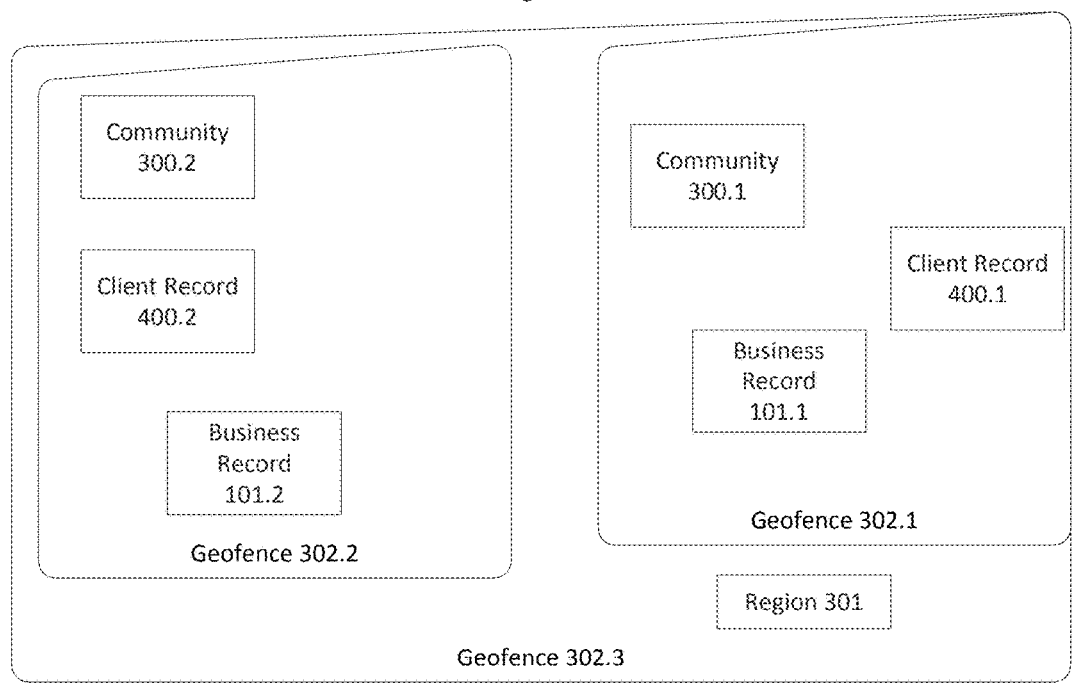
FIG. 10 is a top view of overlaying locations within geofences and nested geofences

Turning to FIG. 10, FIG. 10 depicts the importance of location (as represented by geofences including overlapping geofences) and their relative distances between each and every business 101.2 located within a community 300.2 (also depicted are every client record 400.2 within that same community) and the community location as represented by a first geofence 302.2 further within a broader geofence 302.3 (representing a region 101). Likewise, a second community 300.1 has within it client(s) 400.1 and business(es) 101.1 within a location represented by a geofence 302.1 also within the same region 301 having geofence 302.3. The DDES 695 (not shown in this figure) utilizes extensively both (and concurrently) the time and space domains thus space is represented in great detail by geofences, and though not showing each and every linkage it is understood that each transaction is tracked by both time and space domains to the largest extent possible in order to initiate reservations for all assets ranging from power generation, power conversion, vehicle dispatch, to charged energy storage media. Differentials in space domain is contextual to the scale in which primary energy generation takes place and the environment in which it takes place. In most scenarios, the space domain differentials will be a minimum of 50 meters away and in most instances greater than 500 meters away as distances less than 50 meters are typically best connected using physical communication of the energy storage media.

Turning to FIG. 11, FIG. 11 depicts the hardware and application structure of the DDES 695 (collectively the entire system on this figure and others) specifically comprised of software applications (also referred to as engines, indicating their inherent capabilities of utilizing known in the art predictive methods ranging from statistical to artificial intelligence bots) including at least a vehicle transport engine 3205 (which initiates logistic commands and reservations), RS engine 3202 (which initiates power generating and energy storage media power conversion commands and reservations), grid power engine 3204 which initiates reservations for power consumption as f(t) to be transformed into energy charged stored media, power consumption engine 3201 (which monitors and predicts) for the flow of all primary energy (i.e., electricity) to meet the energy demands (both energy and demand portion) built upon historic records in which power production engine 3203 then utilizes to establish predictive power demands as a function of both time and space domains that are further managed by the energy storage asset engine 3200 (which monitors, regulates, and controls all power conversion and inventory assets). These applications, collectively referred to as 3024 are processed within an at least one energy storage system server 4000. The server communicates via a system bus (3110) to each discrete (and as known in the industry) hardware controller with system memory (comprised of both transitory and non-transitory memory) 3021, operating system 3022, file system 3023 having database and program data 3025 in the execution of the applications 3024. The server 4000 also has a (main) processor 3100, a hardware controller 3111, and optionally a user display 3113 for the instances in which a person interacts directly with the system. A second computer 4001 (at a remote location) also has the same hardware functional components plus the addition of an optional AR/VR display 3113.1 (i.e., augmented reality, virtual reality) in the instance in which a person needs to interact with the system. Though depicted as the applications of location engine 3210 and power transaction engine 3211 being executed on the remote computer 4001, it is recognized that this control logic can be executed on virtually any discrete computer in so far as the computer has wireless communications (or hardwired) through the server 4000 and remote computer 4001 network interface components (3112).

Figure 12:
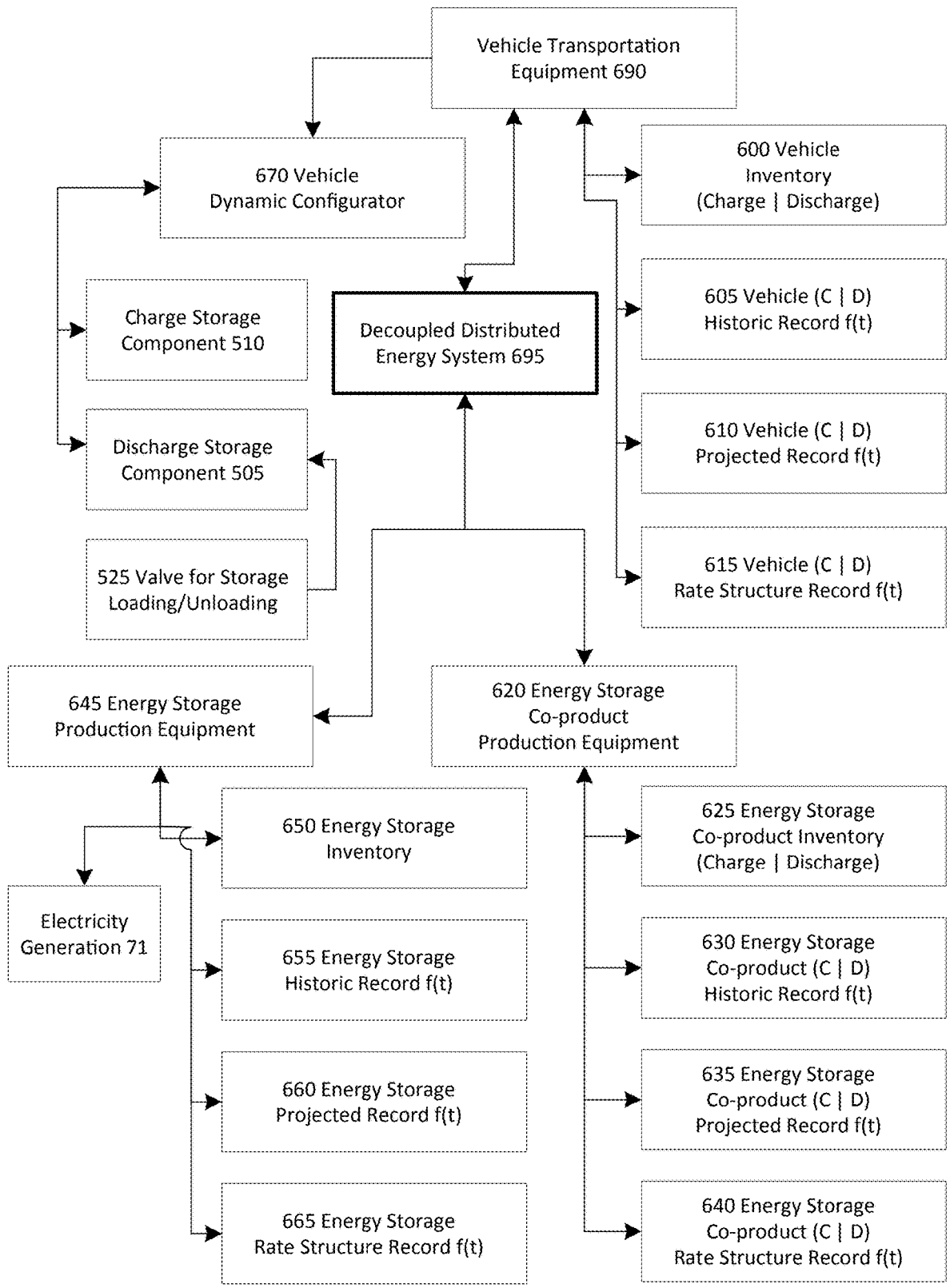
FIG. 12 is a software architecture view from a vehicle centric perspective

Turning to FIG. 12, FIG. 12 depicts the interaction between the major physical assets within the DDES 695 being the vehicle transportation equipment 690, the energy storage production equipment 645, and the energy storage co-product production equipment 620. The vehicle transportation equipment monitors, regulates, controls, and ultimately generates commands and reservations through the vehicle inventory energy storage media (in both the charged and discharged state) 600, the vehicle transport records 605 in the time domain f(t) and space domain f(geofence), collectively through analysis (including the vehicle rate structure record(s) for everything ranging from transportation, onboard energy consumption, and onboard energy generation through the controlling the issuance of reservations to generate the vehicle projected reservations. The energy storage co-product equipment 620 is analogous to the power generation processes as well as the energy storage production equipment 646, but for monitoring, regulating, and controlling co-product inventory 625, co-product historic generation and consumption records 630, and co-product rate structure 640 to arrive at a projected 635 set of commands, reservations, and execution tasks. The primary energy storage equipment 645 does the same but for primary energy storage inventory 650 through the database records of energy storage historic records 655 as a function of time and space domains and energy storage rate structure records (as f(t)) 665 to yield a set of energy storage projection records 660 based on a network of electricity generation assets 71 whether they be onsite or offsite. Lastly, the vehicle dynamic configurator 670 monitors, regulates and controls the vehicle physical configuration and routing according to the charge storage component 510 inventory, discharge storage component 510, and mass-flow control through their respective valves 525 for storage loading and unloading of energy storage media assets. The system optimization uniquely takes into account projected logistics cost in combination with projected vehicle availability, which takes into account vehicle staging opportunity from its then current location to a second location based on projected routing of the vehicles primary logistics reservations. Further optimization parameters include location specific fuel input cost for primary energy generation, resulting location-specific revenue of both primary energy and co-product sales, minus location-specific logistic or energy storage delivery penalty failures resulting from otherwise system optimization, and also minus projected vehicle logistics cost based in part on vehicle transportation equipment mobile utilization factor rate.

Figure 13:
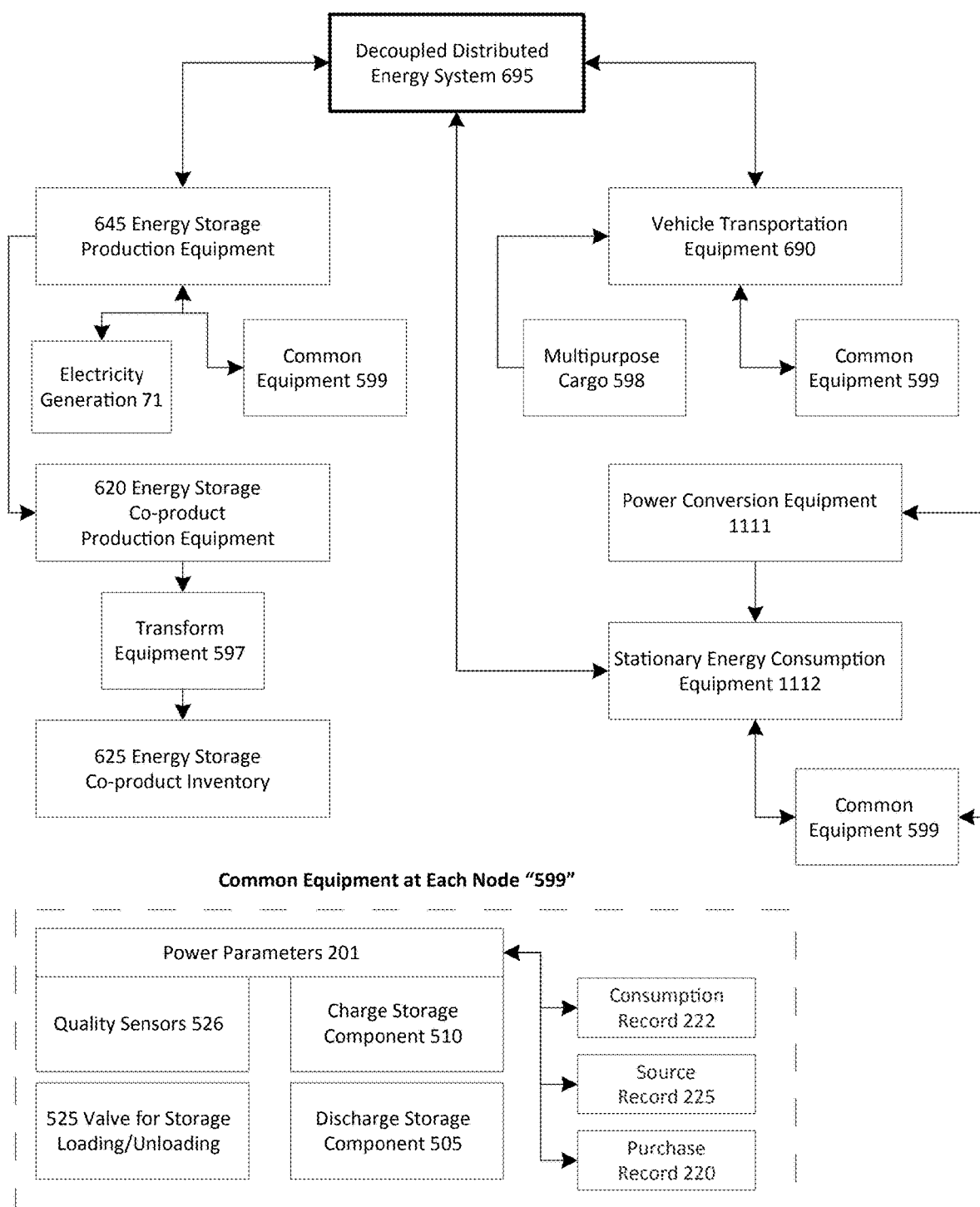
FIG. 13 is another software architecture view from an energy storage production equipment perspective

Turning to FIG. 13, FIG. 13 provides another depiction of the DDES 695 with additional details. Many of the pieces of equipment have common equipment at each node (at least in terms of function). This includes physical equipment from quality sensors 526, valves of fluid control 525, and integral charge storage component 510 with discharge storage component 505 (though preferably in the T2 configuration). A broad range of parameters 201 associated with power are included ranging from consumption 222, source 225, and purchase 220 records. The aforementioned within this figure is collectively referred to as Common Equipment at Each Node 599. The vehicle transportation equipment 690 further comprises the common equipment 599 as well as a multi-purpose cargo 598, all of which can be dynamically reconfigured. The stationary energy consumption equipment 1112 (e.g., a residence) also has the common equipment 599 along with power conversion equipment 1111 which at the very least converts charged energy storage media to discharged storage media and preferably can operate in accordance to initiated commands and reservations can also regenerate the discharged media back to charged media. This is all coordinated with the energy storage production equipment 645 as the delivery of primary power (i.e., electricity) from electricity generating assets 71 also having co-located Common Equipment 599, and preferably having a usable co-product in which energy co-product production equipment 620 is coordinated with a further optimal ability to transform 597 the co-product to a more useful state prior to being stored in the energy storage co-product inventory 625 tank(s).

Figure 14:
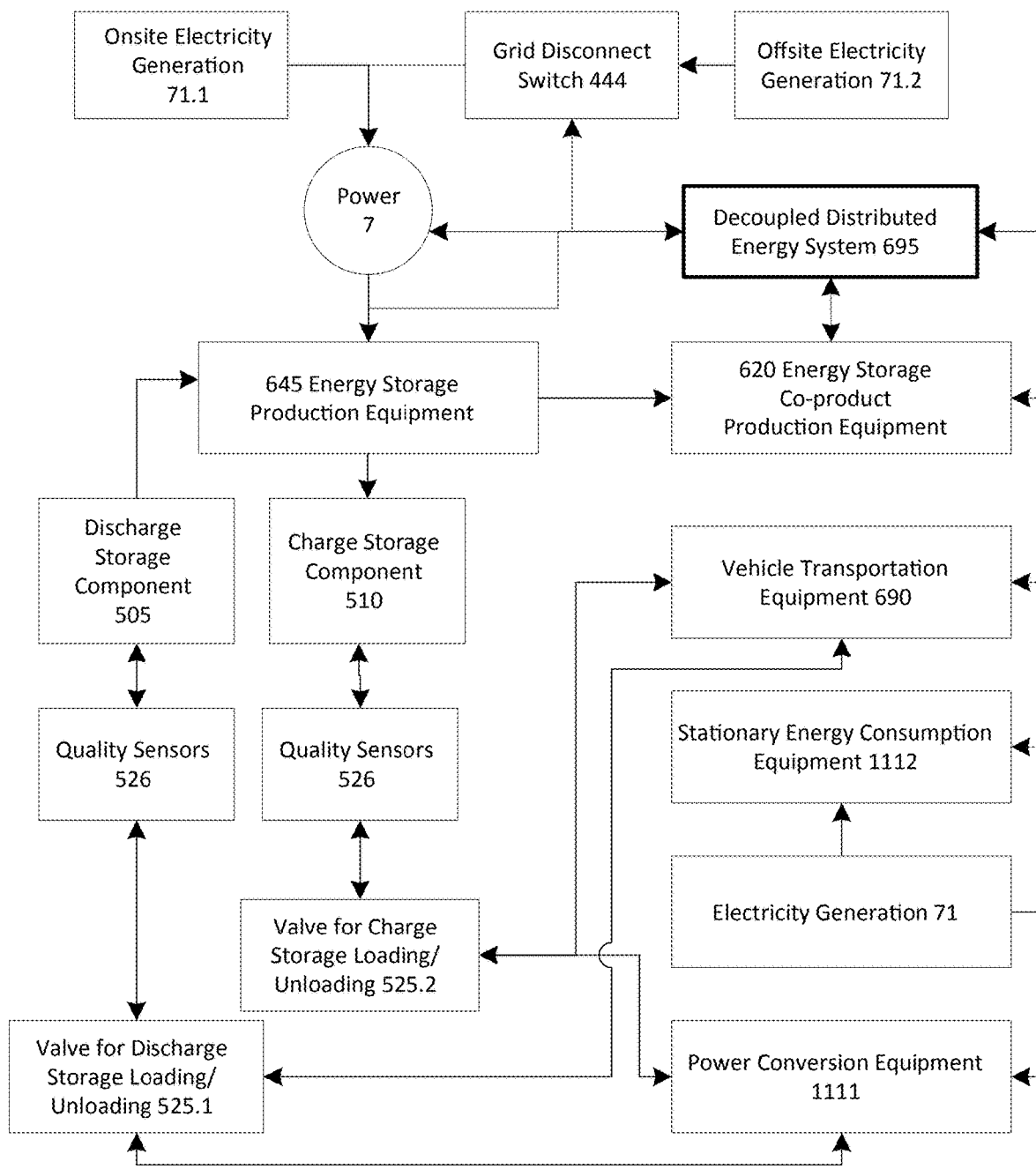
FIG. 14 is a component view of DDES extending feature set to the grid interface

Turning to FIG. 14, FIG. 14 is another embodiment with some additional features of the DDES with multiple overlapping features as within FIG. 13. Solely the distinct features will be noted, which includes the addition of a grid disconnect switch 444 as method to physically and comprehensively separate the grid therefore not having any potential bearing on offsite electricity generation 71.2 assets. The fundamental aspect of this embodiment is that a direct current "DC" energy flow, as compared to an alternating current "AC" energy flow is more readily enabled as an "island" mode microgrid. It is understood that the RS energy storage assets are deployable and therefore physically decoupled from the transport vehicle. Given the expense of transport vehicles, especially autonomous vehicles having expensive driving/steering sensors etc., it is a critical feature of the inventive system that the RS assets are decoupled from the transport vehicle so as to not prevent the transport vehicle from being used for transporting people, cargo, etc. to another location (a third location, or an intermediary location between a second and third location, or third and fourth location, etc.).

Turning to FIG. 15, FIG. 15 depicts in further details the vehicle dynamic configurator 670 that has the fundamental purpose of maximizing the utilization factor for vehicles within the network of mobile assets. This is of particular importance, and in fact enabled, when the vehicles are autonomous or semi-autonomous (as this increases the asset cost and thus the need to amortize the capital cost preferably over a longer utilization time. Vehicles 690, whether as an individual or collective set of vehicles within the network, have a primary function of logistics having nothing to do with energy distribution represented by a set of dedicated vehicle transportation reservations 691.2. The preferred vehicle 690 has onboard charge storage 510 and discharge storage 505 along with solid storage 520, and particularly preferred such that the energy storage media is entirely compatible with the vehicle's motive powering system (i.e., it utilizes the same electrolyte being distributed and dispatched to fulfill its internal energy demands). All of the components below the "All Linked to DDES System" are not shown as being coupled to the DDES graphically, however, each of them are actually directly coupled and linked as a primary component of the DDES 695. The location energy storage usage reservations 692.1, which represent the then current reservations by location in which the delivery of charged energy media is required. The location energy storage usage history 692.3, which is the historic record of past reservations as f(t), is then aggregated with the reservations 692.1 to build and project a set of location energy storage usage projected reservations 692.4 in which the DDES will execute and initiate commands and task directives. The location energy storage generation reservations 693.1 are the then current set of generating orders/reservations by location for each power generating asset within the network. The location energy storage generation reservation history 693.3 is further utilized to aggregate with 693.1 to create and then initiate commands and tasks based on a projected set of location energy storage generation projected reservations 693.4. The aforementioned combination of projected reservations 692.4 with 693.4 is aggregated into a system vehicle transportation projected reservations 691.4 for the dispatch of charged energy storage media by integrating the system vehicle transportation reservations 691.1 (then current reservations) with system vehicle transportation reservation history 691.3 to increase the accuracy of fulfilling the DDES mission of maximizing vehicle logistics primary function, energy distribution of charged energy media while maximizing system profitability taking into account penalties or client dissatisfaction by missing logistics and/or energy distribution functions. Each of the aforementioned reservation records includes common parameters 202 including preferred start time, preferred end by time, required range of start time, required range of end time, alternative starting geofence as f(t), alternative ending geofence as f(t), and space utilization factor as f(t). It is not only understood but desirable for charged energy media to be highly distributed and accessible closest to the point of use and thus to be a real-time buffer of delivered energy WITHOUT requiring double conversion through sequential energy storage steps particularly from intermittent renewable energy sources through the delivery of electricity for use in mobile assets (i.e., electric or plug-in hybrid vehicles).

Figure 16:
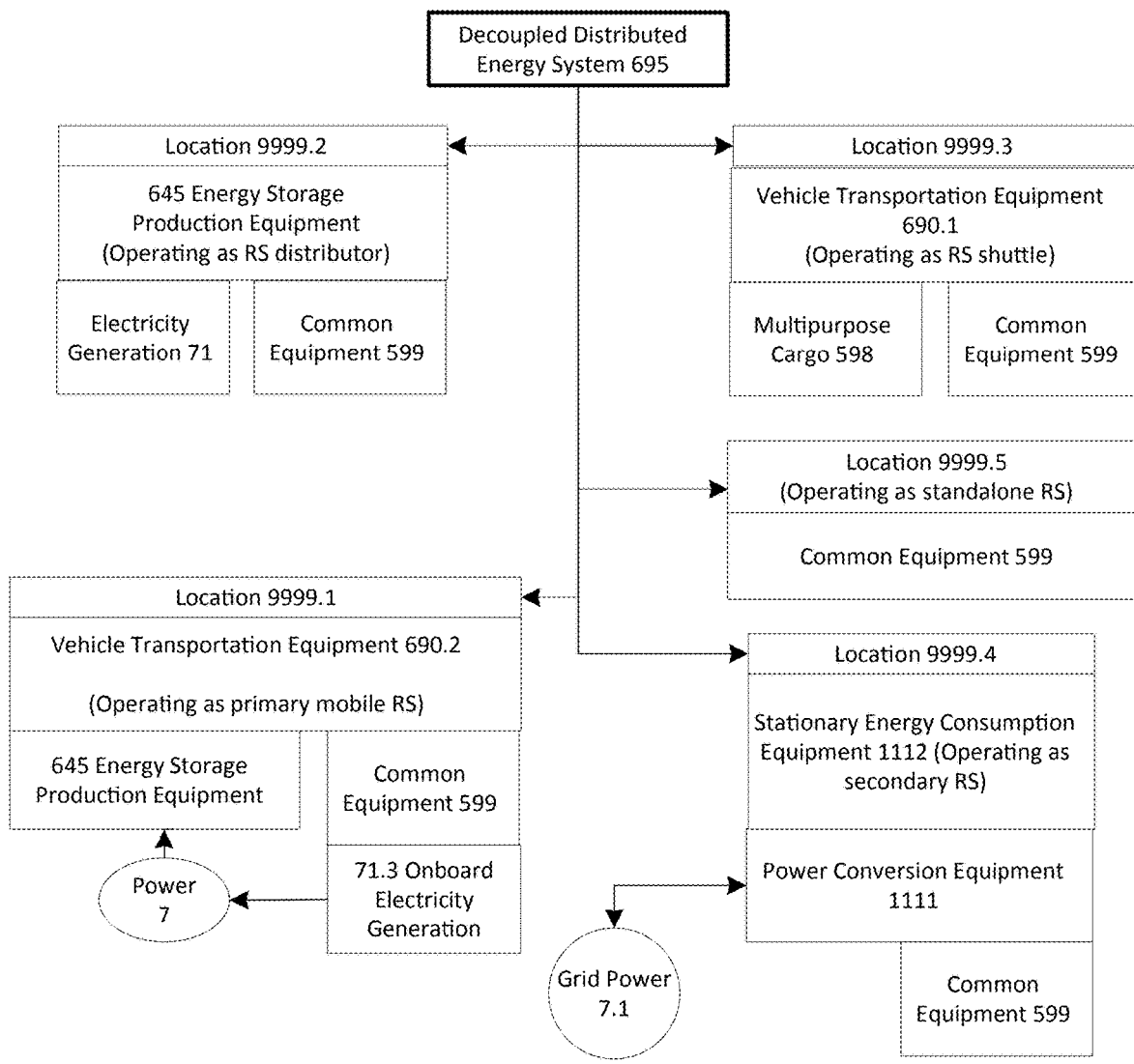
FIG. 16 is another component view of DDES from a location centric perspective

Turning to FIG. 16, FIG. 16 depicts the multiple configurations of RS types indicated by derivatives of location 9999. Each location 9999 has at least the inventive Common Equipment 599 (as described in earlier figure). Location 9999.2 also includes energy storage production equipment 645 operating as a RS distributor (analogous to a fuel wholesale depot) with the addition of electricity generation 71 equipment. Location 9999.3 is a dynamic and mobile physical position since it is operating as a RS shuttle for transporting of charged energy storage media for subsequent consumption, or discharged energy storage media for subsequent recharging where the charged/discharged media is represented as multipurpose cargo 598 (exemplars include passengers/drivers, packages, or T2 for energy storage media). Location 9999.4 is operating as a secondary RS, which is a location that doesn't have primary power generation capabilities to recharge discharged media BUT can utilize grid 7.1 provided energy to recharge the discharged media (such that the DDES will typically limit this operation to time periods in which the real-time demand is lower than the then current peak demand within the then current billing period). Location 9999.5 is operating as a standalone RS, which is analogous to a current petroleum station where charged media is dispatched (i.e., filling of gas tank) with predominantly this as the primary function (in this era, typically accompanied by a small retail convenience store). Location 9999.1 is operable as a dynamic, mobile, and repositionable primary mobile RS. All primary mobile RS' have on-board energy storage media (e.g., electricity generation 71.3 producing power 7) to be supplied into the energy storage production equipment 645 to transform discharged media into charged media. The mobile RS is an inventive feature as it is repositioned on a dynamic basis to a location in which co-products or byproducts value are maximized. The implementation of DDES takes into account penalty parameters in its preferred operation including, though not limited to, 1) vehicle missing reservation at any location inclusive of charging, discharging or a 3rd location, 2) delivery missing reservation at discharging location, 3) failed inventory at charging location, and 4) failed inventory of byproduct at charging location or any 3rd location.

Figure 17:
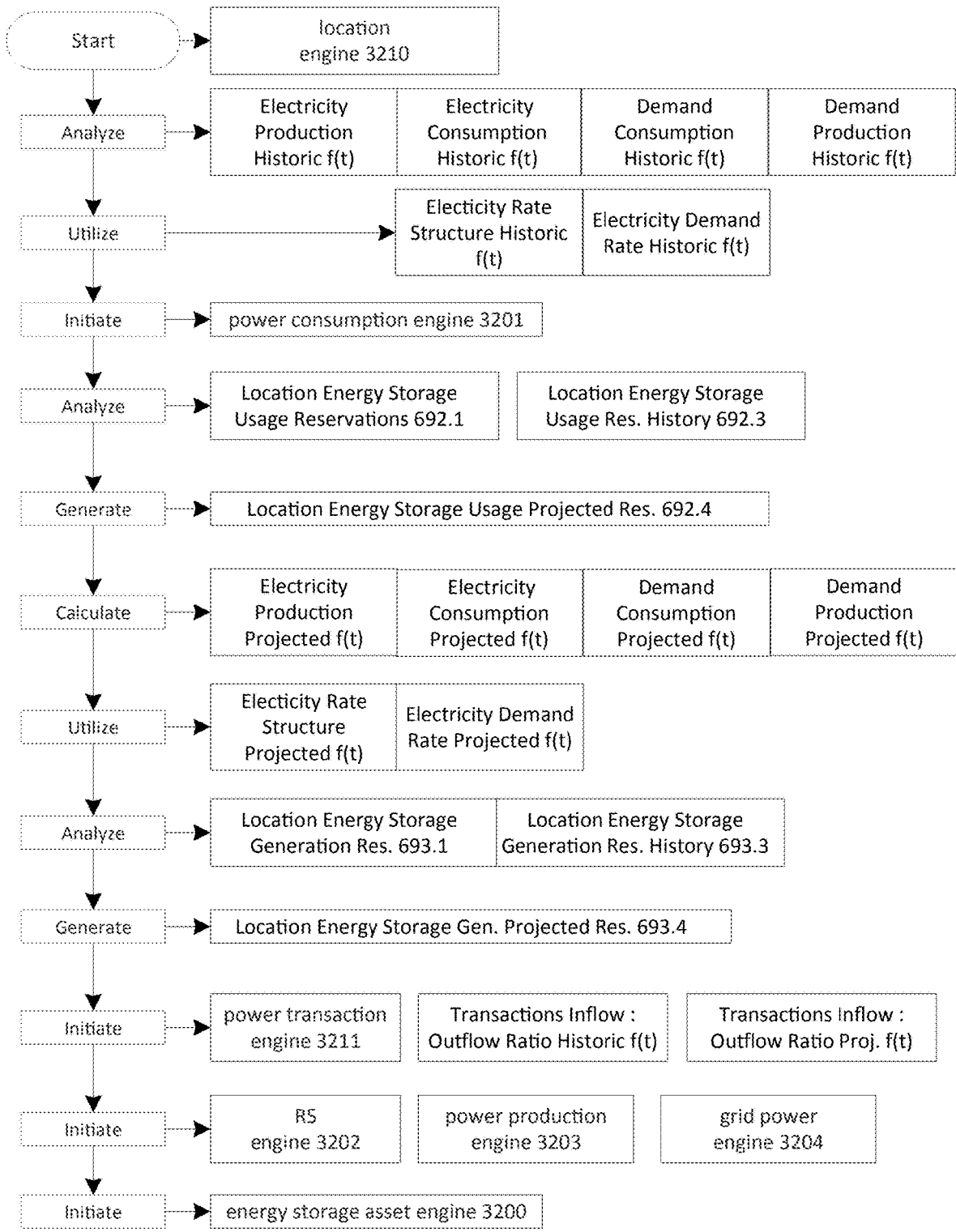
FIG. 17 is a process flow diagram for the location engine application

Turning to FIG. 17, FIG. 17 depicts another process flow for the DDES system. The process logic is carried out within the location engine 3210 application that first analyzes the historic data as at least a function time of the electricity production, electricity consumption, demand consumption, and demand production for every location within the DDES network. This analysis includes pricing based on the electricity (or other energy storage media metric, such as BTUs for ice) rate structure and demand structure as at least a function of time. The subsequent process step is to initiate the power consumption engine 3201 that analyzes for each location in the network the respective location energy storage usage reservations 692.1 (i.e., definitive orders of energy storage media for consumption as f(t)) and accounting for location energy storage reservation history 692.3 in then generating a location energy storage usage projected reservation(s) 692.4 (i.e., projected energy demand orders to meet anticipated shortfalls). The reservations are the basis for calculating projections as a function of time "f(t)" for electricity production, electricity consumption, demand consumption, and demand production for each location in the network. Revenue is calculated utilizing the projected as f(t) energy (i.e., electricity) rate structure and demand (i.e., electricity) rate structure. The subsequent process step is to analyze existing location specific energy storage generation reservations 693.1 and location energy storage generation reservation historic records 693.3 in order to generate projected location specific energy storage generation reservations 693.4. These projected generation reservations are utilized by the power transaction engine 3211 to initiate a series of transactions based on energy inflow to outflow ratios on a historic f(t) and projected f(t) basis. Followed by the process step of initiating the RS engine 3202 (i.e., the RS control application) for subsequent control through the power production engine 3203 (responsible for coordination and control of power generating assets at each location within the network) and grid power 3204 (responsible for coordination and ordering of energy units) from the centralized or non-network-controlled power producing assets. Collectively a resulting set of dispatch orders are generated and then monitored, tracked, coordinated, and executed through the energy storage asset engine 3200 application.

Figure 18:
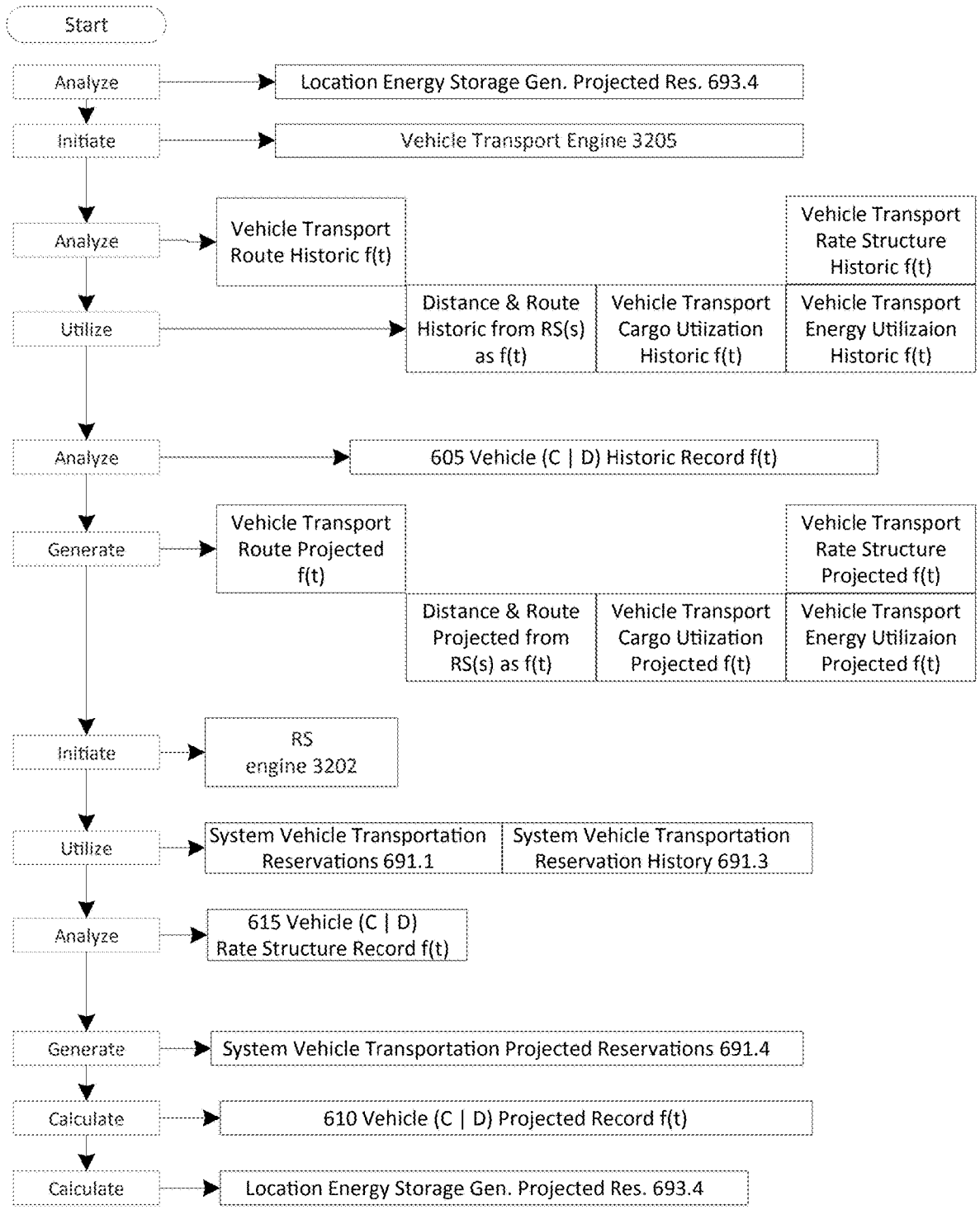
FIG. 18 is a process flow diagram for the vehicle transport engine application

Turning to FIG. 18, FIG. 18 is another DDES process flow primarily directed to the vehicle operations resulting from the process flow from FIG. 17 location energy storage generation projected reservations 693.4. The process starts with the initiation of the vehicle transport engine 3205 (i.e., analogous to vehicle dispatch coordinator and scheduler). The subsequent step is to analyze the historic records as f(t) of vehicle transport route(s) for the predominant purpose of predicting energy consumption for each subsequently scheduled trip by utilizing the historic records as a f(t) of distance & route from RS within the network, vehicle transport cargo utilization records as a f(t) so as to anticipate and project physical space availability to transport energy storage media, and as noted earlier for vehicle transport energy utilization as f(t) so as to ensure adequate charged energy storage to at least fulfill transport from a first location (departure) to at least one second location (destination) through further analysis of vehicle charging and discharging historic records as f(t) and preferably also as f (route). The system then subsequently generates projected vehicle transport route(s) as f(t) drawing upon at least one of vehicle transport rate structure projected as f(t), distance & route projected from RS(s) as f(t), vehicle transport cargo utilization projected as f(t) and preferably inclusive of cargo weight, and vehicle transport energy utilization projected as f(t) and preferably specific to the projected route. The RS engine 3202 is then initiated for the predominant purpose of optimizing the entire system network beyond the aforementioned vehicle specific designation of projected potential dispatch orders. This utilizes the then current system vehicle transportation reservations 691.1 and historic records of system vehicle transportation reservations 691.3 in combination with an analysis incorporating vehicle rate structure records (for both charging and discharging scenarios) to generate a series of instructions and corresponding records in which vehicles will execute dispatch routes as a database of records of system vehicle transportation projected reservations 691.4. This optimized set of reservations for the network of assets within the DDES then calculates specific records for each vehicle of projected routes as a f(t) 610 for movements of charged and discharged storage media in conjunction with vehicle reservations relevant to multipurpose cargo movement requirements, and for each location energy storage generation projected reservations 693.4.

Figure 19:
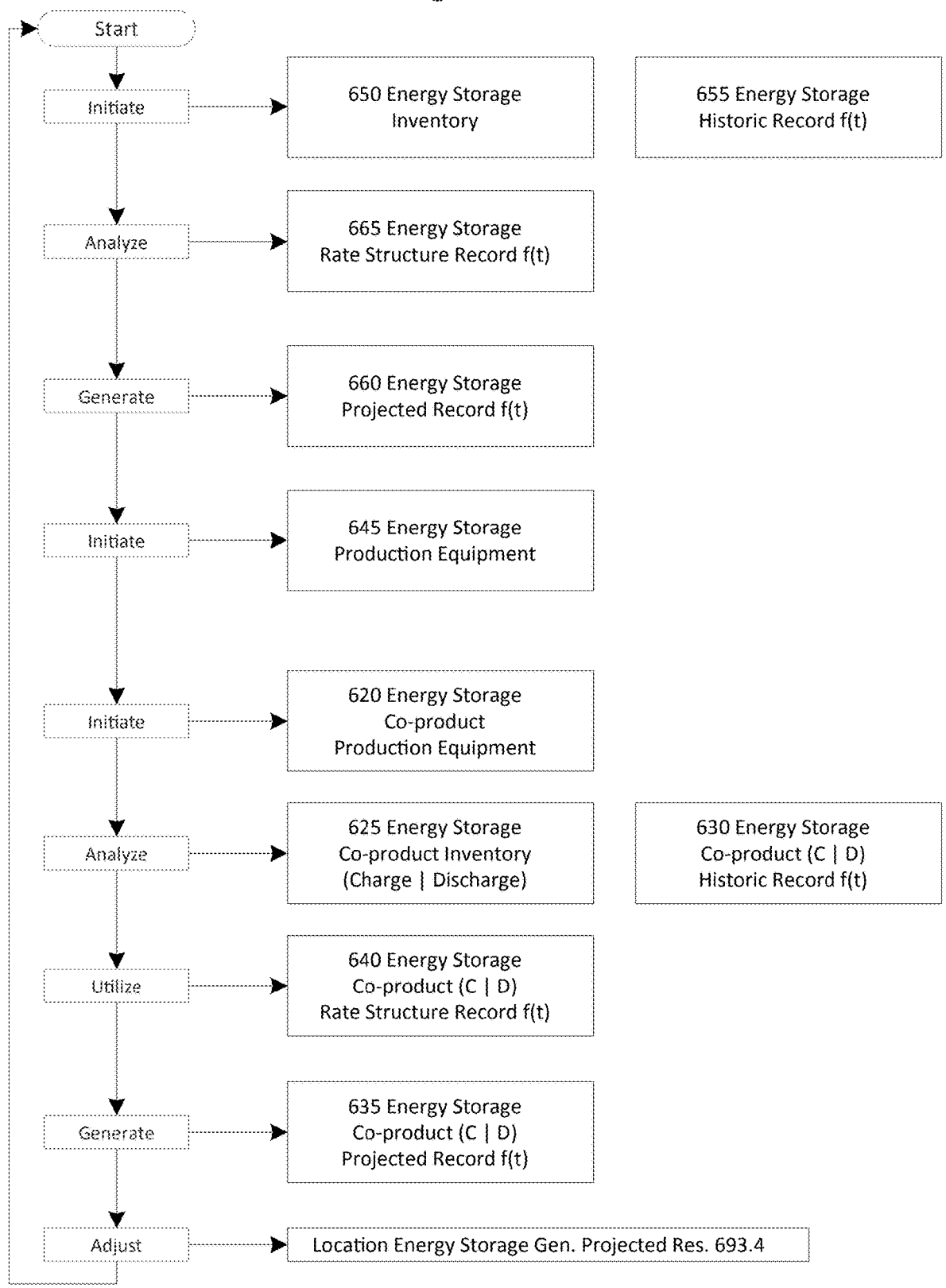
FIG. 19 is a process flow diagram for the inventory engine application

Turning to FIG. 19, FIG. 19 depicts another process flow centric to energy storage media inventory. This process initiates the energy storage inventory 650 application that utilizes historic records of energy storage as f(t), for a comprehensive analysis in combination with the energy storage rate structure records as f(t) to generate a series of projected records as a f(t) of energy storage inventory requirements. Production orders are initiated and directed to the relevant energy storage production equipment 645, and concurrently initiated and directed to the relevant energy storage co-product production equipment 620. The combination of energy storage co-product historic records (for both charging and discharging scenarios) as f(t) and the then current co-product inventory (also for both charging and discharging scenarios) as f(t), and subsequently utilizing the energy storage co-product rate structure records as f(t) to finally generate projected production orders as f(t) for the energy storage co-product(s) to meet the system inventory requirements. DDES continuously monitors on a location specific basis the location energy storage generation projected reservations 693.4 to adjust for operational variations and then start the process over again to correct for those variations.

Figure 20:
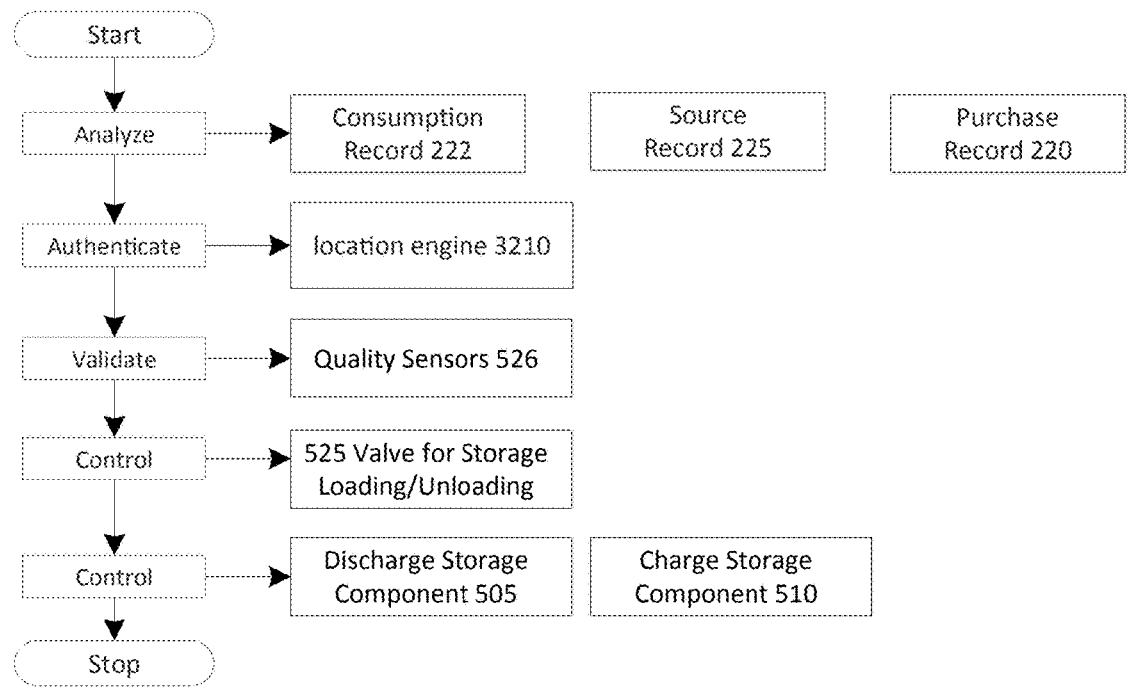
FIG. 20 is a process flow diagram for the location engine application centering around the quality control process

Turning to FIG. 20, FIG. 20 is another process flow specific to the energy storage media transfer process. The first step is to analyze consumption record(s) 222, source record(s) 225 and purchase record(s) 220 to maintain a historic record of all storage media movements, as a means of maintaining the highest quality media in spite of highly distributed nature of the system. The next step, prior to any physical transfer of storage media, is the authentication step using the location engine 3210 to carry out at the least a triple location security process. The energy storage media is then validated utilizing the quality sensors 526, and then DDES controls the valves for loading or unloading of energy storage media as well as controlling the discharge storage component(s) 505 and/or charge storage component(s) 510.

Figure 21:
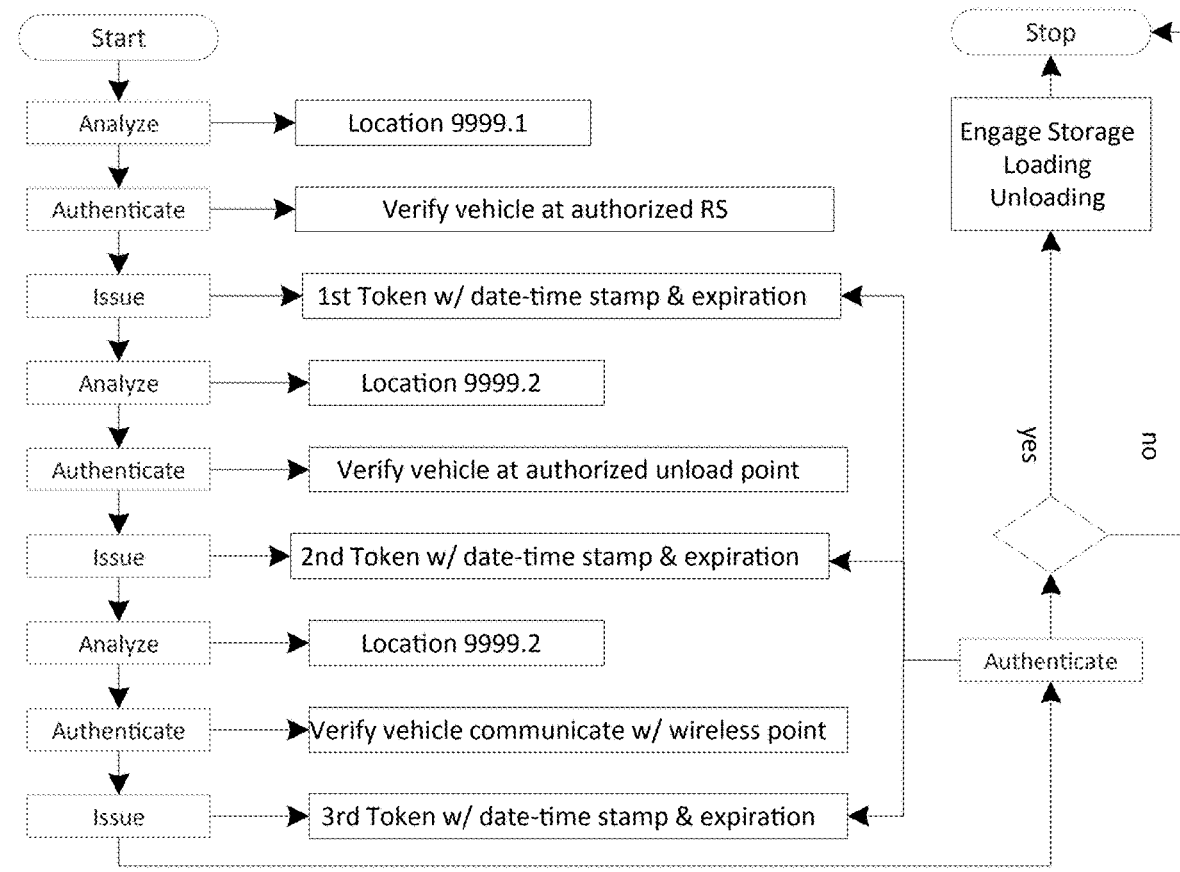
FIG. 21 is a process flow diagram for the triple location security authentication process

Turning to FIG. 21, FIG. 21 is another process flow detailing the triple location security process. This begins with an analysis of the location 9999.1 in which charged energy storage media is first transferred into the vehicle at an RS and then verified through the vehicle at the authorized network RS resulting in the issuance of a $1^{st}$ token with a date-time stamp and a corresponding expiration date/time. Subsequently the vehicle conducts an analysis of a second location 9999.2 in order to authenticate the vehicle is at an authorized unload point (as noted within a specific DDES reservation) leading to the subsequent issuance of a $2^{nd}$ token also having a date-time stamp and an expiration date-time stamp. At this point, the same vehicle authenticates communication through a known wireless access point to finally issue the $3^{rd}$ token also having a date-time stamp with an expiration date-time stamp. Only after confirming that all three tokens are issued and prior to their expiration date-time stamps is the storage loading and/or unloading process engaged.

Figure 22:
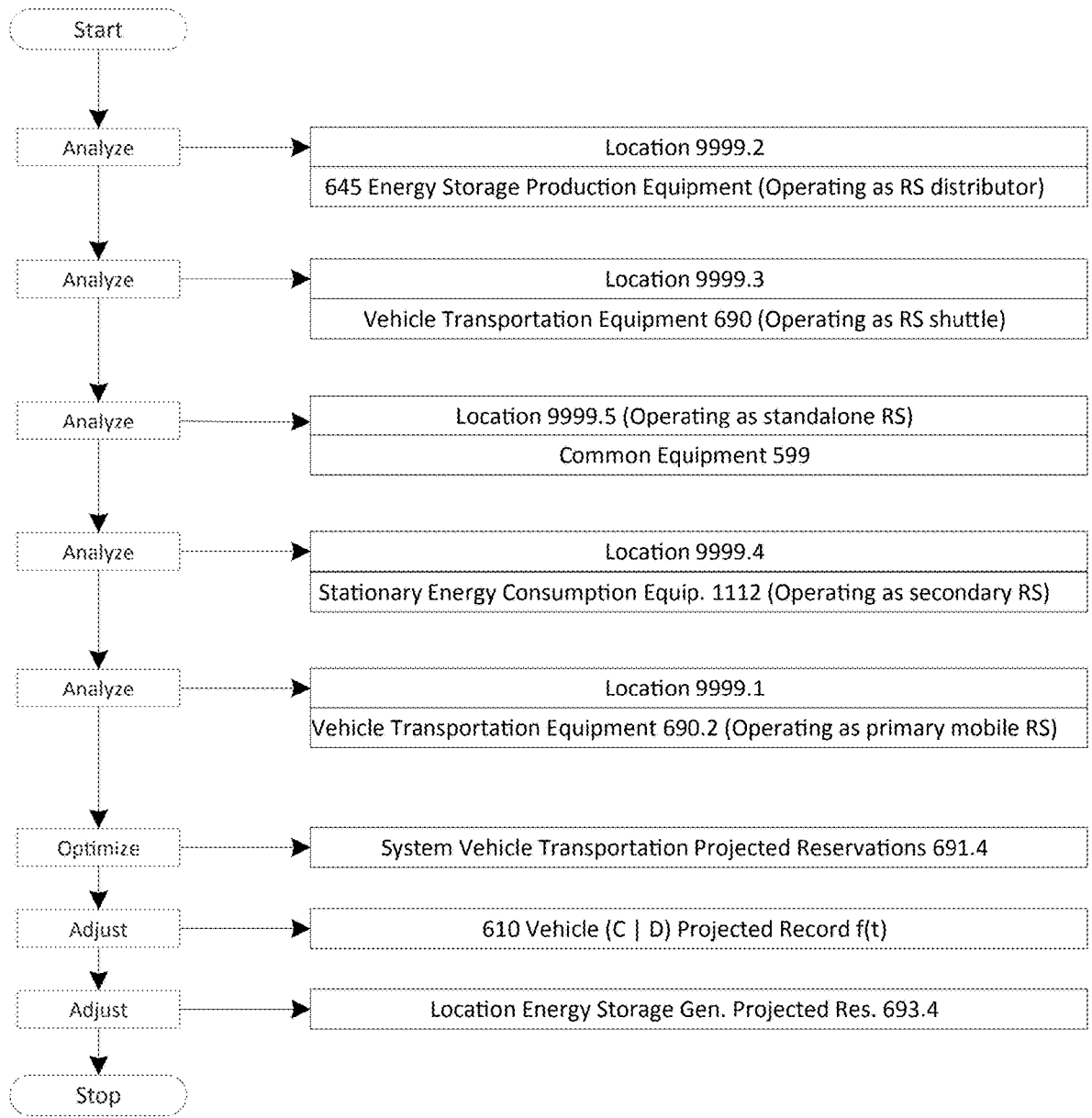
FIG. 22 is a process flow diagram for the system optimization of DDES

Turning to FIG. 22, FIG. 22 depicts a process flow for system optimization by sequential analysis of: 1) location 9999.2 for each energy storage production equipment 645 operating as RS distributor, 2) location 9999.3 4246315183695640 for each vehicle 690 operating as RS shuttle, 3) location 9999.5 for each common equipment 599 operating as a standalone RS, 4) location 9999.4 for each stationary energy consumption equipment 1112 operating as a secondary RS, and 5) location 9999.1 for each vehicle 690.2 operating as a primary mobile RS. Optimization results in a series of system vehicle transportation projected reservations 691.4, and then goes through a continuous (or discrete as reasonable) adjustment process resulting on variations made to vehicle projected record(s) as f(t) containing routing and dispatch instructions. Adjustments are also continuously made as vehicles travel throughout the day leads to subsequent location energy storage generation projected reservations 693.4.

Successful operations of DDES requires extensive security procedures, but at a minimum the following security steps include:
1) ensuring that the discharged (particularly when electrolyte) solution is returned non-diluted (and not more than 1 cycle, i.e., not charged elsewhere)
2) multi-factor authentication for opening valve in which electrolyte (whether charged or discharged) is being taken/returned so as to limit opportunity for dilution or not returning the same electrolyte in which it was received (the preferable electrolyte has a taggant at a specified concentration, which is particularly preferred to be an electrolyte catalyst or an inert fluid, or specifically preferred a known nanoelectricofuel that clearly establishes dilution in addition to the taggant).

A method to secure the electrolyte asset both in the charged and discharged condition. Both the vehicle transport and off-board charged & discharged electrolyte tanks have their locations authenticated, which enables the fully automated valve system (with embedded security and authentication sensor) to first authorize and then initiate the transfer of electrolyte fluid from/to the vehicle transport on-board tanks to the off-board tanks. The system is further comprised of electrolyte quality sensors to verify and validate the electrolyte status and notably methods to determine any dilution or change of charge state as the electrolyte is being transferred. It is an important feature of the system to have the dilution, charge state, and precise volume within each of the respective charged and discharged tanks to be calibrated where the calibration process requires the at least two-location authentication to precede the recognition of the calibrated parameters. It is anticipated that a three-location authentication method can be implemented where the first location is the current location of vehicle transport, the second location is the current location of the energy storage tanks in which energy storage transfer is taking place, and the third location is the location of a communication node in which the vehicle transport is communicating between. Alternatively, the third location can be a known location of a system or user in which transfers of energy storage are pre-authorized based on confirmation of the first and second location being within a specified geofence location and occurring at a specified date/time range. The system further comprises sensors and control parameters to identify each instance of electrolyte flow to and from the charged electrolyte tank, to and from the discharged electrolyte tank, and to and from the electrolyte charging system. The system further uses this information to establish pricing of the electrolyte fluid in terms of at least: 1) volume of electrolyte recharged, 2) volume stored in the charge tank, and 3) volume stored in the discharge tank such that it is recognized that electrolyte carrying costs is essential to calculate as the electrolyte itself is an expensive asset whether it be in the charged or discharged state and that each sequential charge/discharge cycle has the potential to deteriorate the electrolyte service life by a minimum of one standardized electrolyte cycle (as normalized by the projected lifetime cycles of the specified electrolyte).

Throughout the execution of DDES, it is understood that stored energy, particularly electricity, can be directed towards a wide range of purposes but notably in the context of improving the efficiency and effectiveness of DDES and an overarching goal of decarbonization must include at least electricity for:
1) additional oxygen generation
2) electrochemical pumping (or compressing) of oxygen for either inventory or oxy-fuel combustion
3) on-site energy storage for additional oxygen, or just on-site energy storage
4) additional on-site power generation for off-site power, which could also be from waste heat recovery as a result of oxygen consumption A fundamental problem with the transition to a decarbonized future is the requirement for a massive investment into a new "all-electric" infrastructure and a virtually complete abandonment of the existing energy infrastructure. Another fundamental problem is that a virtually complete ignoring of the largest energy consumers in the world being the industrial sector. Earlier in this disclosure it was already highlighted how a non-decoupled traditional electric vehicle places a massive peak demand (or a "double conversion") problem shifted to the electric vehicle charging stations and a demand on the vehicle being stationary.

The DDES provides a solution to the problem by leveraging existing infrastructure (that also enables a smooth and continuous transition during the shift from fossil fuels, through to biofuels, and then to further growth of intermittent/non-combusting renewables e.g., solar, wind). The DDES also enables the fastest and least expensive decarbonization plan leveraging the existing infrastructure across the domains of 1) electricity production, 2) fossil fuel for transportation industry, and 3) industrial production. The co-locating of energy storage systems, as noted, with co-located oxygen production when combined with homogeneous radiant combustion with integral waste heat recovery reduces energy consumption by at least 10% (preferably greater than 30%) in petroleum refineries, high-temperature furnaces as used in iron/steel, glass, and metal smelting operations, with co-located combined heat and power NOW properly sized for comprehensive heat production and integrated waste heat recovery utilizing advance high-temperature heat pump (as known in the art, such as using $CO_2$ as the refrigerant) as used in the pulp & paper, food & beverage, and chemicals industries.

The inventive system with tight energy flow coupling, but with distinct time and space domains, between industrial, transportation, and manufacturing assets reduces the capital investment per unit of decarbonization by at least 5%, preferably by at least 20%, and particularly preferred by at least 40%. Utilizing existing assets in combination with strategic deployment of the preferred embodiment of: 1) metal-air batteries, 2) high-temperature heat pump such as the transcritical $CO_2$ heat pump, 3) high-energy density flow battery enabling decoupling in both the time and space domain, 4) long-term thermal energy storage media (e.g., ice, phase change materials, thermochemical and polymeric such as azobenzene), and 5) electric or hybrid-electric vehicles, including current assets of petrol transportation and/or asphalt fleet trucks preferably re-configured for autonomous driving as safely enabled INTO the existing network of 1) industrial manufacturing plants particularly those that produce waste heat that can be repurposed, and/or that can increase their operating efficiency by consuming oxygen, and/or that consume a greater amount of heat in comparison to their electrical consumption, 2) points of convergence being existing facilities in which transportation vehicles spend significant amounts of time being stationary, or that have a relatively high density of labor personnel (relative to residential facilities), 3) petroleum stations, and 4) combustion-based power plants producing waste heat ALL leveraging either the aforementioned fleet of vehicles reconfigured for logistics transport of charged/discharged electrolyte and/or thermal energy storage (preferably long-term storage medium, which is defined as having less than 10% thermal losses over a period of at least 2 days relative to traditional thermal energy storage medium as known in the art). The DDES in combination with a fleet of autonomous vehicles is the optimal method of decarbonization WHILE maximizing the utilization of existing assets notably: 1) refineries, 2) petroleum logistic, 3) roads, and 4) buildings. The preferred transaction system further features digital currency or virtually any system that enables peer-to-peer financial transactions. The result is a truly decoupled, distributed, and ultra-high efficiency energy system enabling rapid decarbonization of our planet on a community by community empowering basis. Further, increasing the energy efficiency of petroleum refineries AND integrating the existing petroleum infrastructure INTO the final solution also provides a win-win transition such that the significant increase in biofuels whether it be in the form of gaseous fuels consumed for electricity (or used as syngas for biochemical production), or liquid form for transportation fuels displacing the current fossil fuel fraction, or in solid form for subsequent combustion for electricity production (such as in existing coal, biomass power plants) or for industrial boilers such as pulp & paper, food & beverage industries, etc.

The DDES further includes dynamic routing and dynamic inventory control to optimize the vehicle and energy storage media efficiency and effectiveness. As noted before, the lighter the vehicle weight the more energy efficient the trip is from a first location to a second location by reducing energy consumption and lowering rolling friction. The vehicle being autonomous is able to continue on to any RS available post the completion of the primary transport purpose, or even interject an RS recharging stop between the first and second locations (with the understanding that an incentive may be necessary in the event that the primary transport purpose is to convey people, or if the delivery of items becomes delayed and therefore subject to a delivery delay penalty). The further autonomous recharging process, particularly with the preferred utilization of charged/discharged electrolyte of a flow battery, converges high-people density locations into the new RS of the future (which would be impossible to achieve such high throughput, whether because of high peak demand charges or simply the relatively slower recharging times). The significant ease and increase in RS locations OVERCOMES virtually all of the otherwise deficiencies of current relatively lower energy density of flow battery electrolyte versus otherwise solid or liquid electrolyte within traditional non-flow battery energy storage devices.

Figure 23:
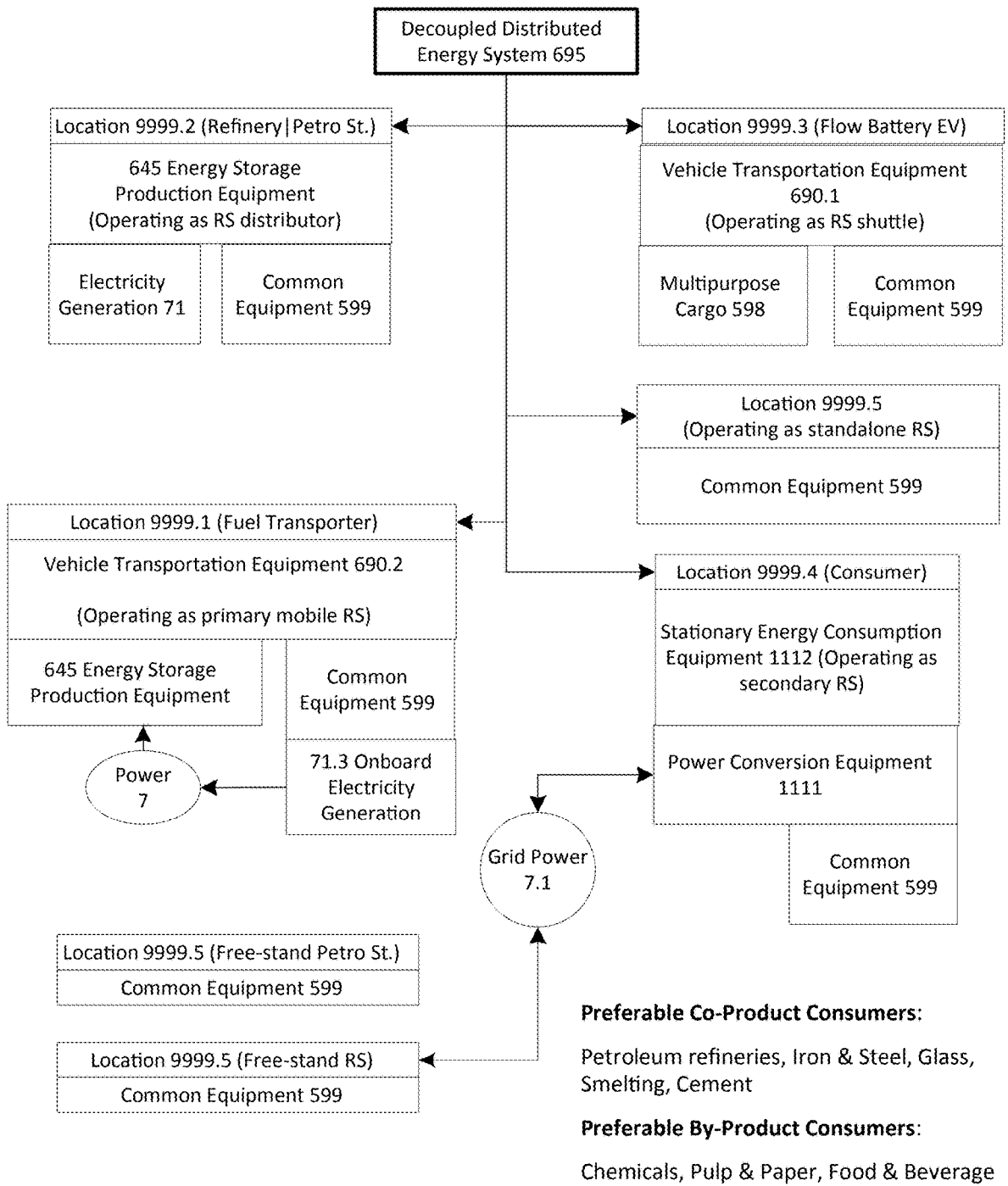
FIG. 23 is a component diagram leveraging oil and gas infrastructure for optimal capital investment

Turning to FIG. 23, FIG. 23 depicts a preferred embodiment of DDES leveraging the existing infrastructure particularly of the traditional oil and gas industry. This FIG. 23 is similar to FIG. 16 with the following noted differences. The DDES 695 utilizes refinery or petroleum station(s) as indicated as Location 9999.2 in an RS distribution capacity. This is of particular preference as the refinery distillation process utilizes oxygen co-product (as shown in earlier figure) to significantly increase its energy efficiency through homogeneous radiant combustion waste heat recovery (one embodiment as known in the art by Atreya), leverages the refinery's capabilities of shifting and/or incorporating biofuels (one embodiment as known in the art by Cai et. al.) to a renewable fuel enabling both on-site on-demand renewable electricity production and/or fungible transportation fuels to offset at least a portion of the fossil fuel fraction of existing transportation fuels, and importantly leverages the existing logistics and fleet of fuel transporters. The preferred embodiment has the fuel transporters being reconfigured to be electric or hybrid-electric with energy recovery as known in the art to reduce it's $CO_2$ footprint particularly when the fuel transporter is moving charged electrolyte to another RS and thus operational as an RS shuttle indicated by Location 9999.3. Location 9999.1 indicates a fuel transporter outfitted with an on-board electricity generator 71.1 system preferably operable with biofuels as produced within the aforementioned refinery to become a mobile RS leveraging the higher energy density of the biofuel (or petroleum fuel). Location 9999.4 indicates a traditional consumer of electricity having at least a portion of its electricity obtained via a flow battery for power conversion and consumption of the delivered charged electrolyte. Additional petroleum infrastructure includes free-standing petroleum stations reconfigured to store charged media preferably leveraging existing in-ground fuel tanks and retail store providing for a smooth transition from petroleum fuels to enhanced biofuels and then to "electric" fuels. The utilization of charged electrolyte literally maintains virtually the same refueling (but now recharging) process as currently practiced for traditional non-electric vehicles. Importantly, no new electric transmission or infrastructure is required. Additional RS locations are added, as indicated by Location 9999.5, to increase significantly the number of recharging stations. The preferred 9999.5 locations are within geographies that already have high vehicle density, and more preferably additionally high electricity consumption or demand such that the delivery of charged media is significantly consumed within the facility thus lowering the weighted average logistics cost per unit of energy delivered. Qualifying locations include manufacturing plants, shopping malls, schools, office parks, coffee shops, donut stores, etc. These locations all have passengers/drivers that spend at least a few minutes (and typically even longer) therefore an autonomous vehicle that is recharging (preferably also in an automated manner) doesn't detract from customer convenience at all, and in fact the customer will experience the benefits of valet at no additional or incremental cost. The manufacturing plants for either 9999.2 locations preferably include iron & steel, glass, smelting, and cement plants where oxygen consumption is particularly advantageous. Additional plants where waste heat byproducts are preferably leveraged include chemical, pulp & paper, and food & beverage plants. The logistics expertise within the oil & gas industry is significantly leveraged to achieve maximum distribution efficiency and enabling the bypass of the electric utility grid as a practical and high-revenue sales outlet for "excess" electricity. Having this excess electricity outlet enables the aforementioned plants (and other facilities) will have the secondary benefit of significantly increasing the opportunity for co-generation where waste heat, as known in the art, can be repurposed to satisfy on-site thermal energy requirements (i.e., both cold and hot), which are currently hindered as electric utilities often charge backup fees and offer prohibitively low purchase price for "excess" electricity.

Figure 24:
FIG. 24 is process flow diagram for vehicle route execution

Turning to FIG. 24, FIG. 24 is a process flow diagram for the inventive route scheduling component of the DDES. A novel feature of this scheduling component is vehicle 690 centric when the vehicle 690 motive power utilizes the common charged media with other energy consumers at different locations 9999. It is understood in this process that both process steps can be optionally skipped, or the absolute order can be altered, but the ability to dynamically alter the range of the vehicle through recharging (not inherently unique) and unloading of charge media (inherently unique). The first process step of Recharge, that exemplary takes place at location 9999.5 (e.g., free-standing petroleum station configured as an RS, or a standalone RS) in an autonomous vehicle takes place prior to the Pickup step. The Pickup step can be for a wide range of multipurpose cargo 598 that can include passenger/driver. In the event that the trip is long, an additional Recharge step can take place at location 9999.5 (e.g., free-standing petroleum station configured as an RS, or a standalone RS). Another scenario is such that this Recharge step is largely for the purpose of transporting charged media to another location 9999.4 that consumes the charged media, preferably when this location is en route to the final destination. The subsequent process step is a Drop-off step in which case the vehicle removes the earlier on-boarded multipurpose cargo 598, and preferably at a location 9999.4 that consumes the same charged media. In the event that the vehicle has sufficient charged media to further the trip, the vehicle has for illustrative purposes two subsequent pickup and drop-off steps of multipurpose cargo 598. Once the vehicle serves its primary transport function, additional transport logistics of secondary transport function are illustrative to significantly increase the vehicle utilization rate (including the process step of dynamically reconfiguring the vehicle preferably by loading a Tank-in-tank for additional charged media storage capacity) through the dispatch and delivery of charged media to at least one (illustrative as being two locations) location 9999.4 that consumes the charged media. The vehicle then stops at any location of convenience as instructed by the DDES dispatch scheduling component in anticipation of a next primary or secondary transport purpose. The dispatch scheduling component takes into account both revenue as noted earlier plus any potential offsets by penalty fees with the following being exemplary fees: 1) vehicle reservation drop-off delay as a function of at least (time, specific vehicle identification, vehicle type), 2) multipurpose cargo drop-off delay as a function of at least (time, specific cargo identification, cargo type), 3) multipurpose cargo pickup delay as a function of at least (time, specific cargo identification, cargo type), 4) unload charge drop-off as a function of at least (time, specific location identification, and location type), and recharge pickup delay as a function of at least (time, specific RS identification, and RS type).

The optimal embodiment of the invention is such that virtually all of the energy assets, whether producers or consumers or energy storage, are decoupled and distributed from non-dispatchable assets. Dispatchable assets, particularly energy generation assets are relatively immediately able to respond to requests for power output by active on/off control and further preferentially able to adjust their power output in response to the system (in other words, not nature driven solar or wind assets). The particularly preferred dispatchable asset utilizes renewable biofuels and is co-located at a location that leverages both co-products from metal-air energy storage asset in industrial processes and byproducts (e.g., waste heat) within the same industrial processes to significantly increase thermodynamic exergy efficiency at that location and concurrently at the aggregate across the entire DDES network. The imbalance of primary energy (e.g., electricity) consumption at the most energy intensive industrial processes, notably refineries and processes with high-temperature furnaces, uniquely leverage oxygen co-product and further translate their on-site waste heat into higher-value mobile energy storage in the form of flow battery electrolyte (bypassing the grid in its entirety) to further leverage dispatchable autonomous transport vehicles. The result is that a highly integrated decoupled and distributed system that COMBINES and optimizes residential, commercial, and industrial energy processes is vastly more efficient in terms of system exergy, asset utilization, and revenue generation bypassing the significantly expensive and long payback period of otherwise standalone energy storage systems. Current visions of a fleet of mobile energy storage systems (i.e., electric vehicles), non-flow battery type, are marginally more cost-effective but sacrifice vehicle utilization and mobility to serve that function and have no practical method to serve its primary function without varying the destination of the electric vehicle without sacrificing either the passenger convenience or the effectiveness of mobile energy storage at its point of energy consumption.

Figure 25:
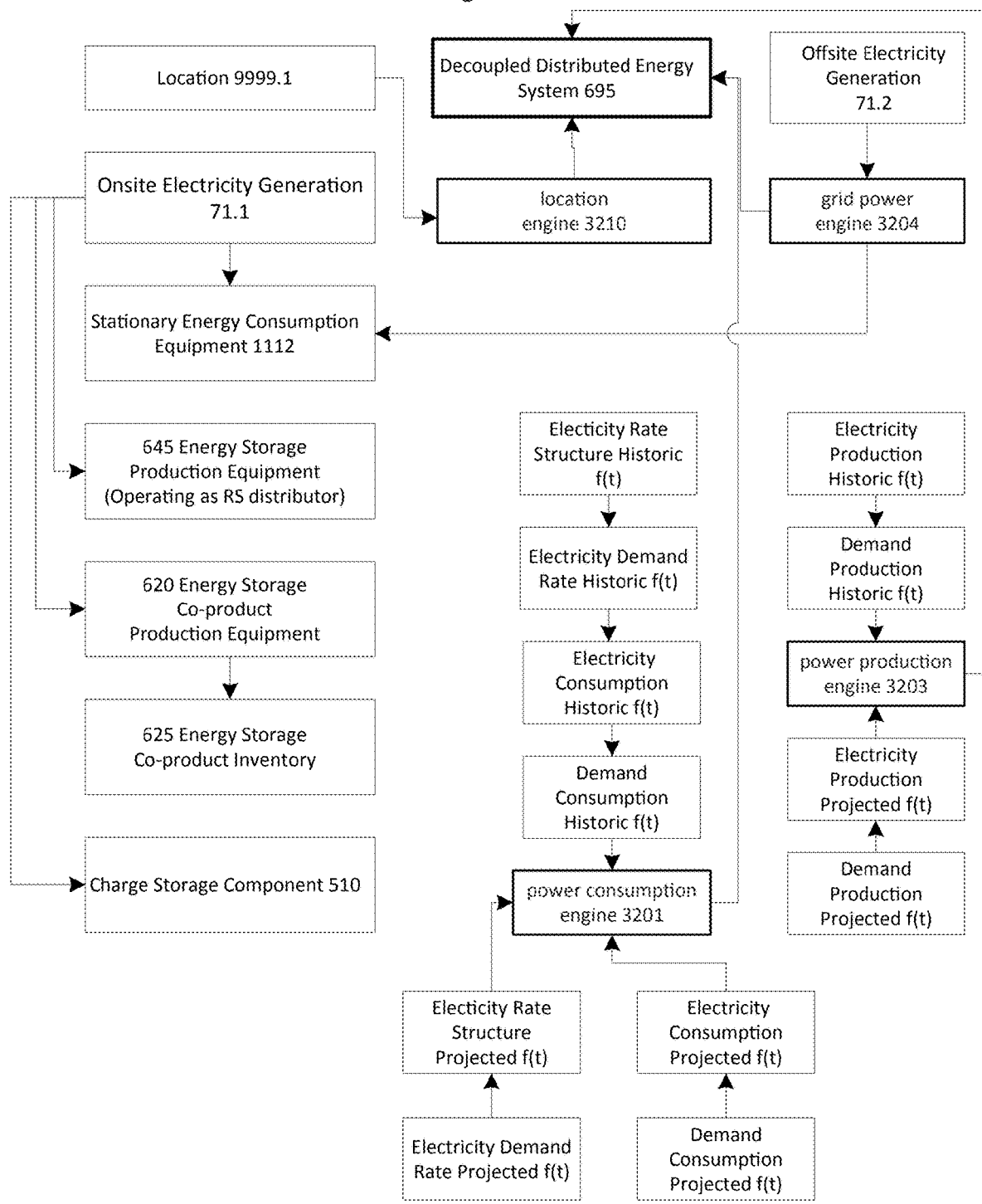
FIG. 25 is component diagram for energy assets

Turning to FIG. 25, FIG. 25 is another perspective of effectively FIGS. 8 and 13 though now functionally separated by a representative location 9999.1 and it's associated system components with more clear representation of the inter-relationship to the key control engine elements of the decoupled distributed energy system 695, notably the location engine 3210, the grid power engine 3204, the power production engine 3203, and the power consumption engine

3201. The location engine 3210 coordinates many location specific aspects of the system notably the onsite electricity generation 71.1 in-conjunction with the offsite electricity generation 71.2 (a.k.a. grid electricity) so as to ensure that the stationary energy consumption equipment 1112 always has adequate available energy to enable proper operations of the primary mission at the location (which can range from a high-temperature industrial process such as steel, cement, glass, oil refinery, etc. to a more ordinary retail store or commercial office building). Additional location specific components include energy storage production equipment 645, which is the energy storage components capable of storing any excess energy made available by the aggregate of offsite electricity generation 71.2 and onsite electricity generation 71.1 beyond the real-time demands of the stationary energy consumption equipment 1112. The power production engine 3203 coordinates the operations of the onsite electricity generation 71.1 based on real-time requirements the status of energy storage production equipment 645 (i.e., is the energy storage fully charged or still have capacity to be charged, or due to expensive electricity rate structure projected as f(t) and/or high electricity demand rate projected as f(t))) so as to maintain the location 9999.1 peak demand below a critical threshold to reduce monthly or annual peak demand charges. The operation of the onsite electricity generation 71.1 virtually always yields the co-product of waste heat and carbon dioxide, all which can be valorized (to increase value) respectively for additional electricity production or process heating, or carbon dioxide to greenhouse or microalgae in which carbon dioxide increases their respective yields. The availability of energy storage co-product storage managed or produced directly by operations of onsite electricity generation 71.1 or indirectly by the charging of metal-air batteries that produce high-value oxygen (that can be used for increasing energy efficiency of high-temperature furnaces as one example). In many instances the value of the oxygen from charging of metal-air batteries is more valuable to the onsite operations of stationary energy consumption equipment 1112 than wholesale selling of electricity to the grid (i.e., net-metering to the offsite electricity generation 71.2) and therefore explicitly the power production engine 3203 when the energy storage co-product inventory is not at full capacity would elect to produce an excess amount of electricity when both the co-product inventory and 625 and energy storage inventory 645 (e.g., metal-air battery) are not at full capacity, especially when the electricity energy and demand rates of the offsite electricity generation 71.2 are less than favorable. It is understood that energy storage co-product production equipment 620 may be needed to make the co-product more readily useful for onsite or offsite co-product consumption. Excess electricity produced (or available even from the grid when electricity and/or demand rates are particularly favorable) to either stationary energy storage 645 or mobile/dispatchable energy storage (a.k.a. charge storage component 510) that would be transported to a second location.

The power consumption engine 3201 utilized the electricity demand rate projections as f(t) in combination with the electricity rate structure projections as f(t) further in combination with the electricity consumption projections as f(t) with demand consumption projections also as f(t) of the stationary energy consumption equipment 1112. The projections are further a function of the historic rate electric (energy) structure, the historic rate demand, electricity consumption, and demand of consumption all as a f(t).

The power production engine 3203 controls the onsite electricity generation 71.1 equipment that has accumulated a historic performance that includes electricity production (often as a function of temperature, fuel, etc.) yielding both energy efficiency and demand production (e.g., capacity). These parameters, all of which are f(t), serve to create projections of f(t) for demand production and also electricity production. The invented decoupled distributed energy system 695 operates the onsite electricity generation uniquely taking advantage of additional co-production assets and dispatchable energy storage assets, particularly when the dispatchable energy storage assets create a co-product specifically useful at the same location in which the onsite electricity generation is operating. It is further understood that modular size onsite electricity generation equipment can be dispatched to a second location particularly when the second location has a need for the co-product in additional to the dispatchable stored electricity within the charge storage component 510 (dispatchable battery of charged electrolyte).

Figure 26:
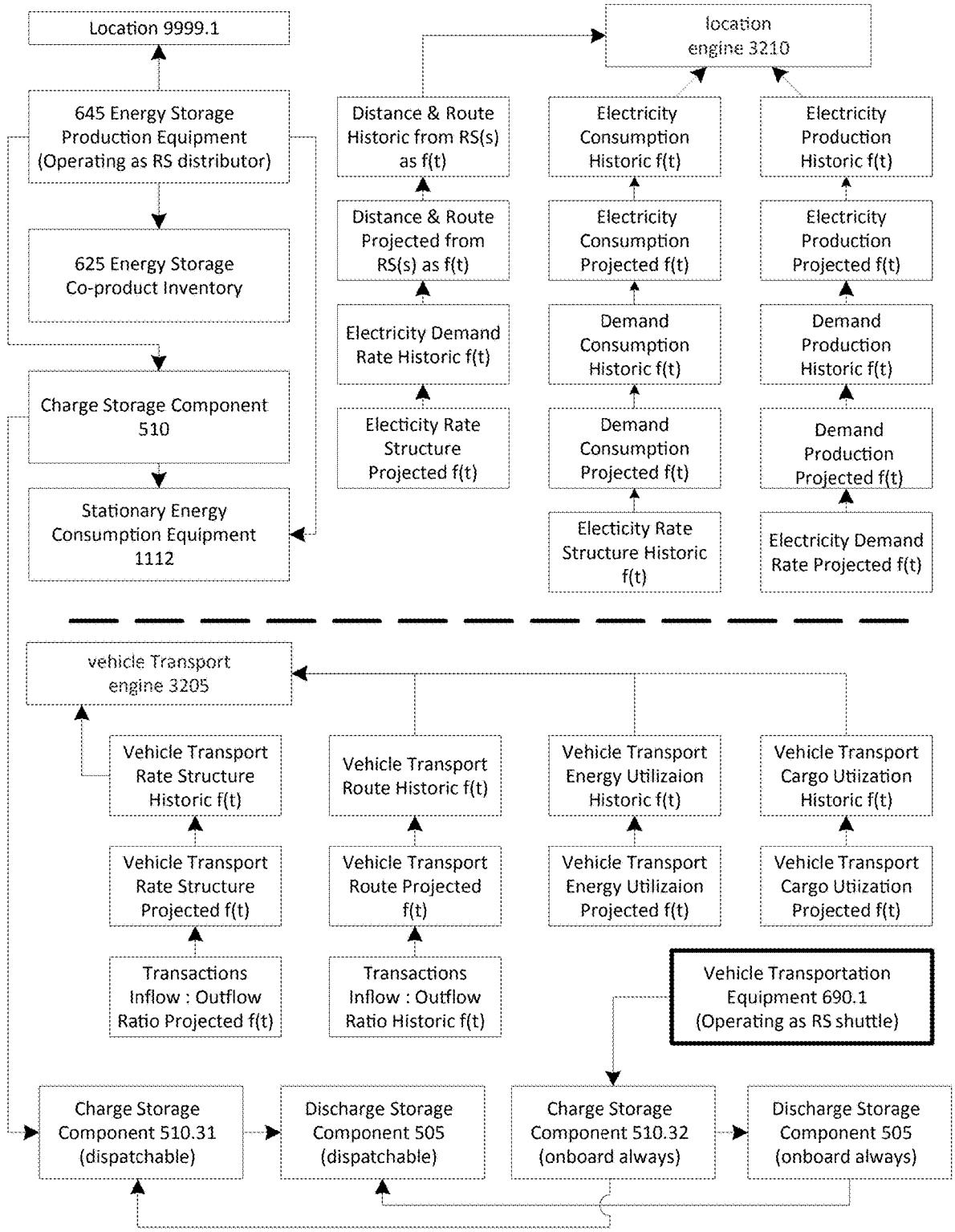
FIG. 26 is component diagram for energy and vehicle transport assets as a function of location
Figure 33:
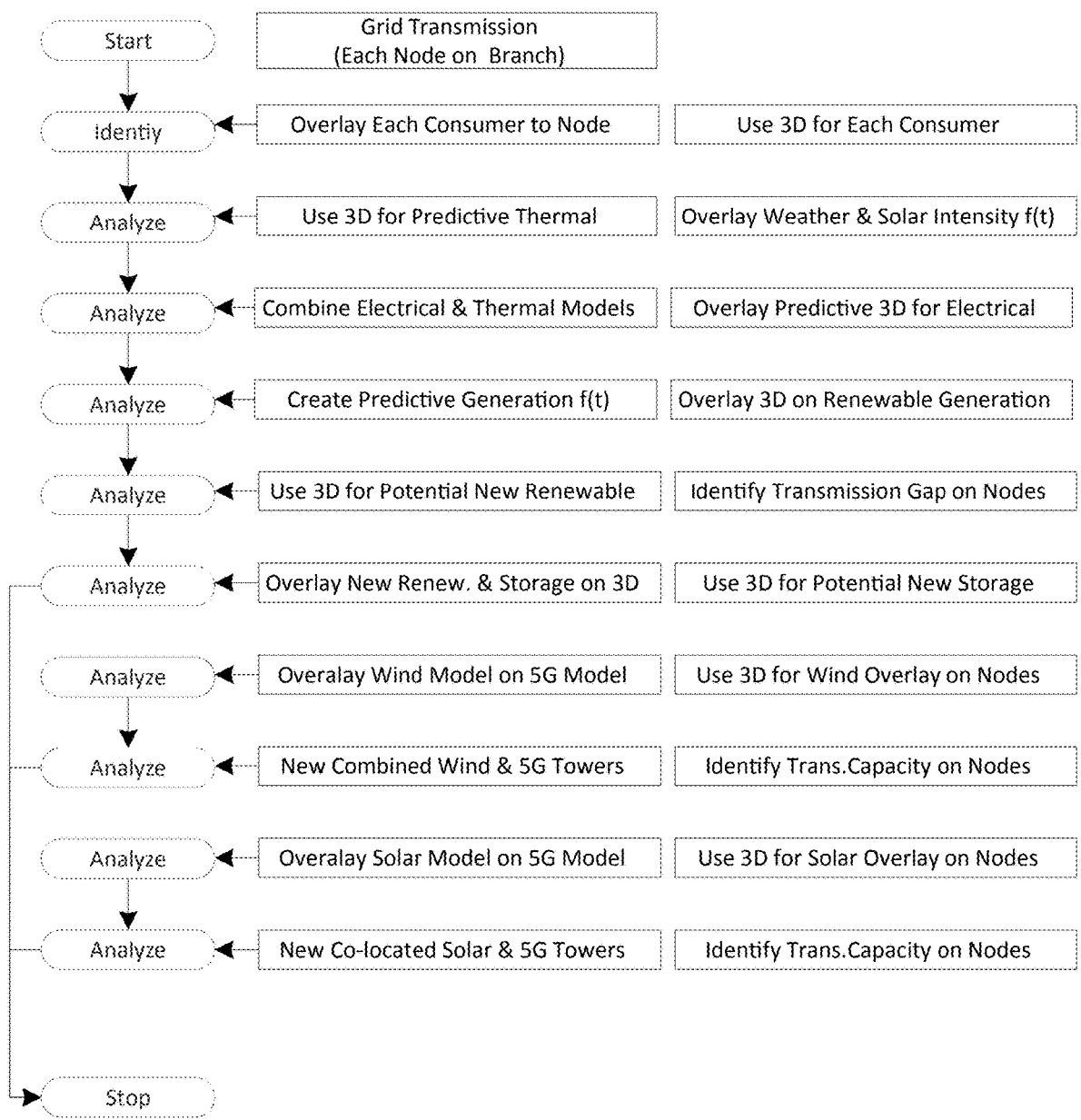
FIG. 33 is a high level process flow integrating a 3-dimensional geospatial dataset to improve predictive energy modeling of electrical and thermal loads

Turning to FIG. 26, FIG. 26 is a differently organized view of FIGS. 8, 11, and 12 for clearer enablement details. The location engine 3210 primary purpose is to utilize historic energy and demand data to ultimately create a forward-looking predictive model of energy consumption and peak demand that is then the foundation for coordinating of energy generation assets and ultimately the coordination of energy storage assets. The location engine uses the historic electricity rate structure as a function of time "f(t)" combined with historic electricity consumption f(t) and historic demand consumption to create, preferentially with machine learning, into a projected demand consumption f(t) and projected electricity consumption f(t). The integration of weather predictions in combination with 3-dimensional geospatial "3D" data provides high-accuracy projections of energy consumption and demand by accounting for location-specific impact of wind speed, wind direction, solar vector onto the location's infrastructure in combination with solar intensity as accounting for seasonal variation (as known in the art) and also weather predicted cloud coverage. The 3D model uniquely enables location specific solar shading and wind breaks such as obtained by the precise position of a tree, a hill, or even a neighboring set of buildings. The 3D model also is then uniquely integrated into the location's grid transmission system, and all of the branches and nodes within those branches to precisely overlay the projected energy consumption and demand f(t) into the same 3D model. FIG. 33 provides more detail on the use of the 3D model to uniquely solve both primary and secondary distributed energy deployment enabling the optimization of grid resources and the maximization of on-site renewable energy generation assets.

The projected electricity demand rate f(t) establishes the financial value associated with operating decisions made by the system based on projected demand production f(t) having improved accuracy leveraging also the 3D model overlaid on the historic demand production f(t) so as to provide a projected electricity production f(t) which itself is also overlaid on the historic electricity production f(t). It is understood that all historic data tightly integrates the then current weather data (i.e., wind, rain, cloud coverage, solar vector, etc.) even retroactively and further integrated with 3D model data also retroactively. A fundamental flaw associated with machine learning is both the requirement for very large data sets and even then, often fails to lead to good predictive models. The most common reason for failed predictive accuracy is simply insufficient data to establish modes of operating to properly segment data. One instance that is improved by the 3D model is a tree or adjoining building that blocks the sun during the winter and thus reducing "free" heat from the sun, or the same tree blocking the wind during the winter and therefore reducing the heating losses from the building at the location of interest. Without this important knowledge even entirely accurate predictive weather data will fail to provide a good projected energy consumption f(t) and projected demand consumption f(t) as well as projected demand production f(t) for any local wind generation capacity.

Another critical feature of the inventive system is the dispatch scheduling of energy generating assets (both electrical and thermal) by accounting for both the electricity consumption f(t) and electricity demand consumption f(t) of the first location and the same parameters f(t) of the second location, plus the inclusion of energy consumption associated with the dispatch and transportation of roaming (i.e., non-stationary) energy storage assets 510 as they are transported from the first location to the second location. The system also allocates excess energy generation between the roaming energy storage assets 510 and non-roaming energy storage assets through at least in part the energy storage production equipment 645 that optimally also produces concurrently an energy storage co-product into a storage vessel for non-real-time inventory 625. The energy consumption during such transport is a function of the weight of the energy storage, the physical footprint of the energy storage that influences the size of the transport vehicle, and of course the distance and route associated with the transporting from the first location to the second location. The transport energy consumption, which is draws upon either or both energy stored in the transported energy storage assets (as well as from integral energy storage asset of the transport vehicle when such vehicle is an electric vehicle), is projected accurately by taking into account the historic distance and route of (i.e., being the roaming storage "RS(s)" between each available first location and second location pairing) the RS(s) as a f(t). The system uniquely uses the period of time between the first location peak demand occurrence and the second location peak demand occurrence while accounting for transport time and transport energy consumption as drawn from the transported roaming storage to coordinate the precise time in which the RS should stop being charged at the first location, the precise time in which the RS should begin being transported from the first location to the second location after evaluating and down-selecting in fact which is the optimal second location for the RS to be transported to. Contrary to prior art, the decision of transporting energy storage assets to a second location is not based only on projected energy consumption at the second location BUT in fact on the timing of peak demand at the second location relative to the first location's peak demand and the rate differential between the first locations peak demand rate structure and the second locations peak demand rate structure while accounting for transport time between the first and second location.

The vehicle transport engine 3205 coordinates the transport of RS assets from a first location to a second location, while also providing the overarching system with vehicle specific information as well as routing specific information for first determining what is the appropriate second location to transport the RS asset(s) from the first location to the second location and selecting when more than one vehicle is available the appropriate transport vehicle 690.1. The combination of available transport vehicles 690.1, their respective total capacity and available capacity, with the demand for an appropriately sized RS asset required at the second location (and potentially even considering the next location(s) being the third location and fourth location, etc.) and then while transporting the RS asset(s) optimally leveraging the RS asset to improve the energy recovery of the vehicle transport moving the RS asset from the first location to the second location. The selection of the transport vehicle 690.1 is based on vehicle transport historic rate structure f(t) that is then utilized by the vehicle transport engine 3205 to select an appropriate transport vehicle based at the minimum on vehicle transport cargo historic utilization f(t) and vehicle transport historic route f(t) (i.e., historically accounting for traffic and routing at time of day and day of week, etc. to predict both the amount of time it will take to transport RS asset from first location to the second location and how much incremental energy the transport vehicle will consumer). The historic f(t) is then utilized by the vehicle transport engine 3205 to calculate the vehicle transport projected rate structure f(t) and the vehicle transport projected route f(t). The cargo capacity of the transport vehicle, including the total capacity and the available capacity is furthered combined with the historic ratio of transactions inflow:outflow ratio f(t) to also create a projected transactions inflow: outflow ratio f(t) such that the cargo, including an RS asset charged to discharged ratio is included when the RS asset is a flow battery electrolyte. It is understood that the revenue realized by the transport vehicle 690.1, or least the method to reduce the operating expense of every trip between locations, is maximized by maximizing the capacity utilization all things equal and more so maximizing the cargo (non-RS asset) capacity will yield higher revenue (as the revenue value per physical volume and physical weight is typically lowest for RS asset relative to other cargo such as food, groceries, Amazon delivery, restaurant food delivery, etc.). Cargo utilization is projected f(t) based on scheduled cargo logistics requirements (i.e., the need to move from first location to either a second location or even a third location, including an intermediary location that is approximately on-route between the otherwise route between the first and second location) and the historic cargo utilization f(t). Once the projected RS asset(s) and cargo are projected the appropriate transport vehicle 690.1 is able to be down-selected also taking into account the now calculated transport vehicle energy utilization based on first the historic f(t) to create a projected f(t). The optimal transport vehicle is also an electric vehicle that is now able to leverage the combination of its onboard always charge storage 510.32 (i.e., battery when it is not a flow battery) and onboard always discharge storage 505.34, where the transport vehicle during braking or decelerating is now able to have a larger inrush current due to the aggregate battery capacity of the onboard always with the dispatchable charge storage 510.31. Virtually all of the aforementioned parameters are utilized to determine the second location that is a function of cargo logistics and requirements for the RS asset to be dispatched and ready to meet the second location's peak demand f(t) such that the RS asset is dispatched to reduce the on-grid or on-site energy (KW) demand requirements. The vehicle transport engine 3205 selects both the transport vehicle 690.1 and at least the second location (which may be a further function of a third location) in which an RS asset and/or cargo is required at that second location.

Figure 27:
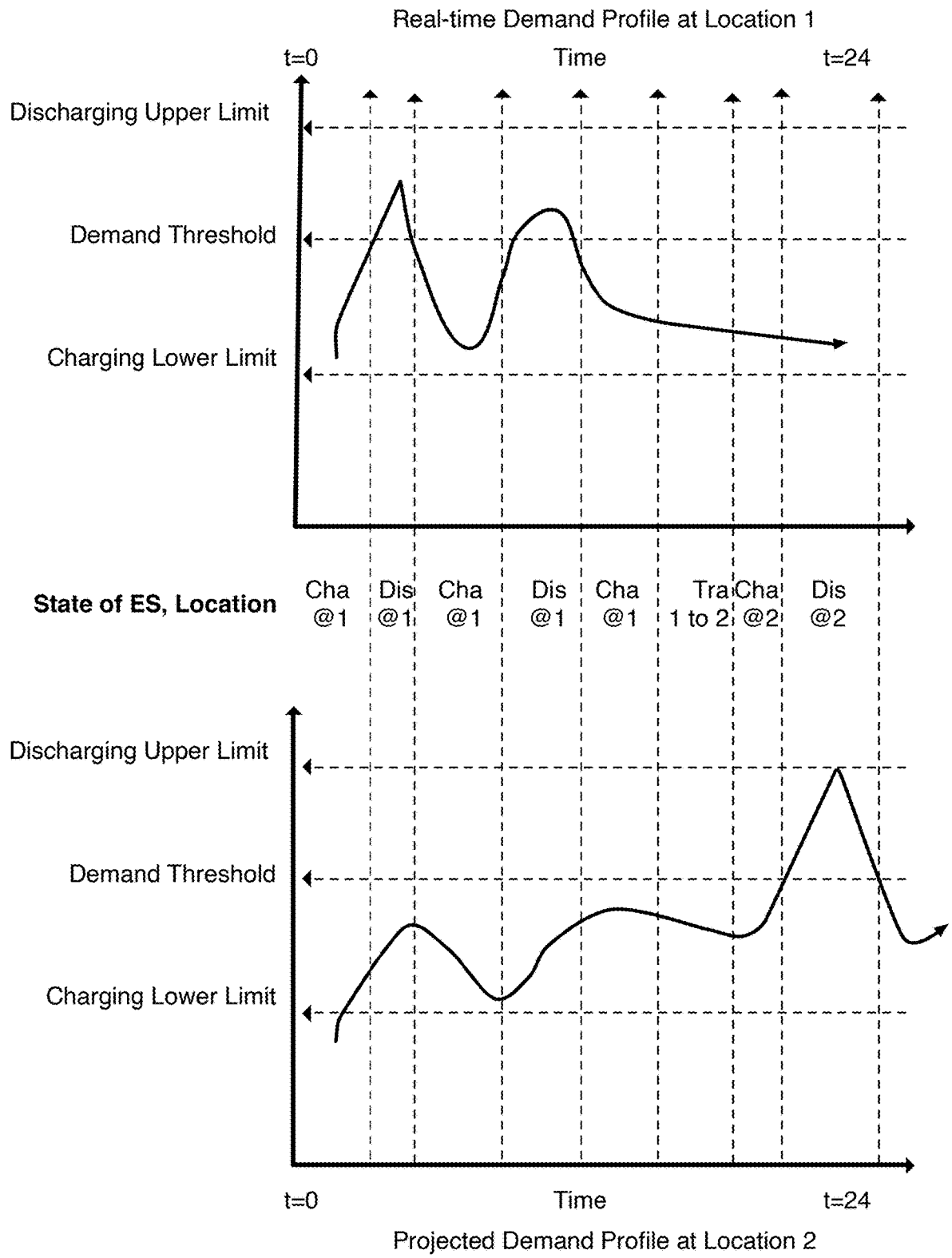
FIG. 27 is time function of real-time demand profile at a first location 1 as it relates to a second location 2

Turning to FIG. 27. FIG. 27 depicts the time function f(t) of overlapping peak energy demand at a first location with the second location (only one is shown, when in reality every second location candidate would also be overlapping with the first location). The system at the least would use the historic demand profile of the first location overlapped with the second location for advance planning, yet more optimally the system would use the projected demand profile of the first location overlapped with the second location for advance planning, and particularly optimal the system would use the shown real-time demand profile at the first location for real-time control of charging the RS asset as indicated by "Cha @ 1" meaning charge state at location 1 and discharging the RS asset as indicated by "Dis @ 1" meaning discharge state at location 1. As noted in FIG. 26 the RS asset can also be used by the transport vehicle as indicated in FIG. 27 "Tra 1 to 2" meaning travel between first location and second location. The respective demand profile at location 1 (top) and demand profile at location 2 (bottom) both have a discharging upper limit for the location such that the RS asset must be utilized to maintain the peak demand at the respective location below that absolute kW peak demand limit. The Demand Threshold is the target kW peak demand that the location such that the RS asset is utilized to strive to maintain the location peak demand below such level, and as such that RS asset switches between charge and discharge states as a function of the shown real-time demand at the location. The Charging Lower Limit is the lowest stored energy within the RS asset such that the RS asset can achieve it's intended mission of reducing the peak demand at the second location. It is critical to note that the RS asset can't discharge beyond the Charging Lower Limit at location 1 in order to serve properly the location 2 which can include energy consumption by the transport vehicle during RS logistics transit. It is another critical feature of the system that transport vehicle availability enables the RS movement from first location to second location. It is one other critical feature that the system determines whether or not to RS charging at either the first location or the second location, once it is determined when the RS must leave first location to arrive at second location in time to meet second location peak Demand Threshold such that the relative electricity energy rate at the first location is compared to the second location (in addition to the determination whether or not the first location can benefit from any co-product produced).

Figure 28:
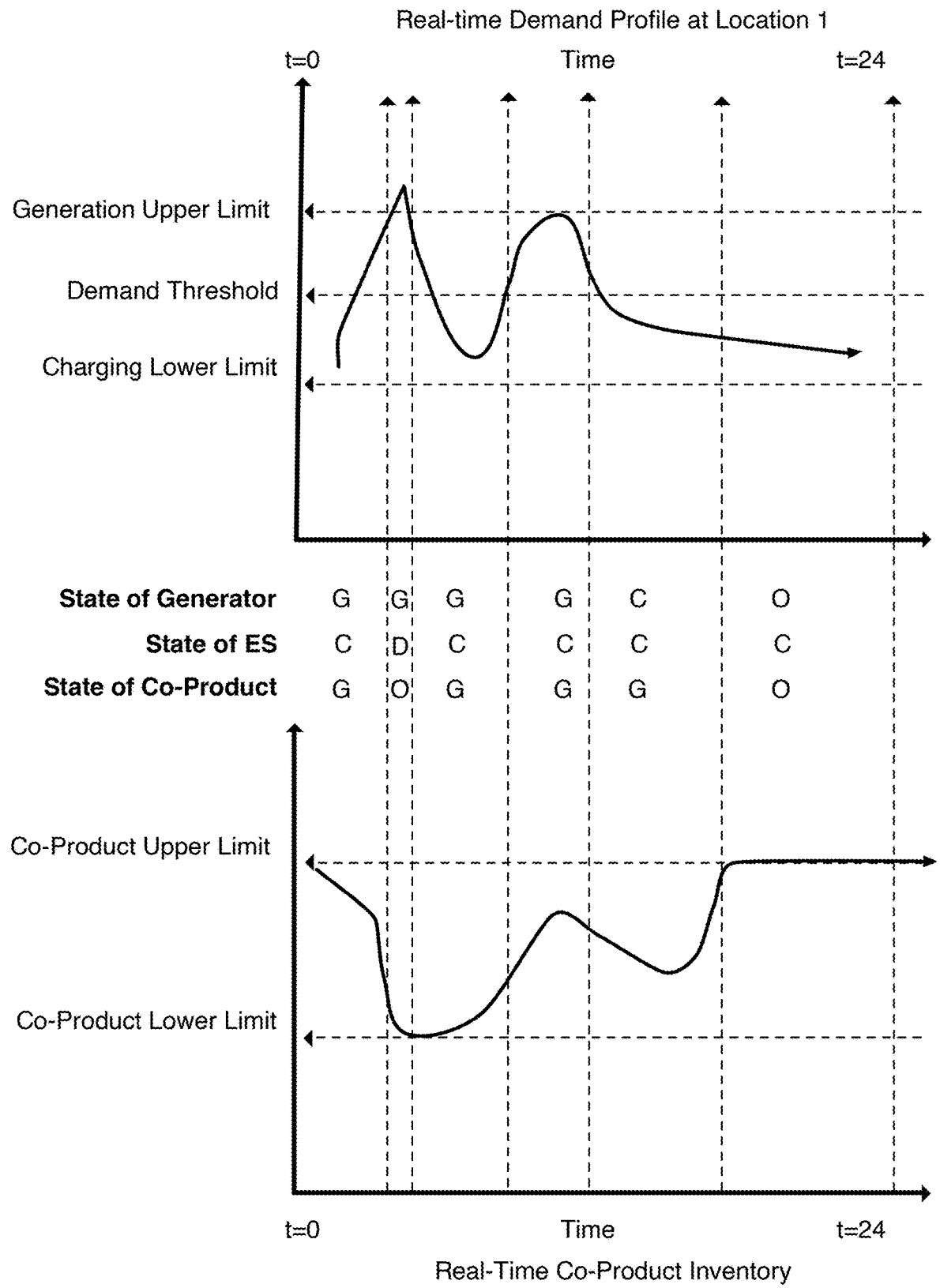
FIG. 28 is time function of real-time demand profile at a first location 1 and its corresponding real-time co-product inventory at the same location 1

Turning to FIG. 28, FIG. 28 depicts the demand profile at first location (Location 1) relative to second location (Location 2) both as f(t) where at least the first location has on-site energy generation capacity. The "G" is indicative of generation whether it be for electricity that is either used at the first location or for charging the RS asset. The "C" is indicative of charging of the RS asset, as well as generator operating but for the sole purpose of providing electricity to the RS asset beyond that which is required at the first location. The "O" is indicative of no demand whether it be of generator, RS asset, or co-product. The first instance of "G C G" is where the first location demand is above the Demand Threshold therefore triggering the on-site generator to generate electricity so as to keep the demand as close as possible to that Demand Threshold. The process of running the generator creates co-product, such as waste heat, and the process of charging a metal-air battery RS asset generators oxygen both being fundamental inputs in also establishing whether the on-site generators operate in electricity production mode and not just the peak demand of the first location. The second instance of "G D O" is exemplary of where operating the on-site generator exceeds its Generation Upper Limit and therefore the first location uses stored energy from the RS asset (i.e., is now in discharge mode). The instance of "C C G" is where the generator is operating predominantly for the purpose of generating electricity to charge the RS asset and also to produce co-product (as the inventory tank is not at full capacity and therefore is capable of storing the co-product). The instance of "O C O" doesn't have the on-site generator in generation mode due to neither demand of the first location (i.e., being below the Demand Threshold) and the Co-Product Inventory tank being full therefore no primary or secondary benefit is realized.

Figure 29:
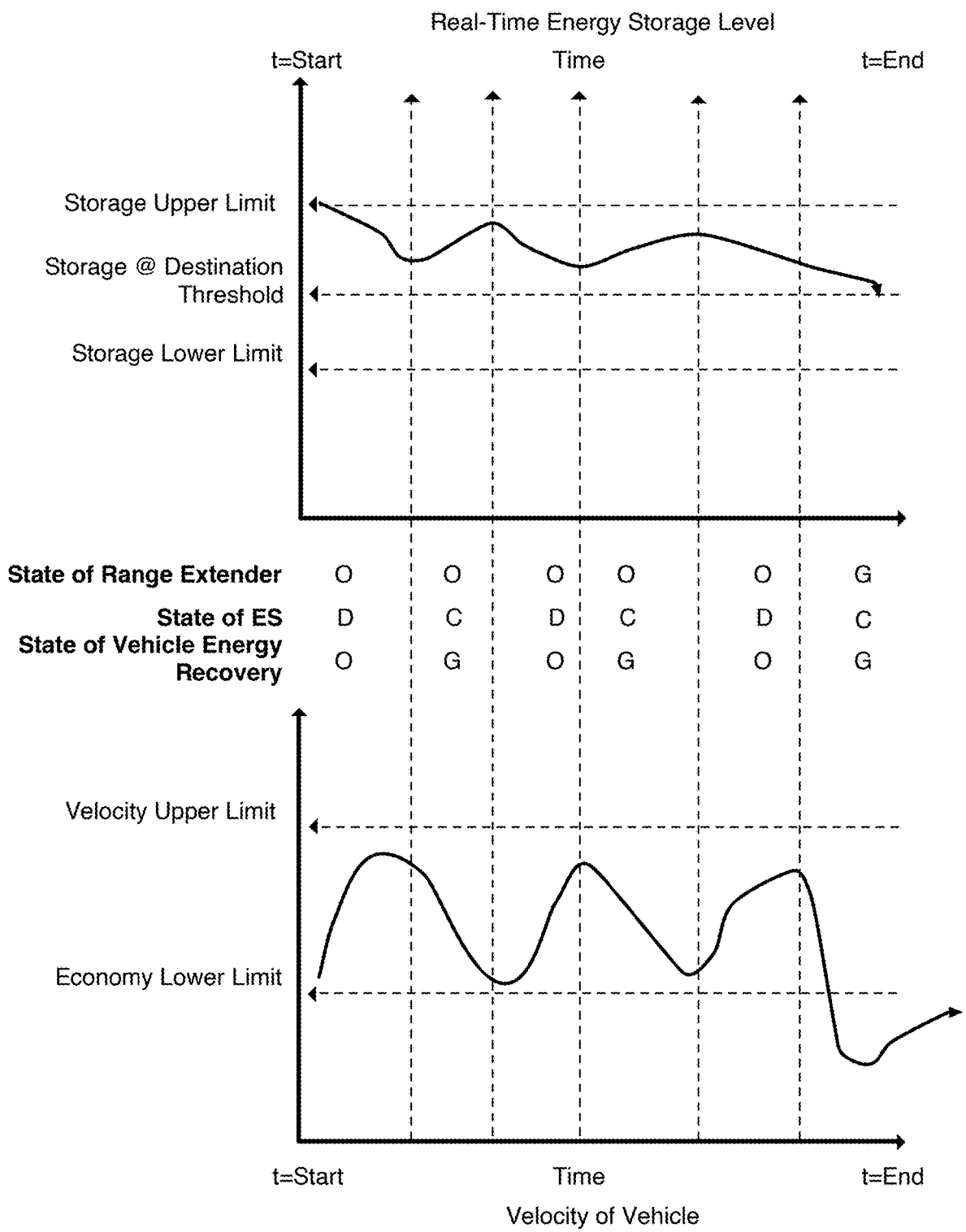
FIG. 29 is time function of real-time energy storage level for vehicle, state of vehicle energy recovery system along with time function of vehicle velocity

Turning to FIG. 29, FIG. 29 depicts the RS charge level state during transport from a first location to a second location such that the RS provides (or receives) energy to/from the transport vehicle 690.1 (though not shown). The range extender is functionally the same as a generator at a fixed location (such as first location), though on a transport vehicle is substantially more expensive to operate than the electricity already onboard of the vehicle (whether it be part of the transport vehicle or dispatchable to the second location). This figure shows the state points of the range extender, the RS asset, and the transport vehicle energy recovery system. The bottom figure shows the velocity of vehicle overlaid with the RS asset energy storage level both as f(t). There is only one instance in which the range extender operates, and most likely due to excessive traffic or weather delays beyond the projected vehicle energy consumption where without operating the range extender the RS asset will fall below the Destination Threshold and therefore fail to meet its mission of reducing peak demand at the second location. The vehicle energy recovery system is capable of recovering energy whenever the RS asset is below the Storage Upper Limit. The Storage Lower Limit is the RS asset energy state in which it is critical that the RS remains above, and therefore even if the state of charge is above the Destination Threshold the range extender would need to operate for the purpose of charging the RS asset.

Figure 30:
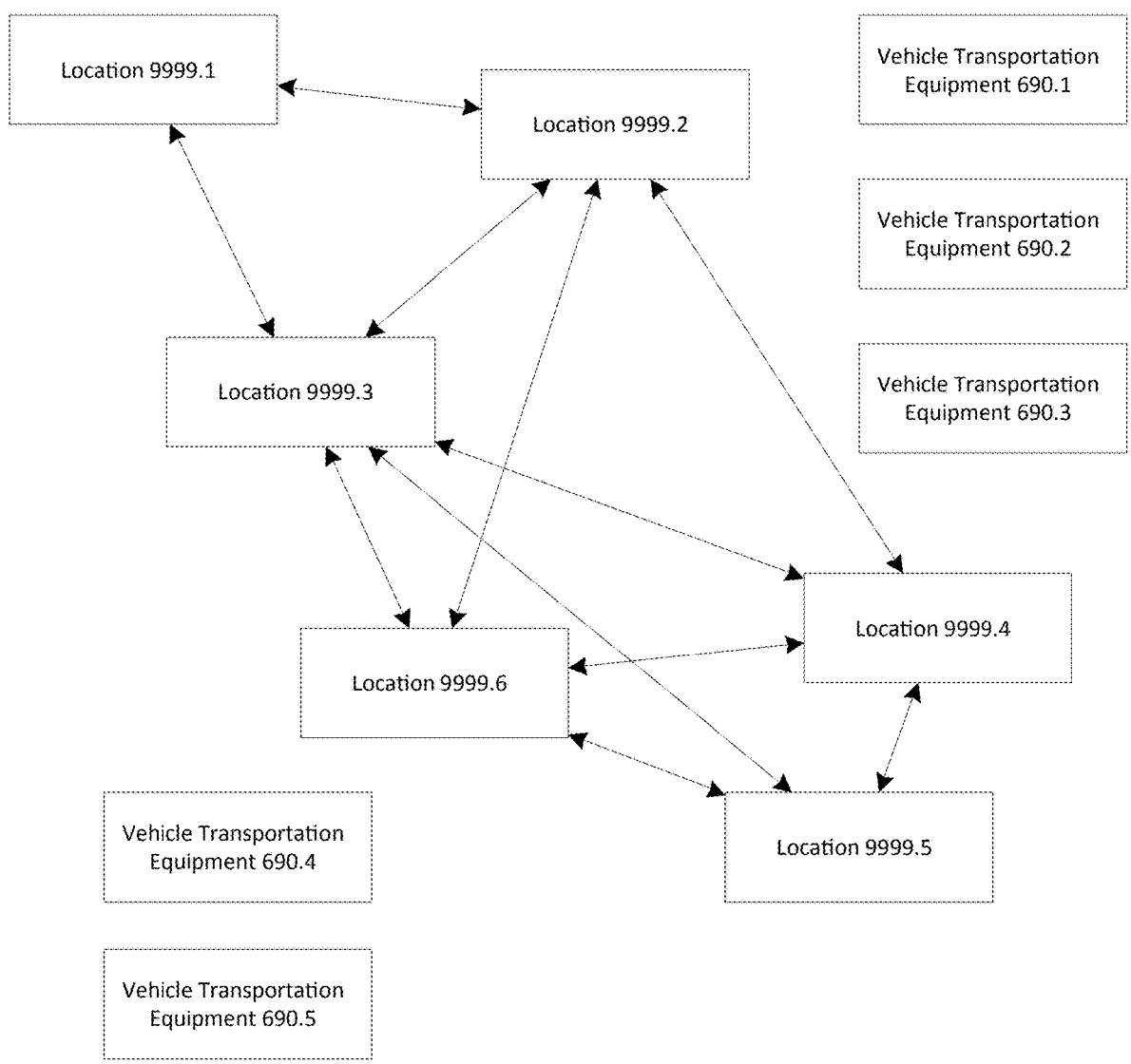
FIG. 30 is top view of relative position of locations to each other with vector representation of travel between respective locations, along with pool of transport vehicles to move energy storage and/or cargo between locations

Turning to FIG. 30, FIG. 30 depicts the multiple routing vectors between each of the first and second locations relative to each other 9999.1 through 9999.6. The Figure essentially is a top-down view also showing the relative location of available transport vehicles 690.1 through 690.5. The system will utilize parameters as shown in the next figure to make the determination as to which transport vehicle should be used to transport RS assets from a first location to a second location.

Turning to FIG. 31, FIG. 31 depicts four tables showing parameters first of the Energy Storage "RS" Assets, Locations, Transport Vehicles, and Cargo. Energy Storage Assets, as shown for Battery 1 through Battery 8, has a current location (such as first, second, etc, location), a current charge state (kWh), a full charge state (battery capacity when fully charged), a projected charge rate per hour (which is based on current state of charge, age of battery, and type of charger), all resulting in the critical projected time to reach the fully charged state at the estimated time of departure "ETD" in kWh in order for the RS asset to accomplish its mission at the second location. The Locations table shows the historic energy use f(t) for each location (where "h" indicates historic, and "e" indicates energy), projected energy use f(t) (where the "p" indicates projected), real-time energy use f(t) (where the "r' indicates real-time), historic, projected, and real-time demand respectively as f(t), the routing times between each location and the other location candidates (shown only as historic, though understood to also include projected and real-time) where x is for each of the other locations with exemplary of first location being from the second to the sixth location), the time of which peak demand occurs (i.e., when the RS asset must arrive at the destination second location) and the Charge State Required at ETA (i.e., the amount of stored energy within RS asset) with both required in order to properly achieve the peak demand reduction at the second location. The Vehicles table shows the current location of the transport vehicle 690.1 (not shown but referenced as Transport Vehicle 1 through 7), the Current On-Board Charge State, the Full(y) Charge(d) State, the Projected Charge Rate per hour (state of charge of onboard battery), the Projected Time to reach Full Charge State at ETD (estimated time of departure), as well as Incremental In-Route Energy so as to provide comparative transport vehicle energy use between transport vehicle types, Primary Cargo Energy Storage Capacity (i.e., the maximum amount of RS energy stored that can be dispatched from a first location to a second location), and Secondary Cargo Non-Energy Storage Capacity (i.e., how much non-RS asset cargo can be carried, so as to maximize cargo logistics revenue). The Cargo table shows the parameters of where Current Inventory for each location, Ordered Items (meaning where is Cargo required to be for consumption), Real-time Energy Use (provides incremental energy consumption normalized by transport vehicle), Physical Space (provides how much space within the cargo area of a transport vehicle is required), Weight (provides how much does the cargo weigh), Storage Conditions (any special storage conditions for onboard transit), Stacking Limitations (any special limitations as to how the cargo is loaded and packed for onboard transit), Receiving Conditions (i.e., any special package stacking or storage conditions limitations at destination), and Max(imum) Receiving Storage time (i.e., the maximum duration of cargo being stored at the receiving location prior to final delivery to consumer).

Figure 32:
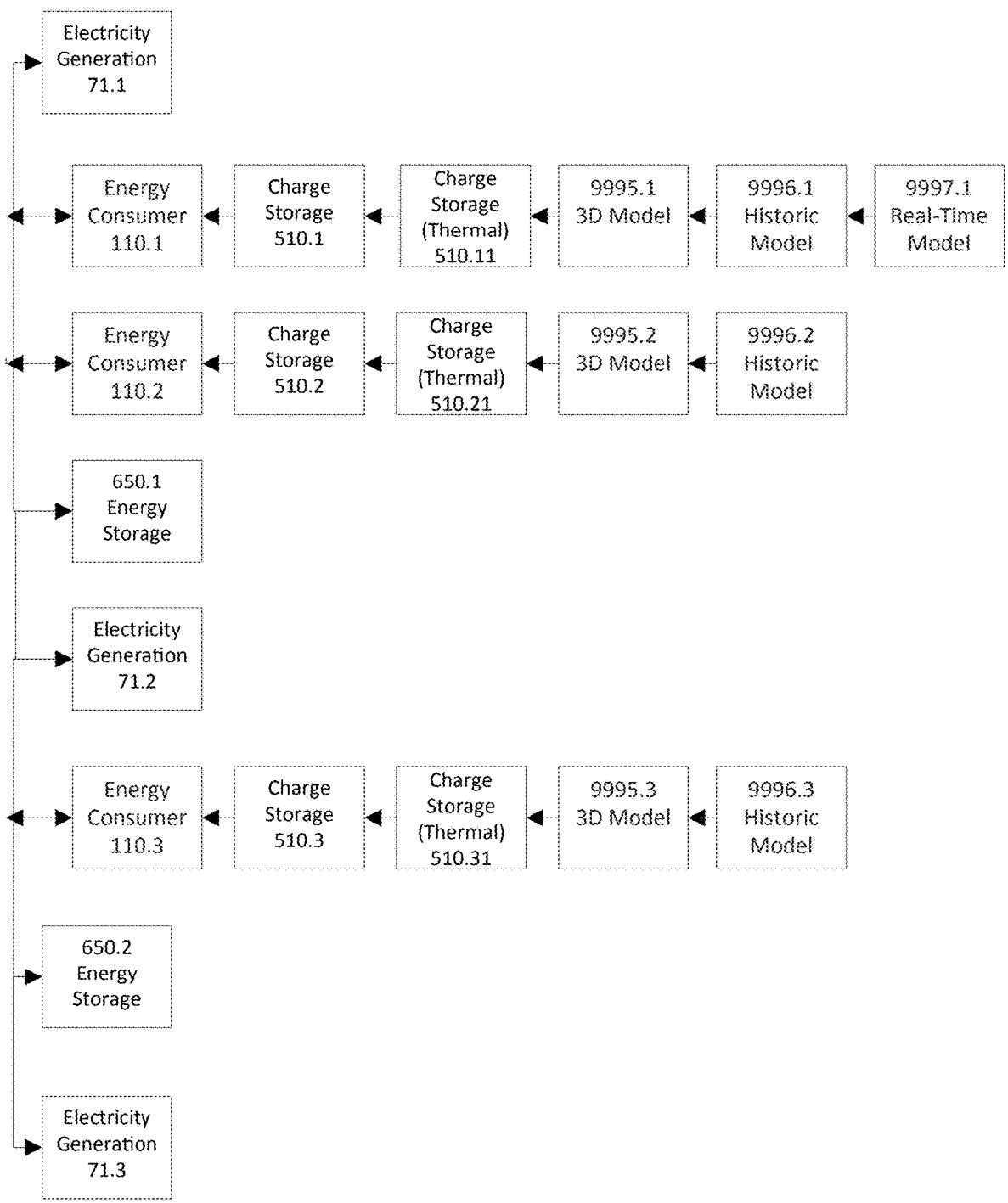
FIG. 32 is a transmission grid with depicted branches and nodes within the branches integrating a 3-dimensional geospatial dataset

Turning to FIG. 32, FIG. 32 depicts a 2d (top down) view of an otherwise 3d (fully geospatial including altitude) model of the grid transmission system. The grid is comprised of at least one generating asset, though shown having three 71.1, 71.2, and 71.3 along the grid. The grid is depicted as a single linear grid, though it is understood the transmission grid actually contains many branches and many nodes on each branch. Energy Consumer 110.1 represents one node in which behind the meter energy storage is present, which can include electrical charge storage 510.1, thermal charge storage 510.11 all of which is represented in 3-dimenstional "3d" geospatial space as well as having a historical model of energy consumption 9996.1 (preferably in as much detail as possible, but most importantly thermal energy consumption models for heating, air conditioning, refrigeration, hot water) in addition to real-time models 9997.1 such as being obtained via smart meters as known in the art. It is a critical feature of the system in establishing projected energy consumption at the location (whether it be first or second or third or . . . ) that the building (a.k.a. location) utilizes the 3d model 9995.1 to more accurately predict the projected energy consumption by normalization first the historic model 9996.1 using the 3d model to account for wind speed, wind direction, solar intensity, solar vector such that the 3d model includes shading and barrier associated with additional items within the 3d model (e.g., trees, relative altitude, relative position of hills/mountains, wind sensor data, as well as additional co-located buildings or infrastructure etc.). Additional standalone energy storage (i.e., on-grid, not behind the meter) 650.1 is present on the transmission grid, with the ideal embodiment such that the RS assets can be deployed to either standalone energy storage placement or behind the meter energy storage placement by the inventive dispatchable energy storage assets. It is understood that any of the energy consumer locations 110.1 through 110.3 can and likely will have co-located energy generation assets including solar panels or wind turbines or on-site generators.

It is understood that the invention includes and anticipates known in the art methods to physically link the vehicle transport energy storage tanks (or batteries) to the energy consuming assets utilizing automated or semi-automated equipment with automated aligning methods and multi-factor with multi-location authentication methods to reduce (or preferably eliminate) any opportunities to alter the status of the charged or discharged energy storage medium.

Turning to FIG. 33, FIG. 33 depicts process flow logic specifically around the 3d model and how the inventive system leverages the 3d model to optimize the performance of the distributed decoupled energy storage system as well as deployment of renewable energy producing assets particularly optimizing for 5G communications placement. The process logic begins by evaluating historic, projected, and real-time energy consumption (demand, voltage, current, power factor) for each node on each branch. Preferably each consumer, and consumer to consumer model is provided for in the 3d model. Each consumer is overlaid onto the appropriate node and then the appropriate branch so as to provide a high accuracy projection of energy consumption f(t) and peak demand f(t) for each branch of the transmission grid. The system analyzes the historic data, including retroactively embedding weather and/or solar intensity data onto historic data accounting preferably for the 3d model in the creating a high-accuracy (at least 5% more accurate than without retroactive data or without 3d model data) projected energy consumption and peak demand for each branch and each node on its branch. Of particular importance is the projected thermal load f(t) due to the thermal loads being the primary candidate for load shifting in addition to lower cost thermal energy storage (whether be dispatchable or stationary). Projected electrical energy consumption f(t) is overlaid with the projected thermal energy consumption f(t) into an integrated combined electrical and thermal model so as to determine when electricity should be directly stored into thermal energy instead of traditional electrical batteries. The 3d models that are used to establish projected energy consumption and demand profiles as f(t) are also critical to improve the accuracy of projecting renewable energy generation (e.g., solar, wind) especially when those generating assets are impacted with nearby infrastructure (e.g., trees, buildings, bridges, etc.) that impact the generating rates of those generating assets. The result is a schedule of predictive generation f(t) of those renewable assets overlaid onto the consumption f(t) in order to optimize the deployment of dispatchable energy storage assets. The 3d model is all overlaid onto the transmission grid nodes and nodes within branches. This resulting 3d model, in combination or standalone with dispatchable RS assets, is the fundamental and inventive model to establish the location for new renewable energy assets. The placement of renewable energy assets then becomes a preferred embodiment to establish the location of 5G communication towers, especially when such 5G communication towers are multi-functional by providing the height for wind turbines leveraging the same tower. It is understood that the 3d model overlaid with communication demand f(t) and renewable energy generation f(t) assets achieves a greater than 5% increase in 5G towers being powered by renewable energy. This is repeated for both wind renewable energy as well as solar renewable energy, and where fortunate the combination of the two at one location overlaid with the 3d model of 5G communications all being influenced by the height relative to each asset identified within the 3d model.

Although the invention has been described in detail, regarding certain embodiments detailed herein, other anticipated embodiments can achieve the same results. Variations and modifications of the present invention will be obvious to those skilled in the art and the present invention is intended to cover in the appended claims all such modifications and equivalents.

What is claimed is:

1. A decoupled and distributed energy system comprised of: an at least first energy production generator producing a primary energy source whereby the primary energy source is available at a first location at a real-time first primary energy peak demand and consumed at the first location by a first electrochemical energy consuming electricity reactor to transform an organic reactant into an at least one resulting organic product with an at least one byproduct of hydrogen; whereby the at least one byproduct of hydrogen is transported to a second location; whereby the hydrogen at the second location is a second location fuel for a primary energy source at the second location; where an at least second energy production generator consumes the second location fuel to produce a primary energy source whereby the primary energy source is available at a second location at a real-time second primary energy peak demand to reduce the real-time second primary energy peak demand; whereby the second location fuel is an at least one energy storage asset at the first location whereby the at least one energy storage asset stores energy produced by the first electrochemical energy consuming electricity reactor and whereby the at least one energy storage asset is dispatchable to a second location; an at least one transport vehicle that transports the dispatchable at least one energy storage asset from the first location to the second location whereby the dispatchable at least one energy storage asset is decoupled from the at least one transport vehicle upon arrival at the second location; whereby the at least one transport vehicle has a transport first travel time for transporting the at least one energy storage asset from the first location to the second location at a first scheduled transport time; whereby the first location has the real-time first primary energy peak demand is lower than a first energy peak demand threshold that occurs at a first peak demand time and the second location has a real-time second primary energy peak demand and a second energy peak demand that occurs at a second peak demand time whereby the second peak demand time is after the first peak demand time plus the transport first travel time; the at least one energy storage asset maintains first the real-time first primary energy peak demand less than the first energy peak demand threshold at the first location and then the real-time second primary energy peak demand at the second location less than the second energy peak demand threshold at the second location; the at least one energy storage asset produced at the first location when a real-time energy peak demand is lower than the first energy peak demand and discharges when the real-time energy peak demand is greater than the first energy peak demand at the first location and consumed at the second location; an energy storage asset controller whereby the controller has a memory having at least a portion of the memory being a non-transitory memory and the non-transitory memory operates a program that regulates when the at least one energy storage asset is charging or discharging; a transport vehicle asset controller to configure, schedule, and dispatch the at least one energy storage asset on the at least one transport vehicle to transport the at least one energy storage asset from the first location to the second location at the scheduled transport time; and whereby the controller operates a program stored in the non-transitory memory for an optimization model wherein the dispatching of the charged energy storage media reduces a peak demand and a demand charge of the peak demand of both the first location of the at least two energy consuming locations and the second location of the at least two energy consuming locations within the network of decoupled energy assets.

2. The decoupled and distributed energy system in accordance to claim 1 is further comprised of a next location, whereby the next location is a third location, whereby the next location has an at least third energy production generator producing a primary energy source whereby the primary energy source is available at the third location at a real-time third primary energy peak demand whereby the at least one energy storage asset at the second location also produces hydrogen while at the second location from energy produced by the at least second energy production generator and whereby the at least one energy storage asset is dispatchable next to the third location by the at least one transport vehicle, whereby the at least one energy storage asset is dispatchable to a third location; an at least one transport vehicle that transports the dispatchable at least one energy storage asset from the second location to the third location whereby the dispatchable at least one energy storage asset is decoupled from the at least one transport vehicle upon arrival at the third location; whereby the at least one transport vehicle has a transport second travel time for transporting the at least one energy storage asset from the second location to the third location at a second scheduled transport time; whereby the second location has the real-time second primary energy peak demand is lower than a second energy peak demand threshold that occurs at a second peak demand time and the third location has a real-time third primary energy peak demand and a third energy peak demand that occurs at a third peak demand time whereby the third peak demand time is after the second peak demand time plus the transport second travel time; the at least one energy storage asset maintains first the real-time second primary energy peak demand less than the second energy peak demand threshold at the second location and then the real-time third primary energy peak demand at the third location less than the third energy peak demand threshold at the third location.

3. The decoupled and distributed energy system in accordance to claim 1 is further comprised of a next location, whereby the next location is returning to the first location, whereby the at least one energy storage asset at the second location also produces hydrogen while at the second location from energy produced by the at least second energy production generator and whereby the at least one energy storage asset is dispatchable next again to the first location, whereby the at least one energy storage asset is dispatchable again to the first location; and the at least one transport vehicle that transports the dispatchable at least one energy storage asset from the second location back to the first location whereby the dispatchable at least one energy storage asset is decoupled from the at least one transport vehicle upon arrival at the first location; whereby the at least one transport vehicle has a transport second travel time for transporting the at least one energy storage asset from the second location back to the first location at a second scheduled transport time; whereby the second location has the real-time second primary energy peak demand is lower than the second energy peak demand threshold that occurs at the second peak demand time and the first location has the real-time first primary energy peak demand and the first energy peak demand that occurs at the first peak demand time whereby the first peak demand time is after the second peak demand time plus the transport second travel time; the at least one energy storage asset maintains first the real-time second primary energy peak demand less than the second energy peak demand threshold at the second location and then the real-time first primary energy peak demand at the first location less than the first energy peak demand threshold at the first location.

4. The decoupled and distributed energy system in accordance to claim 1 whereby the at least one energy storage asset produces a co-product when consuming electricity of the at least one energy storage asset at the first location whereby the co-product is utilized at the first location.

5. The decoupled and distributed energy system in accordance to claim 4 is further comprised of a co-product inventory tank having a co-product inventory tank capacity and whereby the at least one energy storage asset has a charge state level that is less than fully charged and whereby the co-product inventory tank capacity has an actual co-product inventory tank level and wherein the actual co-product inventory tank level is less than the co-product inventory tank capacity.

6. The decoupled and distributed energy system in accordance to claim 4 whereby the first location is further comprising a homogeneous radiant combustion process that consumes the co-product of oxygen.

7. The decoupled and distributed energy system in accordance to claim 1 further comprised of a charge state controller that determines when the at least one energy storage asset charges or discharges, the first location has a real-time first energy consumption rate and the second location has a projected second energy consumption rate whereby the projected second energy consumption occurs at a time prior to the second peak demand time, whereby the at least one energy storage asset has a charge state level, and whereby the charge state controller charges the at least one energy storage asset at the first location when the real-time first primary energy peak demand is less than the first energy peak demand threshold and the real-time first energy consumption rate is lower than the projected second energy consumption rate.

8. The decoupled and distributed energy system in accordance to claim 1 whereby the at least one transport vehicle is further comprised of an onboard energy storage asset, wherein the at least one transport vehicle that transports the dispatchable at least one energy storage asset consumes energy from both the onboard energy storage asset and the dispatchable at least one energy storage asset.

9. The decoupled and distributed energy system in accordance to claim 8 whereby the at least one transport vehicle is further comprised of a transport vehicle energy recovery system recovers a transport decelerating energy when the at least one transport vehicle decelerates and wherein the transport decelerating energy is less than a maximum recovered energy level and wherein the maximum recovered energy is higher for the at least one transport vehicle when both the onboard energy storage asset and the dispatchable at least one energy storage asset stores the transport decelerating energy as compared to the at least one transport vehicle storing the transport decelerating energy only into the onboard energy storage asset.

10. The decoupled and distributed energy system in accordance to claim 1 whereby the at least one transport vehicle is an autonomous vehicle further comprising an automated aligning method for an automated unloading of dispatchable at least one energy storage asset from on the at least one transport vehicle to the second location for a subsequent energy discharging from the dispatchable at least one energy storage asset to an at least one energy consumer at the second location.

11. The decoupled and distributed energy system in accordance to claim 1 wherein the at least one transport vehicle has a cargo storing capacity to store a cargo other than the at least one energy storage asset for delivery to an intermediary location whereby the intermediary location is approximately on-route between an direct route between the first location and the second location.

12. The decoupled and distributed energy system in accordance to claim 1 further comprising a three-dimensional geospatial model of the second location, wherein the three-dimensional geospatial model of the second location comprises an at least one parameter selected from the group of a wind speed impact, a wind direction impact, a solar vector impact, or a solar intensity impact accounting for a seasonal variation and a projected weather coverage, and whereby the three-dimensional geospatial model of the second location is utilized with a projected energy consumption model as a function of time for the second location with the at least one parameter in combination with a historic energy consumption model as a function of time for the second location.

13. The decoupled and distributed energy system in accordance to claim 12 whereby the three-dimensional geospatial model of the second location has a co-located parameter that includes impact of solar shading or impact of wind barrier to modify a thermal impact on the projected energy consumption model as a function of time for the second location.

14. The decoupled and distributed energy system in accordance to claim 12 whereby the three-dimensional geospatial model of the second location has a co-located parameter that includes a potential location of 5G communication towers overlaid with an at least parameter of communication demand as a function of time or renewable energy generation as a function of time and the impact on a projected energy consumption model as a function of time for the second location.

15. The decoupled and distributed energy system in accordance to claim 12 whereby the three-dimensional geospatial model of the second location has a co-located parameter that includes a renewable energy generation as a function of time and the impact on a projected energy consumption model as a function of time for the second location.

16. The decoupled and distributed energy system in accordance to claim 12 whereby the three-dimensional geospatial model of the second location has a co-located parameter that includes a historic transport vehicle route as a function of time for the at least one transport vehicle.

17. A decoupled and distributed energy system comprised of: an at least first energy production generator producing a primary energy source whereby the primary energy source is available at a first location at a real-time first primary energy peak demand and consumed at the first location by a first electrochemical energy consuming electricity reactor to transform an organic reactant into an at least one resulting organic product with an at least one byproduct of hydrogen; whereby the at least one byproduct of hydrogen is produced at an electrochemical energy consuming rate; whereby the resulting at least one byproduct of hydrogen is consumed for a subsequent energy generation having an energy generation rate greater than the electrochemical energy consuming rate of the first electrochemical energy consuming electricity reactor by at least 5% more.

18. The decoupled and distributed energy system in accordance to claim 17 whereby the resulting at least one byproduct of hydrogen is consumed for a subsequent energy generation having an energy generation rate greater than the electrochemical energy consuming rate of the first electrochemical energy consuming electricity reactor by at least 20% more.

19. The decoupled and distributed energy system in accordance to claim 17 whereby the resulting at least one byproduct of hydrogen is consumed for a subsequent energy generation having an energy generation rate greater than the electrochemical energy consuming rate of the first electrochemical energy consuming electricity reactor by at least 40% more.

20. The decoupled and distributed energy system in accordance to claim 17 whereby the at least one byproduct of hydrogen is transported to a second location; whereby the hydrogen at the second location is a second location fuel for a primary energy source at the second location; where an at least second energy production generator consumes the second location fuel to produce a primary energy source whereby the primary energy source is available at a second location at a real-time second primary energy peak demand to reduce the real-time second primary energy peak demand; whereby the second location fuel is an at least one energy storage asset at the first location whereby the at least one energy storage asset stores energy produced by the first electrochemical energy consuming electricity reactor and whereby the at least one energy storage asset is dispatchable to a second location; an at least one transport vehicle that transports the dispatchable at least one energy storage asset from the first location to the second location whereby the dispatchable at least one energy storage asset is decoupled from the at least one transport vehicle upon arrival at the second location; whereby the at least one transport vehicle has a transport first travel time for transporting the at least one energy storage asset from the first location to the second location at a first scheduled transport time; whereby the second location has a real-time second primary energy peak demand and a second energy peak demand that occurs at a second peak demand time whereby the second peak demand time is after the first peak demand time plus the transport first travel time; an energy storage asset controller whereby the controller has a memory having at least a portion of the memory being a non-transitory memory and the non-transitory memory operates a program that regulates when the at least one energy storage asset is charging or discharging; a transport vehicle asset controller to configure, schedule, and dispatch the at least one energy storage asset on the at least one transport vehicle to transport the at least one energy storage asset from the first location to the second location at the scheduled transport time; and whereby the controller operates a program stored in the non-transitory memory for an optimization model wherein the dispatching of the charged energy storage media reduces a peak demand and a demand charge of the peak demand of both the first location of the at least two energy consuming locations and the second location of the at least two energy consuming locations within the network of decoupled energy assets.

* * * * *